(12) United States Patent
Fang et al.

(10) Patent No.: US 12,510,723 B2
(45) Date of Patent: Dec. 30, 2025

(54) OPTICAL LENS, CAMERA MODULE AND ASSEMBLY METHOD THEREFOR

(71) Applicant: NINGBO SUNNY OPOTECH CO., LTD., Yuyao (CN)

(72) Inventors: Yinli Fang, Yuyao (CN); Heng Jiang, Yuyao (CN); Takehiko Tanaka, Yuyao (CN); Lin Liu, Yuyao (CN); Shuijia Chu, Yuyao (CN)

(73) Assignee: NINGBO SUNNY OPOTECH CO., LTD., Yuyao (CN)

( * ) Notice: Subject to any disclaimer, the term of this patent is extended or adjusted under 35 U.S.C. 154(b) by 0 days.

(21) Appl. No.: 18/661,078

(22) Filed: May 10, 2024

(65) Prior Publication Data

US 2024/0295714 A1   Sep. 5, 2024

Related U.S. Application Data

(62) Division of application No. 17/042,713, filed as application No. PCT/CN2019/084449 on Apr. 26, 2019, now Pat. No. 12,055,783.

(30) Foreign Application Priority Data

Apr. 28, 2018   (CN) .......................... 201810401370.4
Apr. 28, 2018   (CN) .......................... 201810403057.4
(Continued)

(51) Int. Cl.
G02B 7/02   (2021.01)
G03B 17/12  (2021.01)

(52) U.S. Cl.
CPC ............. *G02B 7/021* (2013.01); *G02B 7/023* (2013.01); *G02B 7/025* (2013.01); *G03B 17/12* (2013.01)

(58) Field of Classification Search
CPC .......... G02B 7/02; G02B 7/022; G02B 7/023; G02B 7/025; G02B 7/026; G02B 7/027;
(Continued)

(56) References Cited

U.S. PATENT DOCUMENTS 6,342,979 B1    1/2002  Hori
2002/0071190 A1 6/2002  Wada et al.
(Continued)

FOREIGN PATENT DOCUMENTS

CN   1396473 A   2/2003
CN   1577537 A   2/2005
(Continued)

OTHER PUBLICATIONS

Extended European Search Report, dated Apr. 22, 2021 for European Application No. 19792828.6.
(Continued)

*Primary Examiner* — Ephrem Z Mebrahtu
(74) *Attorney, Agent, or Firm* — Birch, Stewart, Kolasch & Birch, LLP

(57) ABSTRACT

An optical lens is provided, including one first lens sheet having a first optical zone and a first structural zone; a second lens component, including a second lens barrel and at least one second lens sheet mounted in the second lens barrel, the second lens sheet has a second optical zone and a second structural zone, the second structural zone and the second lens barrel constitute a structural zone of the second lens component, and there is a first gap between a top surface of the structural zone and a bottom surface of the first structural zone; and a first glue material, located in the first gap. The first glue material extends outwardly along the top surface of the structural zone of the second lens component and covers at least a part of an outer lateral side surface of the first structural zone.

14 Claims, 39 Drawing Sheets

(30) Foreign Application Priority Data

| Apr. 28, 2018 | (CN) | 201810403069.7 |
| Apr. 28, 2018 | (CN) | 201820629848.4 |
| Apr. 28, 2018 | (CN) | 201820629867.7 |
| Apr. 28, 2018 | (CN) | 201820629876.6 |

(58) Field of Classification Search
CPC ........ G02B 7/028; H04N 23/51; H04N 23/54; H04N 23/55
See application file for complete search history.

(56) References Cited

U.S. PATENT DOCUMENTS

| 2005/0231830 | A1 | 10/2005 | Sakaki |
| 2006/0007556 | A1 | 1/2006 | Okajima et al. |
| 2009/0316278 | A1 | 12/2009 | Yen |
| 2011/0044053 | A1 | 2/2011 | Yamaguchi |
| 2012/0147489 | A1 | 6/2012 | Matsuoka |
| 2012/0162795 | A1 | 6/2012 | Yoshimura |
| 2014/0078606 | A1* | 3/2014 | Wu ............ G02B 7/025 359/827 |
| 2015/0301303 | A1 | 10/2015 | Kim et al. |
| 2016/0216527 | A1 | 7/2016 | Juhola et al. |
| 2018/0059354 | A1* | 3/2018 | Gutierrez ........... G02B 7/022 |
| 2020/0409016 | A1 | 12/2020 | Jiang et al. |

FOREIGN PATENT DOCUMENTS

| CN | 2736789 | Y | 10/2005 |
| CN | 1690752 | A | 11/2005 |
| CN | 101609191 | A | 12/2009 |
| CN | 101728404 | A | 6/2010 |
| CN | 101963692 | A | 2/2011 |
| CN | 202330830 | U | 7/2012 |
| CN | 103885155 | A | 6/2014 |
| CN | 104035179 | A | 9/2014 |
| CN | 104199168 | A | 12/2014 |
| CN | 105093461 | A | 11/2015 |
| CN | 105445889 | A | 3/2016 |
| CN | 105467550 | A | 4/2016 |
| CN | 105487190 | A | 4/2016 |
| CN | 105487191 | A | 4/2016 |
| CN | 205388662 | U | 7/2016 |
| CN | 106461901 | A | 2/2017 |
| CN | 206039019 | U | 3/2017 |
| CN | 206270575 | U | 6/2017 |
| CN | 206331165 | U | 7/2017 |
| CN | 107209397 | A | 9/2017 |
| CN | 206532016 | U | 9/2017 |
| CN | 107800937 | A | 3/2018 |
| CN | 207067513 | U | 3/2018 |
| CN | 207249220 | U | 4/2018 |
| CN | 208297798 | U | 12/2018 |
| CN | 208421364 | U | 1/2019 |
| CN | 208432776 | U | 1/2019 |
| JP | 2003-248171 | A | 9/2003 |
| JP | 2004-317990 | A | 11/2004 |
| JP | 2005-85291 | A | 3/2005 |
| JP | 2005-200241 | A | 7/2005 |
| JP | 2009-98462 | A | 5/2009 |
| JP | 2010-191345 | A | 9/2010 |
| JP | 2011-75682 | A | 4/2011 |
| JP | 2011-221243 | A | 11/2011 |
| JP | 2017-107230 | A | 6/2017 |
| KR | 10-2008-0037767 | A | 5/2008 |
| KR | 10-2014-0076761 | A | 6/2014 |
| KR | 10-2017-000253 | A | 1/2017 |
| WO | WO 2017/071561 | A1 | 5/2017 |
| WO | WO 2017/092659 | A1 | 6/2017 |

OTHER PUBLICATIONS

International Search Report and English translation issued in PCT/CN2019/084449 (PCT/ISA/210), dated Jul. 9, 2019.

* cited by examiner

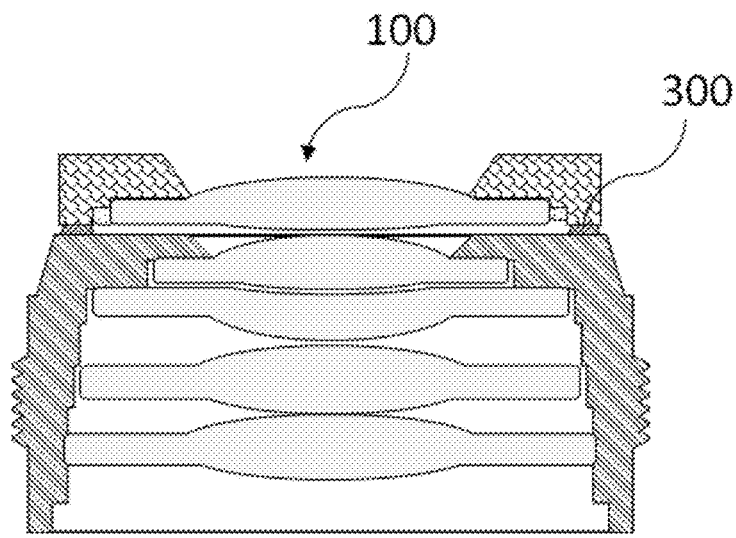
Fig. 20E
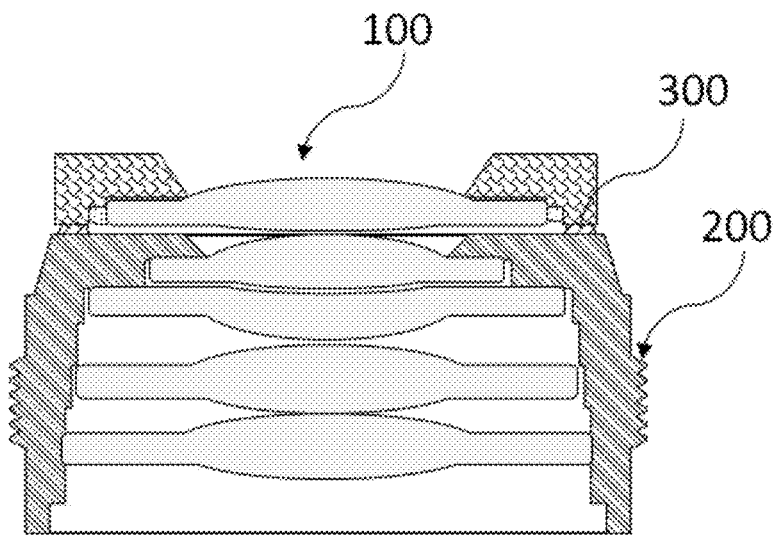
Fig. 20F
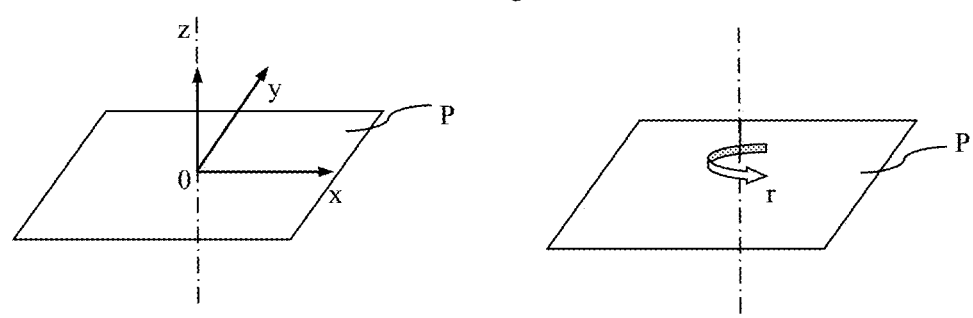
Fig. 21A                              Fig. 21B Fig. 53A                    Fig. 53B

OPTICAL LENS, CAMERA MODULE AND ASSEMBLY METHOD THEREFOR

CROSS REFERENCE TO RELATED APPLICATIONS

This application is a Divisional of application Ser. No. 17/042,713, filed on Sep. 28, 2020, which is the National Phase under 35 U.S.C. § 371 of International Application No. PCT/CN2019/084449, filed on Apr. 26, 2019, which claims the priority of Chinese invention patent application Ser. No. 20/181,0401370.4, entitled "Optical lens, Camera module and Assembly Method Therefor", filed with the Chinese Patent Office on Apr. 28, 2018; Chinese utility model patent application Ser. No. 20/182,0629867.7, entitled "Optical lens and Camera module", filed with the Chinese Patent Office on Apr. 28, 2018; Chinese invention patent application Ser. No. 20/181,0403057.4, entitled "Optical lens, Camera module and Assembly Method Therefor", filed with the Chinese Patent Office on Apr. 28, 2018; Chinese utility model patent application Ser. No. 20/182,0629848.4, entitled "Optical lens and Camera module", filed with the Chinese Patent Office on Apr. 28, 2018; Chinese invention patent application Ser. No. 20/181,0403069.7, entitled "Optical lens, Camera module and Assembly Method Therefor", filed with the Chinese Patent Office on Apr. 28, 2018; and Chinese utility model patent application Ser. No. 20/182,0629876.6, entitled "Optical lens and Camera module", filed with the Chinese Patent Office on Apr. 28, 2018, the entire content of which is incorporated herein by reference.

TECHNICAL FIELD

The present application relates to the technical field of optical imaging. Specifically, the present application relates to an optical lens, a camera module, and an assembly method therefor.

TECHNICAL BACKGROUND

With the popularity of mobile electronic devices, the related technologies of camera modules for helping users obtain images (such as videos or pictures) applied in the mobile electronic devices have been developed and advanced rapidly, and in recent years, the camera modules have been widely applied in many fields such as medical treatment, security and industrial production.

In order to meet the increasingly widespread market demands, high pixels, small size, and large aperture are irreversible development trends of the existing camera modules. However, it is very difficult to achieve the three requirements of high pixels, small size, and large aperture in the same camera molding. For example, the compact development of mobile phones and the increase in screen-to-body ratios of mobile phones have made the space available for front camera modules in the mobile phones smaller and smaller, and the market has proposed higher and higher demands for the imaging quality of camera modules. In addition, the accommodating space of the front camera module of the mobile phone is much smaller than that of the rear camera of the mobile phone. However, the pursuit of characteristics such as high pixels and large aperture has decided that it is difficult to further reduce the size of the lens sheet in the optical design of the lens.

On the other hand, the market has proposed higher and higher demands for the imaging quality of camera modules. For mass-produced optical lenses and camera modules, in the field of compact camera modules (e.g. camera modules used in mobile phones), it is also necessary to consider the quality of optical imaging lenses and the production errors in the module packaging process. Specifically, in the production process of the optical imaging lens, the factors affecting the resolution of the lens come from errors of each element and its assembly, an error of the thickness of a lens sheet spacer element, an error of the assembly fit of each lens sheet, a change of a refractive index of a lens sheet material and so on. Among them, the errors of each element and its assembly include errors in the thickness of an optical surface of each lens sheet unit, the height of the optical surface of the lens sheet, the shape of the optical surface, the radius of curvature, the single-surface and inter-surface eccentricities of the lens sheet, the tilt of the optical surface of the lens sheet, and so on. The magnitudes of these errors depend on the control ability of mold accuracy and molding accuracy. The error of the thickness of the lens sheet spacer element depends on the processing accuracy of the element. The error of the assembly fit of each lens sheet depends on the dimensional tolerance of the assembled element and the assembly accuracy of the lens. The error introduced by the change of the refractive index of the lens sheet material depends on the stability of the material and batch consistency. The errors of the above respective elements affecting the resolution are cumulatively deteriorated, and this cumulative error will continue to increase as the number of lenses increases. The existing resolution solution is to perform tolerance control on the size of each relatively sensitive element and compensate for the rotation of the lens sheet to improve the resolution. However, since the lens with high pixels and large aperture is more sensitive, it requires strict tolerances. For example, 1 μm lens sheet eccentricity of a partially sensitive lens will cause 9' image plane tilt, which makes lens sheet processing and assembly more and more difficult. At the same time, due to the long feedback cycle during the assembly process, the process capability index (CPK) of lens assembly is low and fluctuates greatly, resulting in a high defect rate. Moreover, as described above, because there are many factors affecting the resolution of the lens, which exist in a plurality of elements, the control of each factor has the limit of production accuracy. If only the accuracy of each element is improved, the improvement ability is limited and the improvement cost is high. Furthermore, it cannot meet the market's increasing demands for the image quality.

Furthermore, in the field of camera modules of mobile phones, typical mass-produced optical lenses currently on the market are assembled by embedding piece by piece. Specifically, a lens barrel with a stepped bearing surface on the inner side is prepared in advance, and then small to large lens sheets are embedded into the lens barrel one by one and bear against the corresponding stepped bearing surface to obtain a complete optical lens. On this basis, how to further reduce the size of the optical lens and camera module and ensure the reliability of the module or lens on the premise of ensuring high imaging quality is an issue that needs to be solved urgently.

The applicant proposed an assembly method in which the relative position of upper and lower sub-lens is adjusted and determined based on an active calibration process, and then the upper and lower sub-lens are bonded together according to the determined relative position, thereby producing a complete optical lens or camera module. This solution can improve the process capability index (CPK) of mass-produced optical lenses or camera modules; can loosen the requirements for the accuracy of each element of the materials (such as sub-lens or photosensitive assemblies used to assemble the optical lens or camera module) and their assembly accuracy, thereby reducing the overall cost of optical imaging lenses and camera modules; and can adjust various aberrations of the camera modules in real time during the assembly process, reduce the defect rate, reduce the production costs, and improve the image quality.

However, actively calibrating the optical system of the lens itself is a new production process. Actual mass production needs to consider many factors such as reliability, drop resistance, weather resistance and manufacturing cost of the optical lens and camera module, and sometimes it is necessary to face the decrease in the yield due to various unpredictable factors. For example, in a process scheme, a glue material is filled between a first lens component and a second lens component, so that the first lens component and the second lens component are maintained at the relative position determined by active calibration. However, the actual trial production found that the imaging quality of the optical lens and camera module often deteriorated compared with the imaging quality obtained in the active calibration stage. This deterioration sometimes exceeds a tolerance range, resulting in product failure. The applicant's research found that after the introduction of the active calibration process in the assembly of the optical lens or camera module, the variation of the glue material, the lens barrel or the lens and other unknown factors may all be the cause of the above-mentioned issues. There is an urgent need for a solution that can overcome the above-mentioned issues in order to further improve the product yield.

SUMMARY

According to an aspect of the present application, there is provided an optical lens, comprising: a first lens component comprising at least one first lens sheet; a second lens component comprising a second lens barrel and at least one second lens sheet mounted in the second lens barrel, wherein the at least one second lens sheet and the at least one first lens sheet together constitute an imageable optical system, wherein at least a part of the outer side surface of the second lens sheet at the bottommost end among the at least one second lens sheet is exposed to the outside of the second lens barrel, and the top surface of the second lens sheet at the bottommost end bears against the bottom surface of the second lens barrel; and a connecting medium adapted to fix the first lens component and the second lens component together.

According to another aspect of the present application, there is further provided a camera module, comprising the optical lens described in any one of the foregoing embodiments.

According to another aspect of the present application, there is further provided a method of assembling an optical lens, wherein the optical lens comprises a first lens component and a second lens component, the first lens component comprises a first lens barrel and at least one first lens sheet mounted in the first lens barrel, and the second lens component comprises a second lens barrel and at least one second lens sheet mounted in the second lens barrel, and wherein the method of assembling the optical lens comprises: pre-positioning the first lens component and the second lens component separated from each other, so that the at least one second lens sheet and the at least one first lens sheet together constitute an imageable optical system; adjusting and determining the relative position of the first lens component and the second lens component based on active calibration, wherein at least a part of the outer side surface of the second lens sheet at the bottommost end among the at least one second lens sheet is exposed to the outside of the second lens barrel, and the top surface of the second lens sheet at the bottommost end bears against the bottom surface of the second lens barrel; and bonding the first lens component and the second lens component by a glue material, the glue material supporting and fixing the first lens component and the second lens component after being cured, so that the relative position of the first lens component and the second lens component is maintained at the relative position determined by the active calibration.

Compared with the prior art, the above-mentioned one or more technical solutions have at least one of the following beneficial effects:

1. The size of the optical lens in the direction perpendicular to the optical axis can be effectively reduced on the premise of the established optical design, and at the same time, the imaging quality of the optical lens can be ensured.
2. The size of the lens barrel in the direction perpendicular to the optical axis can be reduced to the greatest extent on the premise of the established optical design.
3. While reducing the size of the lens barrel in the direction perpendicular to the optical axis, it can help enhance the structural strength of the optical lens and ensure the reliability of the optical lens.

According to another aspect of the present application, there is further provided an optical lens, comprising: a first lens component comprising a first lens barrel and at least one first lens sheet mounted in the first lens barrel; a second lens component comprising a second lens barrel and at least one second lens sheet mounted in the second lens barrel, the at least one second lens sheet and the first lens sheet together constitute an imageable optical system, and the first lens barrel has a material different from the material of the second lens barrel; and a first glue material located in a first gap between the first lens component and the second lens component, the first glue material is adapted to support and fix the first lens component and the second lens component after being cured, wherein there is a non-zero included angle between the axis of the first lens component and the axis of the second lens component.

According to another aspect of the present application, there is further provided a camera module, comprising the optical lens described in any one of the foregoing embodiments.

According to another aspect of the present application, there is further provided a method of assembling an optical lens, wherein the optical lens comprises a first lens component and a second lens component, the first lens component comprises a first lens barrel and at least one first lens sheet mounted in the first lens barrel, the second lens component comprises a second lens barrel and at least one second lens sheet mounted in the second lens barrel, and the first lens barrel is made of a material different from the material of the second lens barrel. The method of assembling the optical lens comprises: pre-positioning the first lens component and the second lens component, so that the at least one first lens sheet and the at least one second lens sheet together constitute an imageable optical system; performing active calibration according to a measured imaging result of the optical system to determine the relative position of the first lens component and the second lens component; and bonding the first lens component and the second lens component so as to support and fix the relative position of the first lens component and the second lens component.

Compared with the prior art, the above-mentioned one or more technical solutions have at least one of the following beneficial effects:
1. The difference between the state of the optical system after the first glue material is cured and the state of the optical system determined by the active calibration can be reduced by reducing the variation of the first lens component, thereby ensuring the imaging quality of the lens or module.
2. The amount of expansion of the inner side surface of the first lens barrel from the outside to the inside and the amount of expansion of the outer side of the first lens sheet from the inside to the outside can be subtracted (or eliminated) each other by the material selection of the first lens barrel, so that the deformation of the first lens component due to heating (e.g. baking) is reduced, thereby ensuring the imaging quality of the lens or module.
3. The difference between the state of the optical system after the first glue material is cured and the state of the optical system determined by the active calibration can be reduced by reducing the shape variation or position shift of the first lens barrel due to accumulation of moisture, thereby ensuring the imaging quality of the lens or module.
4. The deformation of the optical surface of the first lens sheet due to the clamping of the external pickup mechanism can be suppressed, which is helpful to reduce the difference between the state of the optical system after the first glue material is cured and the state of the optical system determined by the active calibration, thereby ensuring the imaging quality of the lens or module.

According to another aspect of the present application, there is further provided an optical lens, comprising: a first lens component comprising one first lens sheet having a first optical zone for optical imaging and a first structural zone other than the first optical zone; a second lens component comprising a second lens barrel and at least one second lens sheet mounted in the second lens barrel, wherein the at least one second lens sheet and the first lens sheet together constitute an imageable optical system, the second lens sheet has a second optical zone for optical imaging and a second structural zone other than the second optical zone, the second structural zone and the second lens barrel constitute a structural zone of the second lens component, and there is a first gap between the top surface of the structural zone of the second lens component and the bottom surface of the first structural zone; and a first glue material located in the first gap and extending outwardly along the top surface of the structural zone of the second lens component and surrounding the first structural zone, the first glue material extending outwardly wrapping at least a part of the outer side surface of the first structural zone.

According to another aspect of the present application, there is further provided a camera module, comprising the optical lens described in any one of the foregoing embodiments.

According to another aspect of the present application, there is further provided a method of assembling an optical lens, comprising: preparing a first lens component and a second lens component separated from each other, wherein the first lens component comprises one first lens sheet, the first lens sheet has a first optical zone for optical imaging and a first structural zone other than the first optical zone, the second lens component comprises a second lens barrel and at least one second lens sheet mounted in the second lens barrel, the second lens sheet has a second optical zone for optical imaging and a second structural zone other than the second optical zone, and the second structural zone and the second lens barrel constitute a structural zone of the second lens component; pre-positioning the first lens component and the second lens component, so that the first lens sheet and the at least one second lens sheet together constitute an imageable optical system; adjusting and determining the relative position of the first lens component and the second lens component based on active calibration; and bonding the first lens sheet and the second lens component by a first glue material, wherein there is a first gap between the top surface of the structural zone of the second lens component and the bottom surface of the first structural zone, the first glue material is located in the first gap and extends outwardly along the top surface of the structural zone of the second lens component and surrounds the first structural zone, and the first glue material extending outwardly wraps at least a part of the outer side surface of the first structural zone, and after the first glue material is cured, the first lens sheet and the second lens component are fixed and maintained at the relative position determined by the active calibration.

According to another aspect of the present application, there is further provided a camera module assembly method, comprising: assembling an optical lens by using the foregoing method of assembling the optical lens; and manufacturing a camera module based on the assembled optical lens.

Compared with the prior art, one or more implementations of the present application have at least one of the following technical effects:
1. The resolution of the actual product of the optical lens (or camera module) based on the active calibration can be brought closer to the resolution obtained by the active calibration by wrapping the side surface of the first lens sheet with the first glue material (the glue material for bonding the first and second lens components).
2. The diaphragm can be formed by covering the first lens barrel on the first lens sheet, and the appearance of the optical lens barrel is more regular and beautiful.
3. The position shift or deformation of the first lens sheet due to variation of the first lens barrel can be suppressed, so that the resolution of the actual product of the optical lens (or camera module) based on the active calibration is brought closer to the resolution obtained by the active calibration.
4. The gap between the outer side surface and top surface of the first lens sheet and the first lens barrel can be completely filled with the glue material, so that the first lens sheet will not be deformed or displaced due to gas expansion during baking.
5. The air escape holes can be designed to avoid deformation or displacement of the first lens sheet due to gas expansion during baking.
6. The mistakes in painting glue due to careless operations (e.g. accidentally forming the second glue material into a completely closed ring) can be reduced by the air escape grooves, which is helpful to improve the yield in mass production.
7. The first glue material can wrap the side surface of the first lens sheet and/or cover the top surface of the structural zone of the first lens sheet only through a single glue painting, thereby reducing the process steps.

BRIEF DESCRIPTION OF THE DRAWINGS

The exemplary embodiments are shown in the reference drawings. The embodiments and drawings disclosed herein are to be considered illustrative and not restrictive.

FIGS. 20A to 20F show an optical lens assembly method in another embodiment of the present application;

FIG. 21A shows the relative position adjustment manner in the active calibration in an embodiment of the present application;

FIG. 21B shows rotation adjustment in the active calibration according to another embodiment of the present application;

FIG. 53A shows the relative position adjustment manner in the active calibration in an embodiment of the present application;

FIG. 53B shows rotation adjustment in the active calibration according to another embodiment of the present application.

DETAILED DESCRIPTION OF THE EMBODIMENTS

Figure 1:
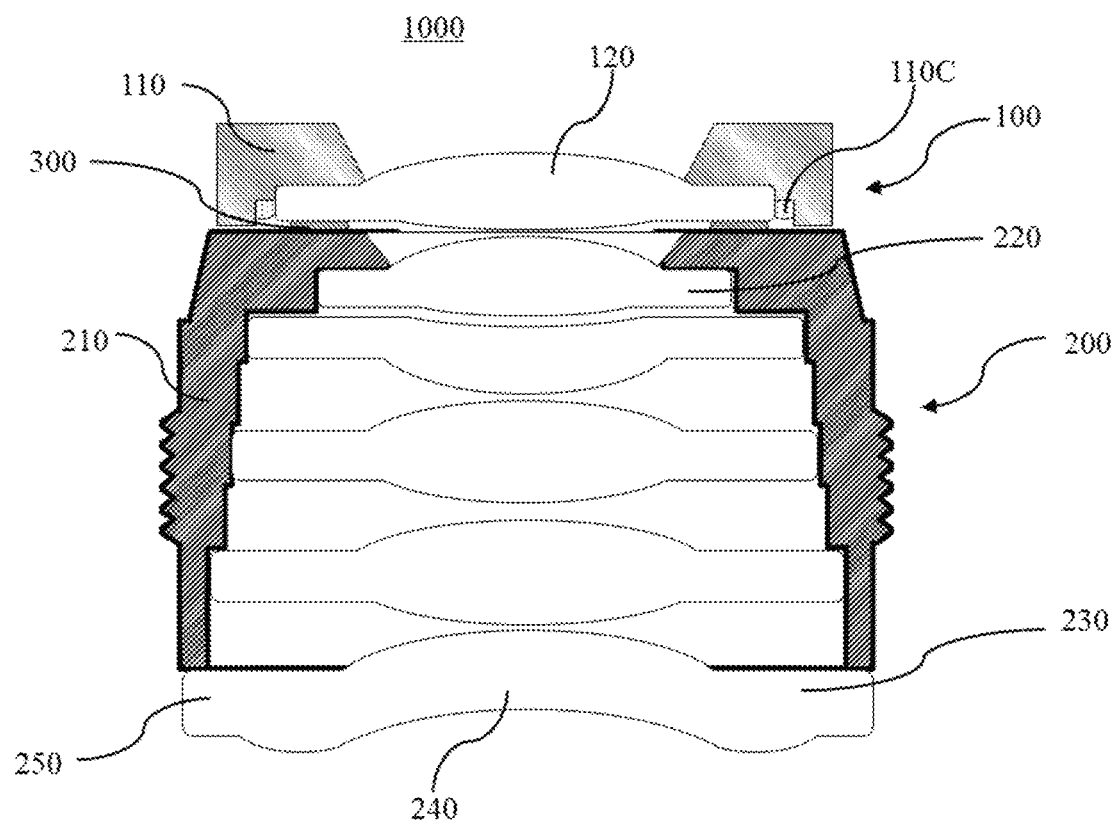
FIG. 1 shows a schematic cross-sectional view of an optical lens 1000 according to an embodiment of the present application.

In order to better understand the present application, various aspects of the present application will be described in more detail with reference to the drawings. It should be understood that the detailed description is merely description of exemplary embodiments of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", etc. are only used to distinguish one feature from another feature, and do not indicate any limitation on the feature. Therefore, without departing from the teachings of the present application, a first main body discussed below may also be referred to as a second main body.

In the drawings, for convenience of explanation, the thickness, size, and shape of the object have been slightly exaggerated. The drawings are only examples and are not drawn to scale.

It should also be understood that the terms "comprising", "comprise", "having", "including" and/or "include" when used in the present description, indicate the existence of stated features, integers, steps, operations, elements and/or components, but does not exclude the presence or addition of one or more other features, integers, steps, operations, elements, components and/or combinations thereof. Furthermore, when an expression such as "at least one of" appears after the list of listed features, it modifies the entire list of listed features, rather than the individual elements in the list. In addition, when describing the implementations of the present application, the use of "may" means "one or more implementations of the present application", and, the term "exemplary" refers to an example or illustration.

As used herein, the terms "substantially", "approximately" and similar terms are used as a term expressing an approximation and not as a term expressing an extent, and are intended to indicate an inherent deviation in a measurement value or calculated value, which will be recognized by those of ordinary skill in the art.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

Figure 2:
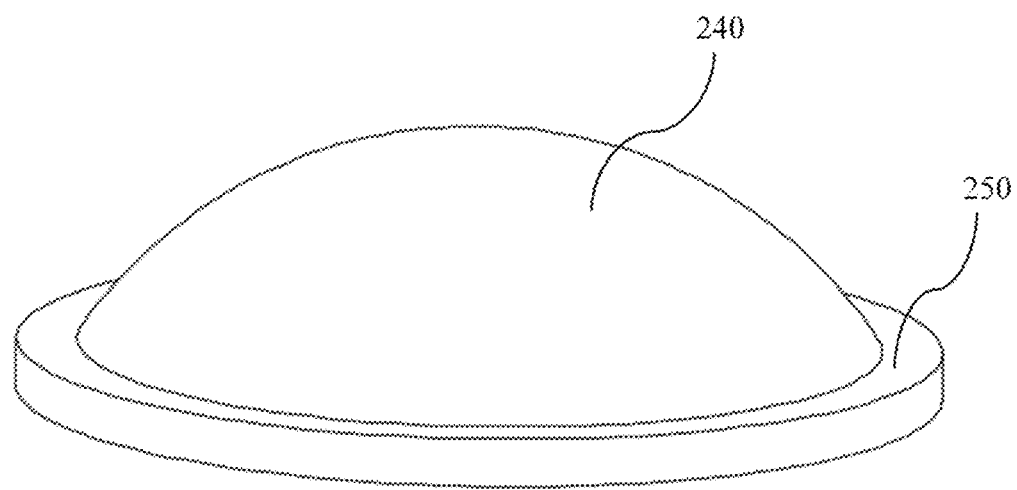
FIG. 2 shows a three-dimensional schematic view of the second lens sheet 230 at the bottommost end in an embodiment of the present application.
Figure 3:
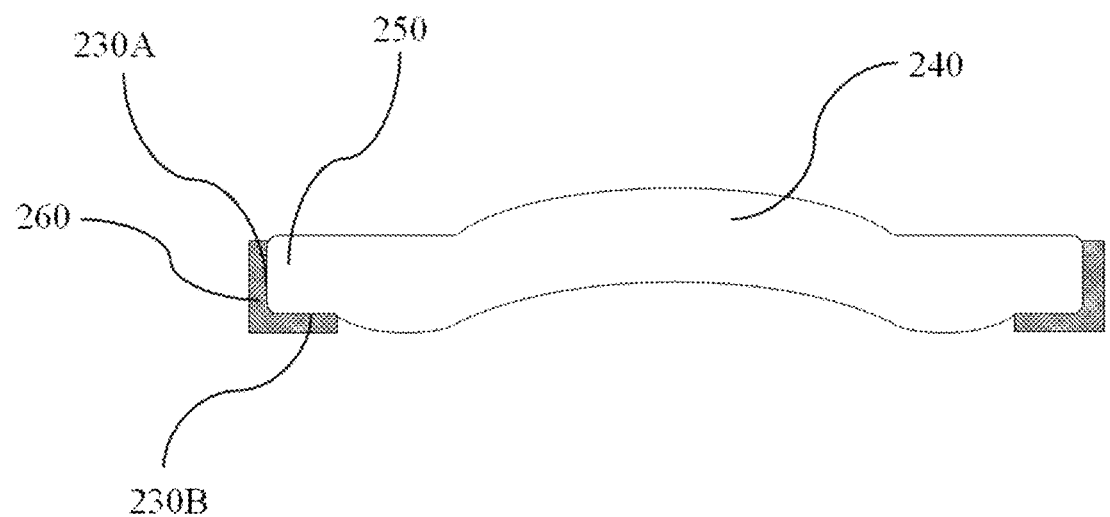
FIG. 3 shows a schematic cross-sectional view of the second lens sheet 230 at the bottommost end in an embodiment of the present application.

FIG. 1 shows a schematic cross-sectional view of an optical lens 1000 according to an embodiment of the present application. As shown in FIG. 1, the optical lens 1000 includes a first lens component 100, a second lens component 200 and a first glue material 300. The first lens component 100 includes a first lens barrel 110 and one first lens sheet 120 mounted in the first lens barrel 110. The second lens component 200 includes a second lens barrel 210 and five second lens sheets 220 mounted in the second lens barrel 210. A second lens sheet 230 at the bottommost end includes an optical zone 240 for imaging and a structural zone 250 other than the optical zone 240, and the top surface of the structural zone 250 bears against and is adhered to the bottom surface of the second lens barrel 210, so that the outer side surface of the second lens sheet 230 at the bottommost end is all exposed to the outside of the second lens barrel 210. FIG. 2 shows a three-dimensional schematic view of the second lens sheet 230 at the bottommost end in an embodiment of the present application. The five second lens sheets 220 and the one first lens sheet 120 together constitute an imageable optical system. A first glue material 300 may be arranged between the first lens component 100 and the second lens component 200. For example, there is a gap between the first lens component 100 and the second lens component 200 in a direction along the optical axis, and the first glue material 300 is located in the gap. The first glue material 300 is adapted to fix the first lens component 100 and the second lens component 200 together. For example, the first glue material 300 is adapted to support and fix the first lens component 100 and the second lens component 200, so that the relative position of the first lens component 100 and the second lens component 200 is maintained at the relative position determined by active calibration. The active calibration is to calibrate the relative position of the first lens component 100 and the second lens component 200 based on an actual resolution curve measured by actual imaging of the optical system (that is, the five second lens sheets 220 and the one first lens sheet 120 together constitute an imageable optical system) so as to improve the imaging quality of the optical lens. Further, FIG. 3 shows a schematic cross-sectional view of the second lens sheet 230 at the bottommost end in an embodiment of the present application. Referring to FIG. 3, in this embodiment, the outer side surface 230A of the second lens sheet 230 at the bottommost end may form a light shielding layer 260. The light shielding layer 260 maybe be formed by screen printing a light shielding material on the side surface 230A of the second lens sheet 230 at the bottommost end. In another embodiment, both the outer side surface 230A of the second lens sheet 230 at the bottommost end and the bottom surface 230B of the structural zone 250 may form a light shielding layer 260. The light shielding layer 260 may be formed by printing the light shielding material on the outer side surface 230A of the second lens sheet 230 at the bottommost end and the bottom surface 230B of the structural zone 250 through a screen printing process.

In the above-mentioned embodiments, the size of the optical lens in the direction perpendicular to the optical axis can be effectively reduced on the premise of the established optical design, and at the same time, the imaging quality of the optical lens can be ensured.

In contrast, the optical lens in the prior art is usually a monolithic lens. In a comparative example, a method for manufacturing an optical lens is to prepare a lens barrel with a stepped bearing surface on the inner side in advance, and then embed small to large lens sheets into the lens barrel one by one and bear them against the corresponding stepped bearing surface to obtain a complete optical lens. In such an optical lens, the lens barrel needs to surround the lens sheet with the largest size located at the bottommost end, and the lens barrel needs to have enough thickness to form a rigid support for the lens sheet at the bottommost end. As a result, the thickness of the lens barrel cannot be reduced indefinitely.

In the above-mentioned embodiment of the present application, the top surface of the structural zone of the second lens sheet at the bottommost end bears against and is adhered to the bottom surface of the second lens barrel. In this embodiment, since the outer side surface of the second lens sheet at the bottommost end is exposed to the outside of the inner side surface of the lens barrel, the outer diameter of the lens barrel can be designed on the basis of the size of the second lens sheet from the bottom at the bottom end, and compared with the foregoing comparative example, the size of the lens barrel in the direction perpendicular to the optical axis is reduced. On the other hand, for production errors of the second lens component, such as assembly errors caused by the step of bonding and fixing the second lens sheet at the bottommost end to the bottom surface of the second lens barrel, the above-mentioned embodiment of the present application may adjust the relative position of the first lens component and the second lens component based on the active calibration for compensation, thereby obtaining high imaging quality.

Figure 4:
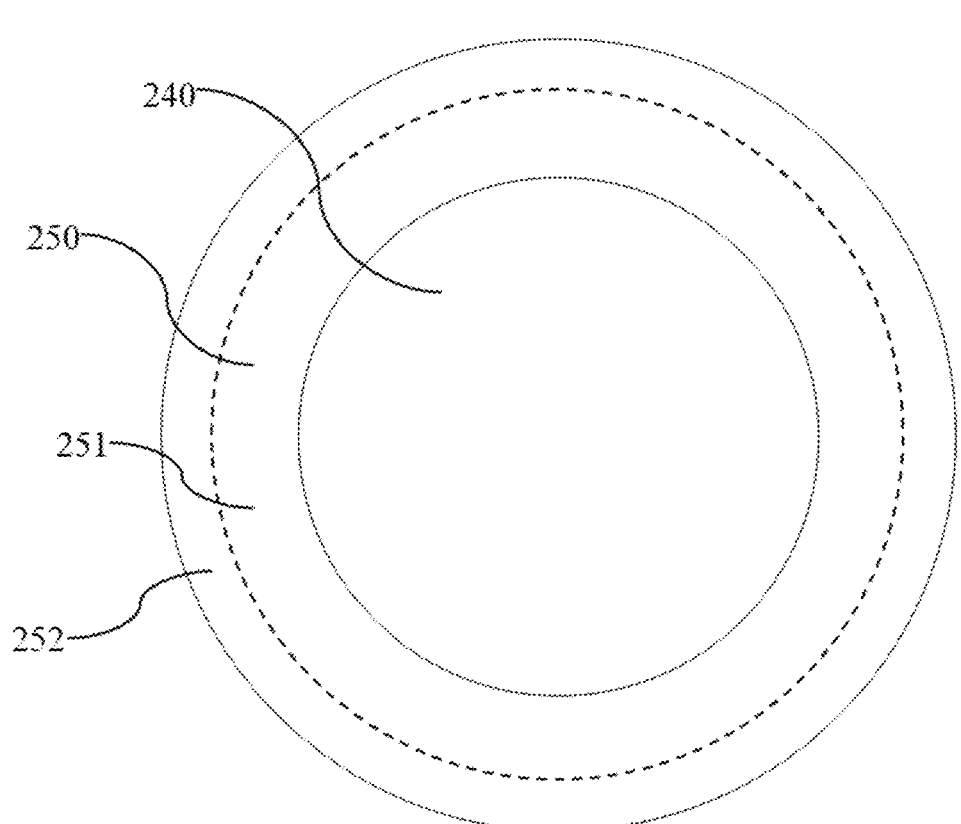
FIG. 4 shows a schematic top view of the second lens sheet 230 at the bottommost end according to an embodiment of the present application.
Figure 5:
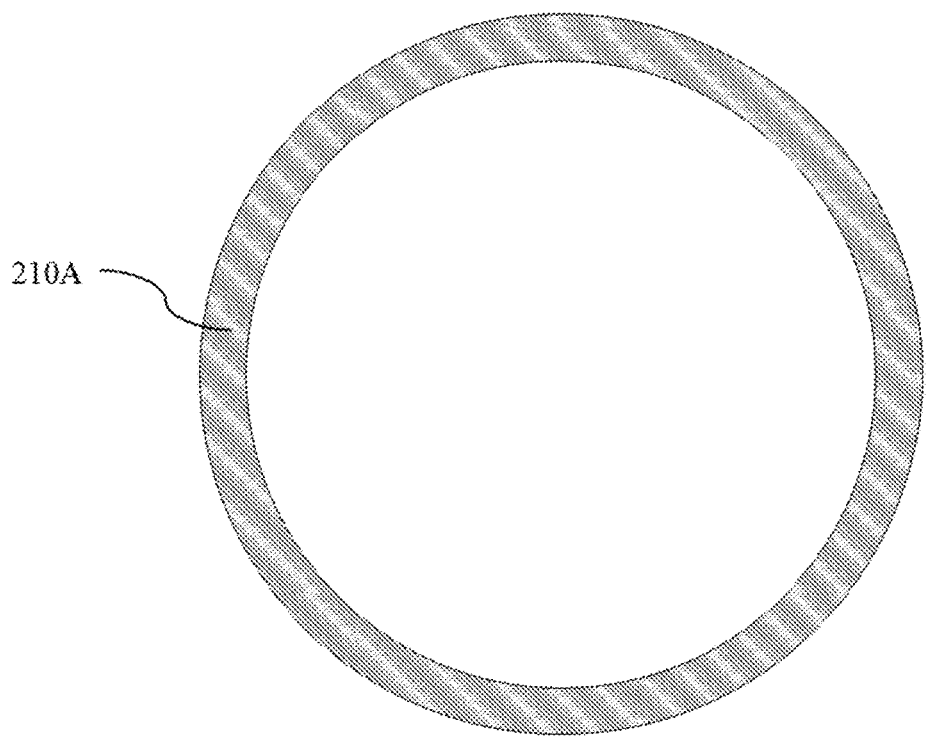
FIG. 5 shows a schematic bottom view of a second lens barrel 210 corresponding to FIG. 4.
Figure 6:
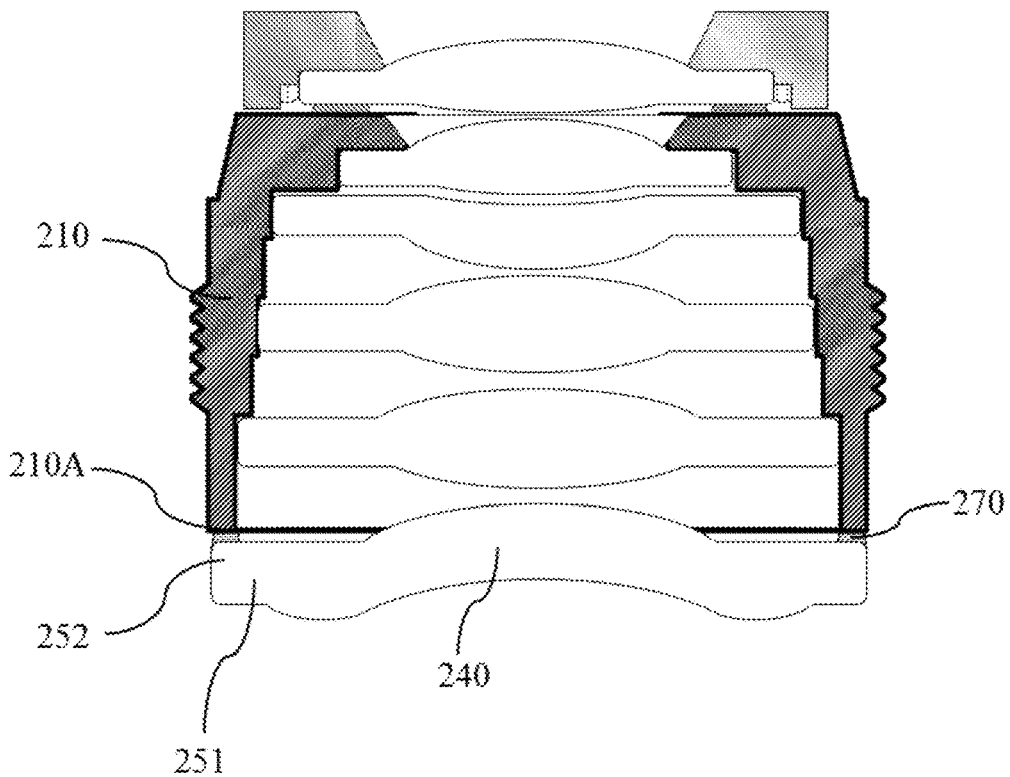
FIG. 6 shows a schematic cross-sectional view of an optical lens after the bottom surface 210A of the second lens barrel 210 is adhered to the second lens sheet 230 at the bottommost end in an embodiment of the present application.

Further, FIG. 4 shows a schematic top view of the second lens sheet 230 at the bottommost end according to an embodiment of the present application, and FIG. 5 shows a schematic bottom view of the second lens barrel 210 corresponding to FIG. 4. Referring to FIG. 4 and FIG. 5, in this embodiment, the structural zone 250 may include an adhesion zone 252 and a transition zone 251. The bottom surface 210A of the second lens barrel 210 is adhered to the adhesion zone 252 of the second lens sheet 230 at the bottommost end. FIG. 6 shows a schematic cross-sectional view of an optical lens after the bottom surface 210A of the second lens barrel 210 is adhered to the second lens sheet 230 at the bottommost end in an embodiment of the present application. The bottom surface 210A of the second lens barrel and the top surface of the adhesion zone 252 of the second lens sheet 230 at the bottommost end bear against and are adhered to each other by adhesive glue 270. It needs to be noted that for the sake of simplicity of the illustration, only the bottom surface 210A of the second lens barrel is shown in FIG. 5, and the steps inside the second lens barrel 210 for bearing the remaining second lens sheets (the remaining second lens sheets refer to the remaining second lens sheets inside the second lens barrel 210 other than the second lens sheet at the bottommost end) are not shown.

Figure 7:
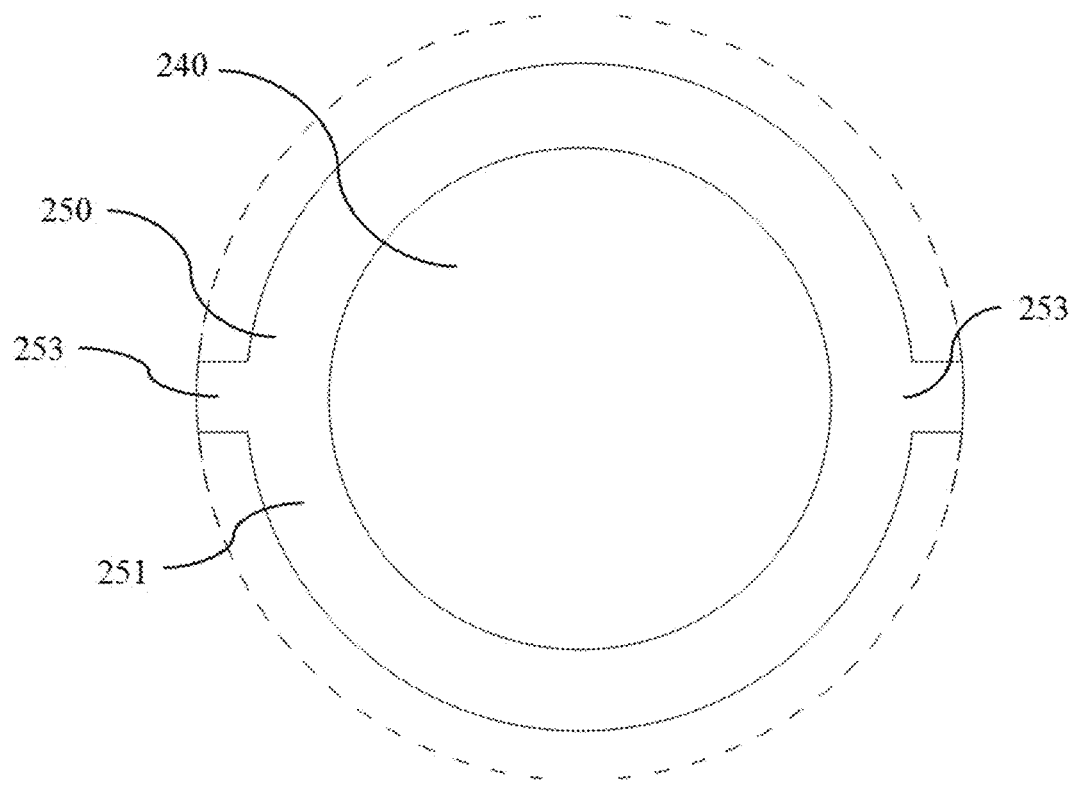
FIG. 7 shows a schematic top view of the second lens sheet 230 at the bottommost end according to another embodiment of the present application.
Figure 8A:
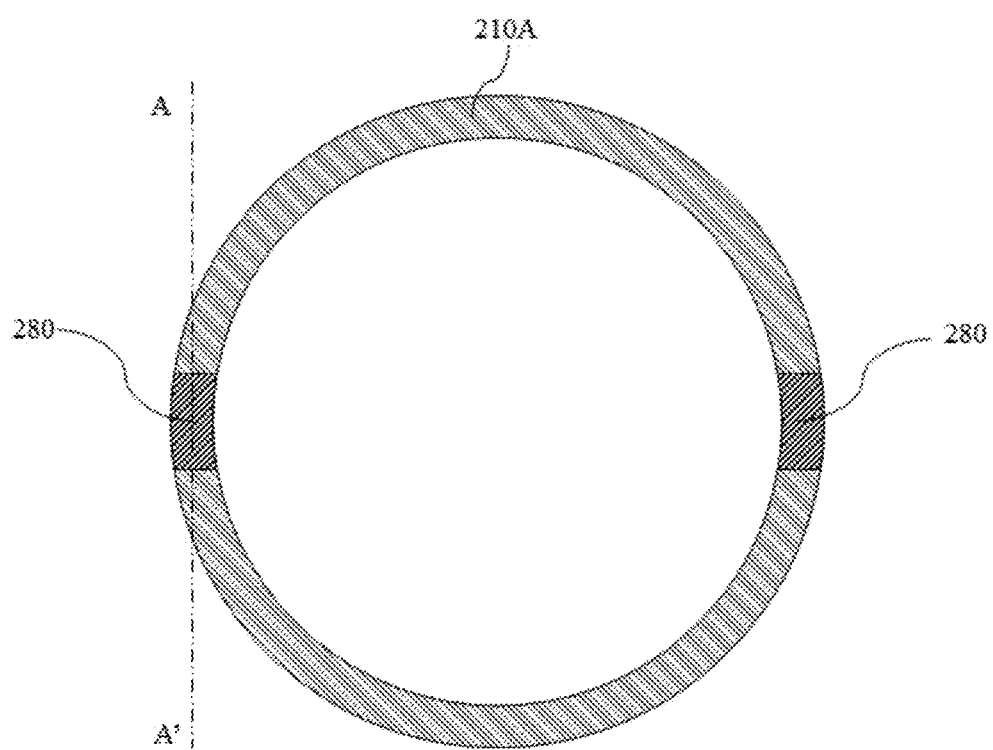
FIG. 8A shows a schematic bottom view of the second lens barrel 210 corresponding to FIG. 7.
Figure 8B:
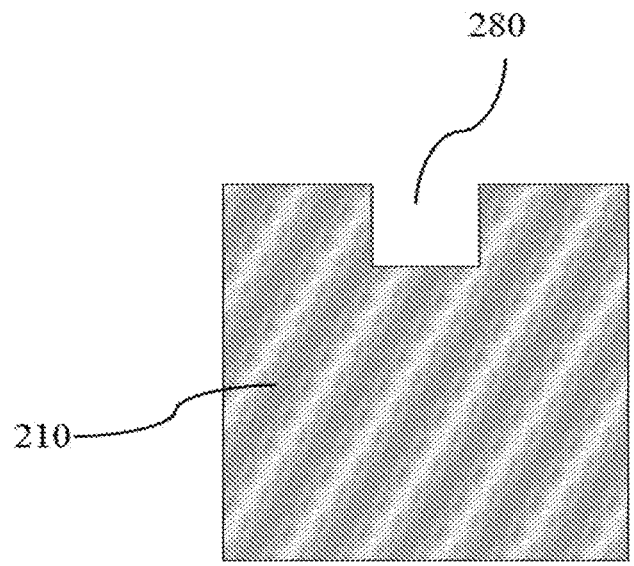
FIG. 8B shows a schematic cross-sectional view of the second lens barrel 210 taken along a section line A-A' shown in FIG. 8A.
Figure 8C:
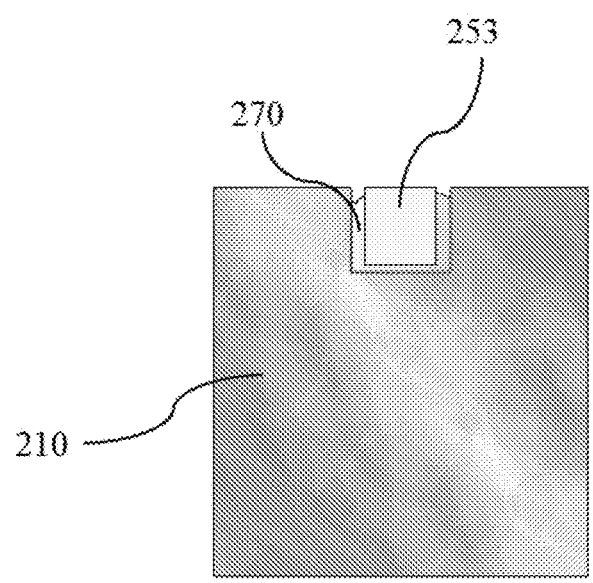
FIG. 8C shows a schematic view of the second lens sheet 230 at the bottommost end embedded in the second lens barrel 210 shown in FIG. 8B.

Further, FIG. 7 shows a schematic top view of the second lens sheet 230 at the bottommost end according to another embodiment of the present application. Referring to FIG. 7, in this embodiment, in the second lens component, the second lens sheet 230 at the bottommost end has an extension portion 253 formed along the direction perpendicular to its axis and extending outwardly from its side surface. Further, FIG. 8A shows a schematic bottom view of the second lens barrel 210 corresponding to FIG. 7, FIG. 8B shows a schematic cross-sectional view of the second lens barrel 210 taken along a section line A-A' shown in FIG. 8A, and FIG. 8C shows a schematic view of the second lens sheet 230 at the bottommost end embedded in the second lens barrel 210 shown in FIG. 8B. Referring to FIGS. 8A-C, the bottom surface 210A of the second lens barrel has a groove 280 and the extension portion 253 is embedded in the groove 280, thereby improving the connection strength between the second lens sheet at the bottommost end and the second lens barrel. As shown in FIG. 7, the second lens sheet 230 at the bottommost end includes an optical zone 240 for imaging and a structural zone 250 other than the optical zone 240, and the extension portion 253 is located in the structural zone 250. Further, the second lens sheet 230 at the bottommost end can be fixed to the second lens barrel 210 together by a second glue material 270 between the extension portion 253 and the groove 280. In this embodiment, the number of extension portions 253 may be two, and the number of corresponding grooves 280 on the bottom surface 210A of the second lens barrel is also two. Of course, in other embodiments of the present application, the number of extension portions may also be other numbers, such as three, four, five, six, etc. Correspondingly, the number of corresponding grooves on the bottom surface of the second lens barrel may also be three, four, five, six, etc. It needs to be noted that for production tolerances of the second lens component, such as assembly tolerances (or called assembly errors) caused by embedding and fixing the second lens sheet at the bottommost end to the groove on the bottom surface of the second lens barrel, this embodiment may adjust the relative position of the first lens component and the second lens component based on the active calibration for compensation, thereby obtaining high imaging quality. In particular, in this embodiment, in order to ensure the installation accuracy of the extension portion and the corresponding groove, there is almost no adjustable amount in design, that is, the relative position of the second lens sheet at the bottommost end and the second lens barrel is basically decided by the positions of the extension portions and the corresponding grooves. Thus, the assembly tolerance may be brought about when assembling the second lens sheet at the bottommost end and the second lens barrel. However, such an assembly tolerance can be compensated by adjusting the relative positions of the first lens component and the second lens component during the active calibration stage. For example, the first lens component can be rotated relative to the second lens component (for example, which refers to the rotation around the optical axis of the optical lens) during the active calibration stage to compensate for the assembly tolerance caused by the inability of the second lens sheet at the bottommost end to rotate relative to the second lens barrel (for example, which refers to the rotation around the optical axis of the optical lens).

Further, still referring to FIG. 7, in an embodiment, in the second lens sheet 230 at the bottommost end, there is a transition zone 251 located in the structural zone 250 between the optical zone 240 and the extension portion 253. This embodiment can reduce the size of the lens barrel in the direction perpendicular to the optical axis, and help to enhance the structural strength of the optical lens and ensure the reliability of the optical lens.

Figure 9:
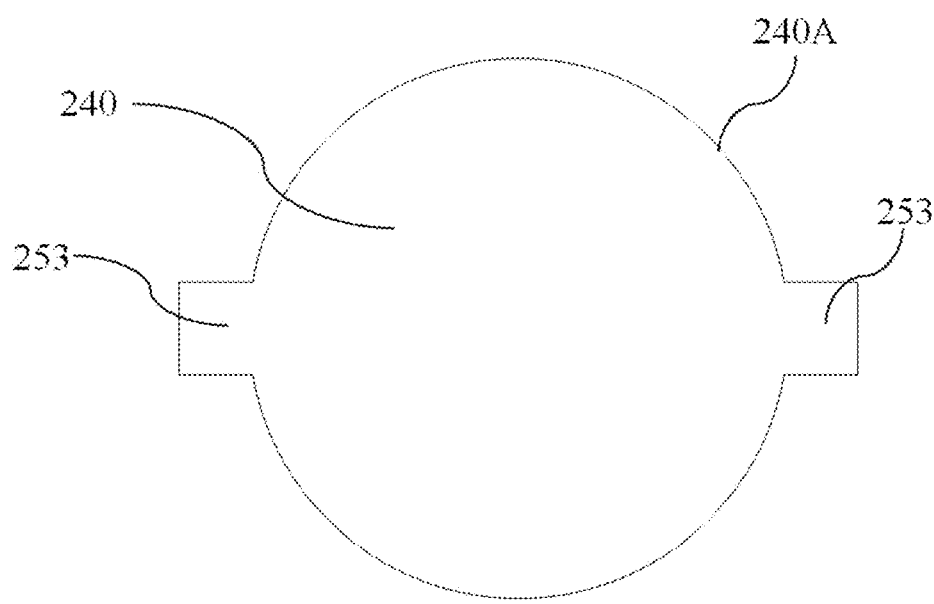
FIG. 9 shows a schematic top view of the second lens sheet 230 at the bottommost end according to further another embodiment of the present application.
Figure 10:
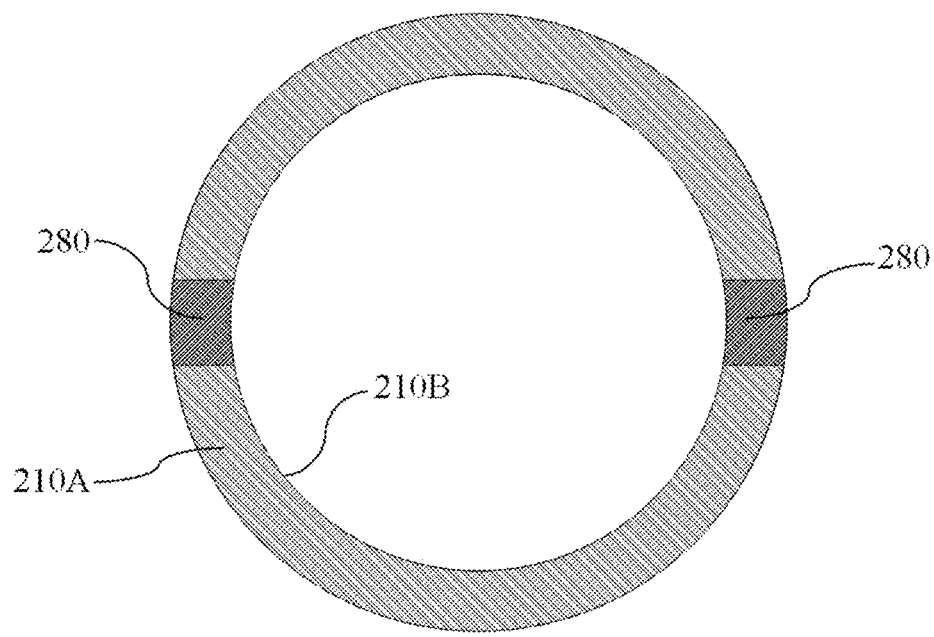
FIG. 10 shows a schematic bottom view of the second lens barrel 210 according to further another embodiment of the present application.

Further, FIG. 9 shows a schematic top view of the second lens sheet 230 at the bottommost end according to further another embodiment of the present application, and FIG. 10 shows a schematic bottom view of the second lens barrel 210 according to further another embodiment of the present application. Referring to FIGS. 9 and 10, in this embodiment, regions other than the extension portion 253 of the second lens sheet 230 at the bottommost end are all the optical zone 240, that is, the outer side surface 240A of the optical zone 240 of the second lens sheet 230 at the bottommost end bears against the inner side surface 210B of the second lens barrel. This embodiment can minimize the size of the lens barrel in the direction perpendicular to the optical axis on the premise of the established optical design.

Further, in an embodiment, the outer side surface of the extension portion of the second lens sheet at the bottommost end may form a light shielding layer. The light shielding layer may be formed by screen printing a light shielding material on the outer side surface of the extension portion. In another embodiment, both the outer side surface and the bottom surface of the second lens sheet at the bottommost end may form a light shielding layer (refer to FIG. 3). The light shielding layer may be formed by printing the light shielding material on the outer side surface and the bottom surface of the second lens sheet at the bottommost end through a screen printing process.

It needs to be noted that in the above embodiment, the number of lens sheets of the first lens component 100 and the second lens component 200 can be adjusted as needed. For example, the number of lens sheets of the first lens component 100 and the second lens component 200 may be two and four, respectively, or may be three and three, respectively, or may be four and two, respectively, or may be five and one, respectively. The total number of lens sheets of the entire optical lens can also be adjusted as needed. For example, the total number of lens sheets of the optical lens can be six, or may be five or seven.

It also needs to be noted that in the optical lens of the present application, the lens components are not limited to two. For example, the number of lens components may also be a number of greater than two, such as three or four. When there are more than two lens components constituting the optical lens, two adjacent lens components may be regarded as the foregoing first lens component 100 and the foregoing second lens component 200, respectively. For example, when the number of lens components of the optical lens is three, the optical lens may include two first lens components 100 and one second lens component 200 located between the two first lens components 100, and all first lens sheets of the two first lens components 100 and all second lens sheets of the one second lens component 200 together constitute an imageable optical system for active calibration. When the number of lens components of the optical lens is four, the optical lens may include two first lens components 100 and two second lens components 200, and they are arranged from top to bottom in an order of a first lens component 100, a second lens component 200, a first lens component 100, and a second lens component 200, and all first lens sheets of the two first lens components 100 and all second lens sheets of the two second lens components 200 together constitute an imageable optical system for active calibration. Other variations like this will not be repeated one by one herein.

Further, in another embodiment of the present application, there is further provided a camera module based on the above-mentioned optical lens. The camera module includes an optical lens and a photosensitive assembly. The optical lens may be the optical lens in any one of the foregoing embodiments. This embodiment can effectively reduce the size of the camera module in the direction perpendicular to the optical axis, and at the same time, can also ensure the imaging quality of the camera module. The camera module may further include a motor (or other types of optical actuators), the optical lens may be mounted in a cylindrical carrier of the motor, and the base of the motor is mounted on the top surface of the photosensitive assembly. The photosensitive assembly may include, for example, a circuit board, a photosensitive chip mounted on the surface of the circuit board, an annular support formed or mounted on the surface of the circuit board and surrounding the photosensitive chip, and a color filter. The annular support may form a step, and the color filter is mounted on the step of the annular support. The base of the motor is mounted on the top surface of the annular support.

Further, according to an embodiment of the present application, there is provided an optical lens assembly method, the method comprising:

Step 10, a first lens component 100 and a second lens component 200 separated from each other are prepared, wherein the first lens component 100 includes a first lens barrel 110 and at least one first lens sheet mounted in the first lens barrel 110, and the second lens component 200 includes a second lens barrel 210 and at least one second lens sheet mounted in the second lens barrel 210. In this embodiment, the number of the first lens sheet is one. The number of the second lens sheets is five.

Figure 11A:
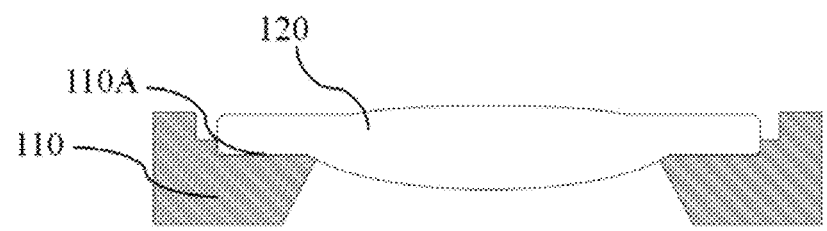
FIGS. 11A to 11B show a process of assembling a first lens component 100 in an embodiment of the present application.
Figure 11B:
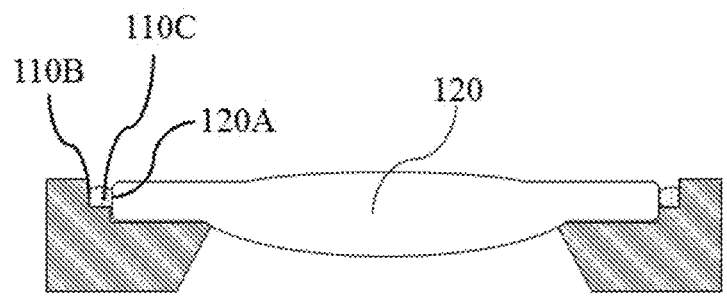
Figure 12A:
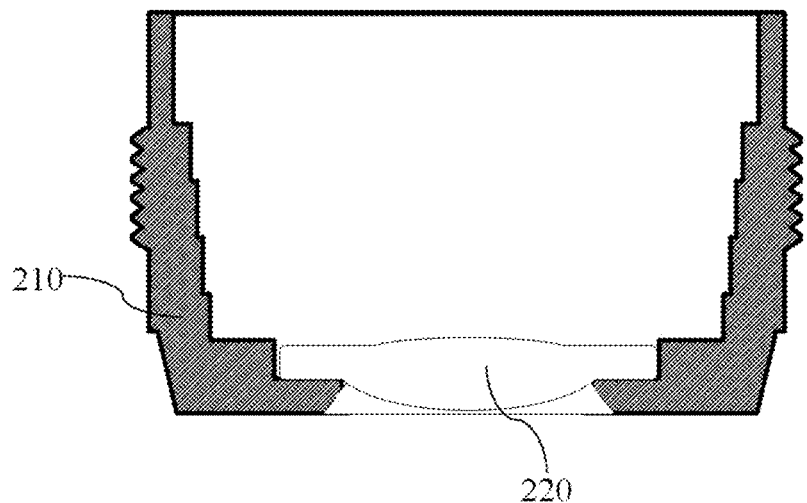
FIGS. 12A to 12D show a process of assembling a second lens component 200 in an embodiment of the present application.
Figure 12B:
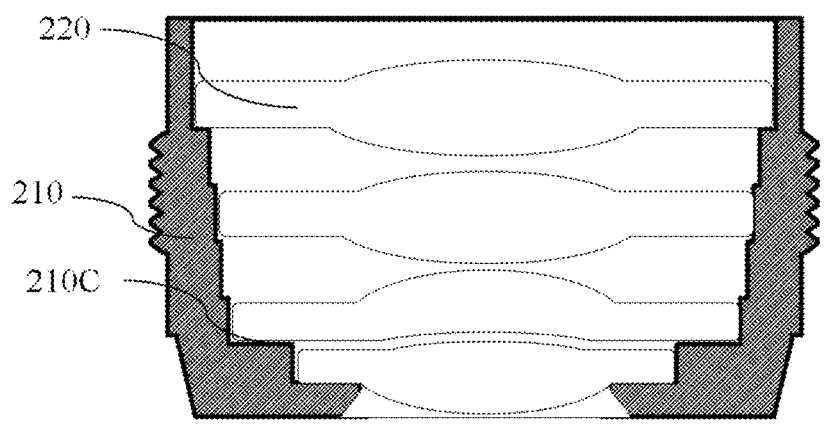
Figure 12C:
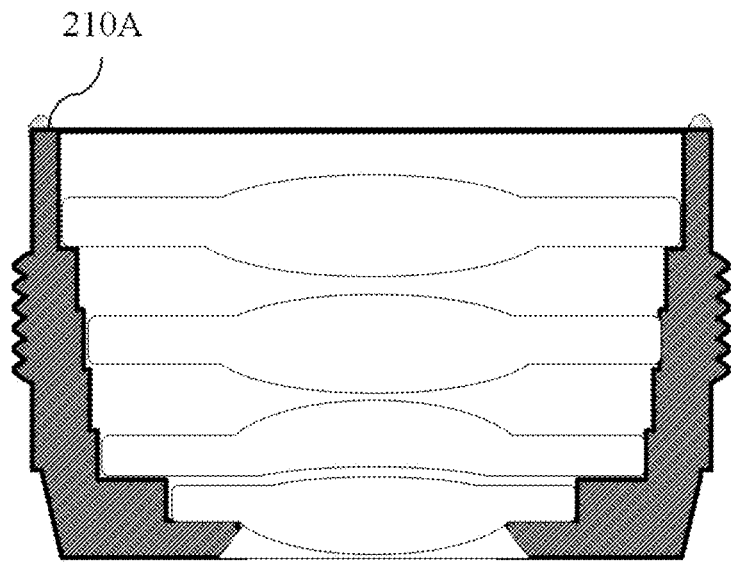
Figure 12D:
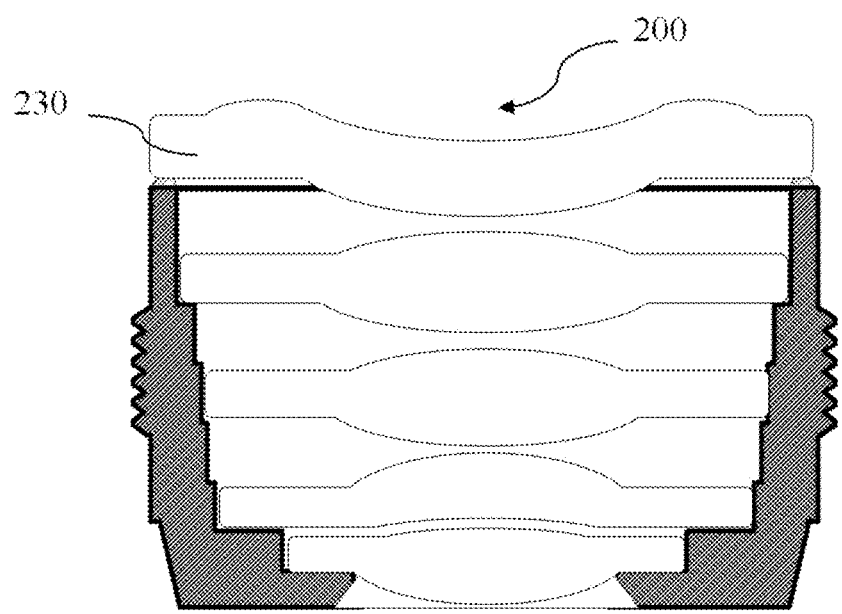

FIGS. 11A to 11B show a process of assembling the first lens component 100 in an embodiment of the present application. The process of assembling the first lens component 100 comprises: as shown in FIG. 11A, turning the first lens barrel 110 upside down, and embedding the first lens sheet 120 so that it bears against the step 110A on the inner side of the first lens barrel 110; and as shown in FIG. 11B, dispensing glue (e.g. adhesive glue 110C) in the gap (which may be an annular gap) between the inner side surface 110B of the first lens barrel 110 and the outer side surface 120A of the first lens sheet so as to fix the first lens sheet 120 to the inner side surface 110B of the first lens barrel. FIGS. 12A to 12D show a process of assembling the second lens component 200 in an embodiment of the present application. The process of assembling the second lens component 200 comprises: as shown in FIGS. 12A and 12B, turning the second lens barrel 210 upside down, and embedding four second lens sheets 220 into steps 210C on the inner side of the second lens barrel 210 one by one from small to large (this one-by-one embedding process can be completed by using the same process as the prior art); and as shown in FIG. 12C and FIG. 12D, dispensing glue on a surface 210A of the second lens barrel, and attaching a fifth second lens sheet 230 (i.e. the last second lens sheet) to the surface 210A of the second lens barrel.

In another embodiment, the fifth second lens sheet may adopt a structure with an extension portion, and at this time, the bottom surface of the second lens barrel may have a fitting groove. When assembling the second lens component, the first four second lenses are still firstly embedded one by one into the second lens barrel, and then the extension portion of the fifth second lens sheet is embedded into the fitting groove of the second lens barrel (refer to FIG. 8C). The groove and the extension portion can be adhered by a glue material.

Step 20, the first lens component 100 and the second lens component 200 are pre-positioned, so that the at least one second lens sheet and the at least one first lens sheet 120 together constitute an imageable optical system.

Step 30, the relative position of the first lens component 100 and the second lens component 200 is adjusted and determined based on active calibration.

Step 40, the first lens component 100 and the second lens component 200 are bonded by a glue material. In this step, the cured glue material is used to support and fix the first lens component 100 and the second lens component 200, so that the relative position of the first lens component 100 and the second lens component 200 is maintained at the relative position determined by the active calibration.

Figure 13A:
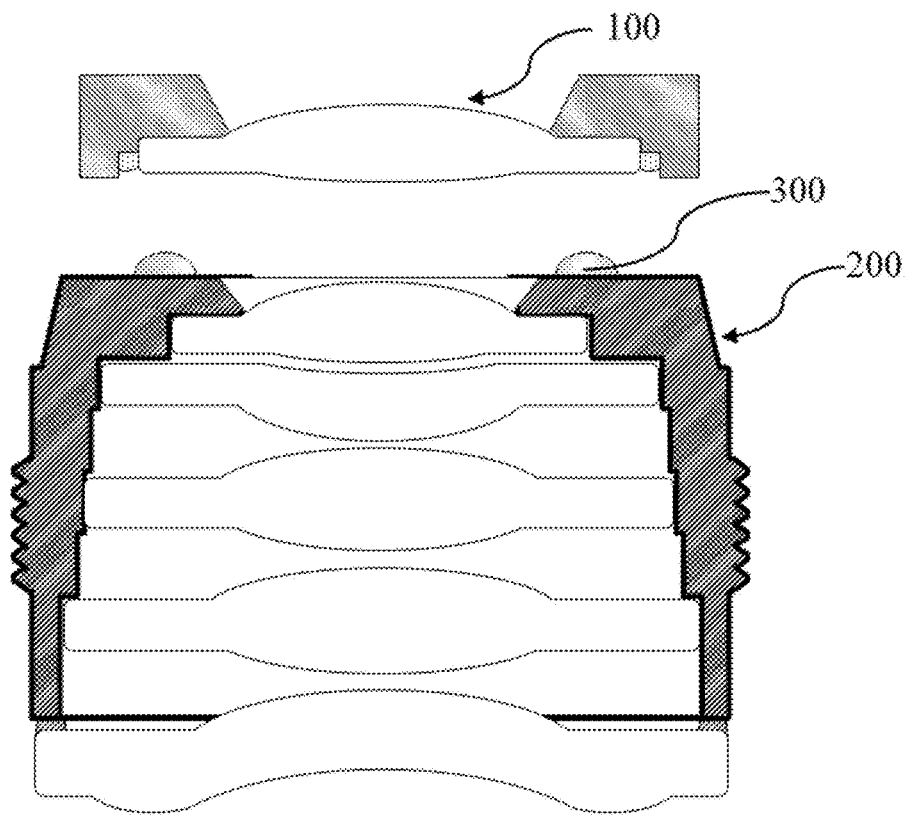
FIGS. 13A to 13B show an active calibration and bonding process according to an embodiment of the present application.
Figure 13B:
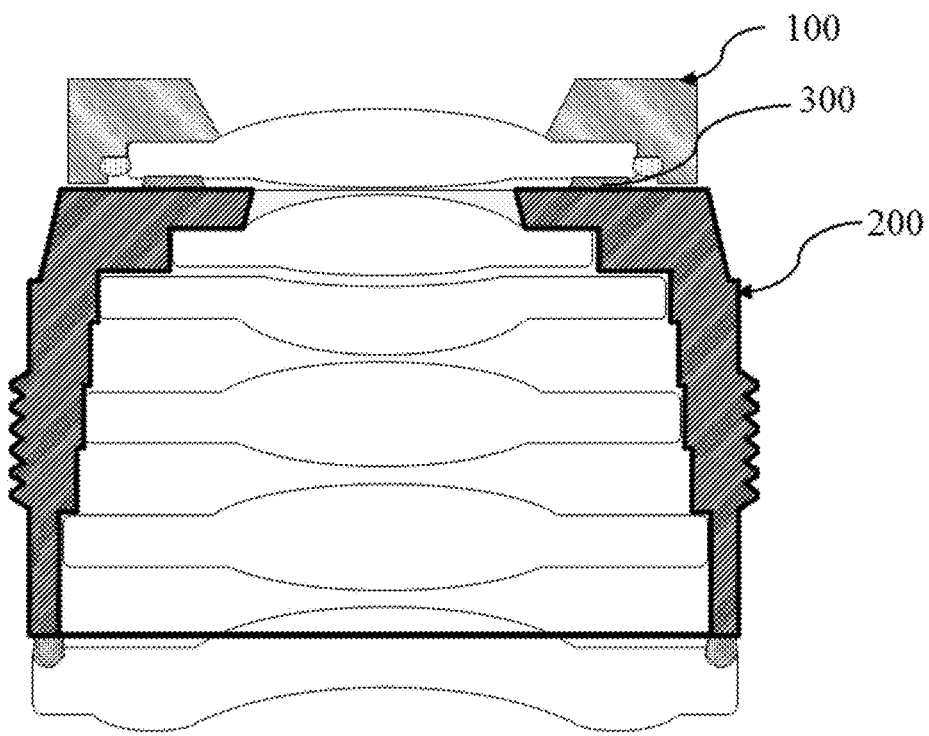

Further, FIGS. 13A to 13B show an active calibration and bonding process according to an embodiment of the present application. In an embodiment, before step 30 is performed, the glue material 300 may be applied in the gap between the first lens component 100 and the second lens component 200 (as shown FIG. 13A), and then step 30 is performed to adjust and determine the relative position of the first lens component 100 and the second lens component 200. After determining the relative position, step 40 is performed to cure the glue material 300, so that the cured glue material 300 is used to support the first lens component 100 and the second lens component 200, and thus the relative position of the first lens component 100 and the second lens component 200 is maintained at the relative position determined by the active calibration (as shown FIG. 13B). However, in another embodiment, step 30 may be performed first so as to adjust and determine the relative position of the first lens component 100 and the second lens component 200. After determining the relative position, the first lens component 100 (or the second lens component 200) is temporarily moved away, then the glue material is applied, and thereafter, the first lens component 100 (or the second lens component 200) is moved back based on the determined relative position. Finally, the glue material is cured so that the relative position of the first lens component 100 and the second lens component 200 is maintained at the relative position determined by the active calibration.

Figure 14A:
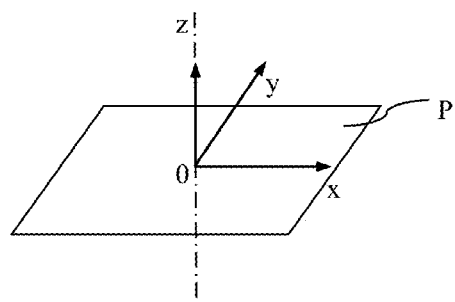
FIG. 14A shows the relative position adjustment manner in active calibration in an embodiment of the present application.

Further, the active calibration described in the present application can adjust the relative position of the first lens component 100 and the second lens component 200 in multiple degrees of freedom. FIG. 14A shows the relative position adjustment manner in the active calibration in an embodiment of the present application. In this adjustment manner, the first lens component 100 (or may be the first lens sheet 120) can be moved along x, y, and z directions relative to the second lens component 200 (that is, the relative position adjustment in this embodiment has three degrees of freedom). The z direction is a direction along the optical axis, and the x and y directions are directions perpendicular to the optical axis. The x and y directions are both in an adjustment plane P, and the translation in the adjustment plane P can be decomposed into two components in the x and y directions.

Figure 14B:
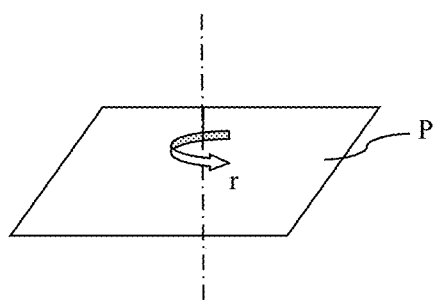
FIG. 14B shows rotation adjustment in the active calibration according to another embodiment of the present application.

FIG. 14B shows rotation adjustment in the active calibration according to another embodiment of the present application. In this embodiment, in addition to the three degrees of freedom in FIG. 14A, a degree of freedom in rotation is, i.e., an adjustment in a r direction, is also added to the relative position adjustment. In this embodiment, the adjustment in the r direction is rotation in the adjustment plane P, i.e. rotation around an axis perpendicular to the adjustment plane P.

Figure 14C:
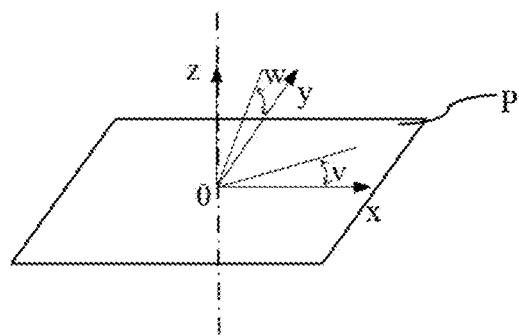
FIG. 14C shows the relative position adjustment manner in which adjustments in v and w directions are added in the active calibration according to further another embodiment of the present application.

Further, FIG. 14C shows the relative position adjustment manner in which adjustments in v and w directions are added in the active calibration according to further another embodiment of the present application. The v direction represents a rotation angle of an xoz plane, and the w direction represents a rotation angle of a yoz plane. The rotation angles of the v direction and the w direction can be combined into a vector angle, which represents the total tilt state. That is to say, by adjusting in the v and w directions, the tilt posture of the first lens component 100 relative to the second lens component 200 (i.e. tilt of the optical axis of the first lens component 100 relative to the optical axis of the second lens component 200) can be adjusted.

The adjustments in the six degrees of freedom of x, y, z, r, v, and w may all affect the imaging quality of the optical system (for example, affecting the size of the resolution). In other embodiments of the present application, the relative position adjustment manner may be to adjust only in any one of the above six degrees of freedom, or may be a combination of any two or more of them.

Further, in an embodiment, in the active calibration step, the movement further includes a translation in the adjustment plane, namely, the movement in the x and y directions.

Further, in an embodiment, the active calibration further comprises: adjusting and determining the included angle between the axis of the first lens component 100 and the axis of the second lens component 200 according to the measured resolution of the optical system, namely, the adjustment in the w and v directions. In the assembled optical lens or camera module, there may be a non-zero included angle between the axis of the first lens component 100 and the axis of the second lens component 200.

Further, in an embodiment, the active calibration further comprises: moving the first lens component in the direction perpendicular to the adjustment plane (i.e. adjustment in the z direction), and according to the measured resolution of the optical system (referring to the measured resolution obtained based on the actual imaging result of the optical system), determining the relative position between the first lens component and the second lens component in the direction perpendicular to the adjustment plane.

Further, in an embodiment, in the pre-positioning step (step 20), there is a gap between the bottom surface of the first lens component and the top surface of the second lens component; and in the bonding step (step 40), the glue material is arranged in the gap.

Further, in an embodiment, in the preparation step (step 10), the first lens component may not have a first lens barrel. For example, the first lens component may be composed of a single first lens sheet. In the pre-positioning step (step 20), there is a gap between the bottom surface of the first lens sheet and the top surface of the second lens component; and in the bonding step (step 40), the glue material is arranged in the gap. In this embodiment, the first lens sheet may be formed by a plurality of sub-lens sheets that are fitted with each other to form one body. In this embodiment, the side surface and the top surface of the non-optical surfaces of the first lens sheet that are not used for imaging may form a light shielding layer. The light shielding layer may be formed by screen printing a light shielding material on the side surface and the top surface of the first lens sheet.

In an embodiment, in the active calibration step, the second lens component can be fixed, the first lens component can be clamped by a clamper, and the first lens component can be moved under the drive of a six-axis motion mechanism connected with the clamper, thereby realizing the above-mentioned six degrees of freedom relative movement between the first lens component and the second lens component. The clamper can bear against or partially bear against the side surface of the first lens component, thereby clamping the first lens component.

Further, in an embodiment, before step 30 is performed, the glue material may be applied in the gap between the first lens component and the second lens component, and then step 30 is performed to adjust and determine the relative position of the first lens component and the second lens component. After determining the relative position, step 40 is performed to cure the glue material, so that the cured glue material is used to support the first lens component and the second lens component, and thus the relative position of the first lens component and the second lens component is maintained at the relative position determined by the active calibration. In another embodiment, step 30 may be performed first so as to adjust and determine the relative position of the first lens component and the second lens component. After determining the relative position, the first lens component (or the second lens component) is temporarily moved away, then the glue material is applied, and thereafter, the first lens component (or the second lens component) is moved back based on the determined relative position. Finally, the glue material is cured so that the relative position of the first lens component and the second lens component is maintained at the relative position determined by the active calibration.

In an embodiment, the glue material may be a UV thermosetting adhesive. In step 40, the second lens component is fixed on a platform, and the first lens component is picked up by using a pickup mechanism (e.g. a clamper), so that the relative position of the first lens component and the second lens component is maintained at the relative position determined by active calibration. Thereafter, the UV thermosetting adhesive is exposed so that it is pre-cured, and then the pickup mechanism (e.g. the clamper) is loosened. Since the pre-cured glue material supports the first lens component and the second lens component, the two are maintained in the relative position determined by the active calibration. Then, the first lens component and the second lens component combined together are baked so that the UV thermosetting adhesive is permanently cured, finally obtaining a finished optical lens. In another embodiment, the glue material may also include a thermosetting adhesive and a light curable adhesive (e.g. UV adhesive). It is pre-cured by exposing the light curable adhesive, and then the first lens component and the second lens component combined together are baked so that the thermosetting adhesive is permanently cured, finally obtaining a finished optical lens.

Further, according to an embodiment of the present application, there is further provided a camera module assembly method, comprising: assembling an optical lens by using the optical lens assembly method of any one of the foregoing embodiments, and then manufacturing a camera module by using the assembled optical lens.

Further, according to another embodiment of the present application, there is further provided another camera module assembly method, the method comprising:

Step 100, a first lens component and a camera module component are prepared, wherein the camera module component includes a second lens component and a photosensitive module combined together, the first lens component includes a first lens barrel and at least one first lens sheet mounted in the first lens barrel, and the second lens component includes a second lens barrel and at least one second lens sheet mounted in the second lens barrel. In this embodiment, the number of the first lens sheet is one. The number of the second lens sheets is five.

In an embodiment, the first lens component and the second lens component are assembled separately. A process of assembling the first lens component comprises: turning the first lens barrel upside down, and embedding the first lens sheet so that it bears against a step on the inner side of the first lens barrel; and dispensing glue in the gap between the inner side surface of the first lens barrel and the outer side surface of the first lens sheet (may be an annular gap) to fix the first lens sheet on the inner side of the first lens barrel. A process of assembling the second lens component comprises: turning the second lens barrel upside down, and embedding four second lens sheets into steps on the inner side of the second lens barrel one by one from small to large (this one-by-one embedding process can be completed by using the same process as the prior art); and dispensing glue on the surface of the second lens barrel, and attaching a fifth second lens sheet (i.e. the last second lens sheet) to the surface of the second lens barrel. After the second lens component is assembled, the second lens component and a photosensitive module are mounted together (for example, it can be mounted based on an HA process) to obtain the camera module component.

In another embodiment, the fifth second lens sheet may adopt a structure with an extension portion, and at this time, the bottom surface of the second lens barrel may have a fitting groove. When assembling the second lens component, the first four second lenses are still firstly embedded one by one into the second lens barrel, and then the extension portion of the fifth second lens sheet is embedded into the fitting groove of the second lens barrel. The groove 280 and the extension portion can be adhered by a glue material.

Step 200, the first lens component and the second lens component are pre-positioned, so that the at least one second lens sheet and the at least one first lens sheet together constitute an imageable optical system.

Step 300, the relative position of the first lens component and the second lens component is adjusted and determined based on active calibration.

Step 400, the first lens component and the second lens component are bonded by a glue material.

It can be seen that, compared with the previous embodiment, the second lens component and the photosensitive module in this embodiment are firstly assembled together to constitute the camera module component, and then the camera module component and the first lens component are assembled to obtain a complete camera module. The process of assembling the camera module component and the first lens component can also have many variants. For example, the foregoing multiple embodiments of the optical lens assembly method may be referred to so as to realize the assembly of the camera module component and the first lens component.

Figure 15:
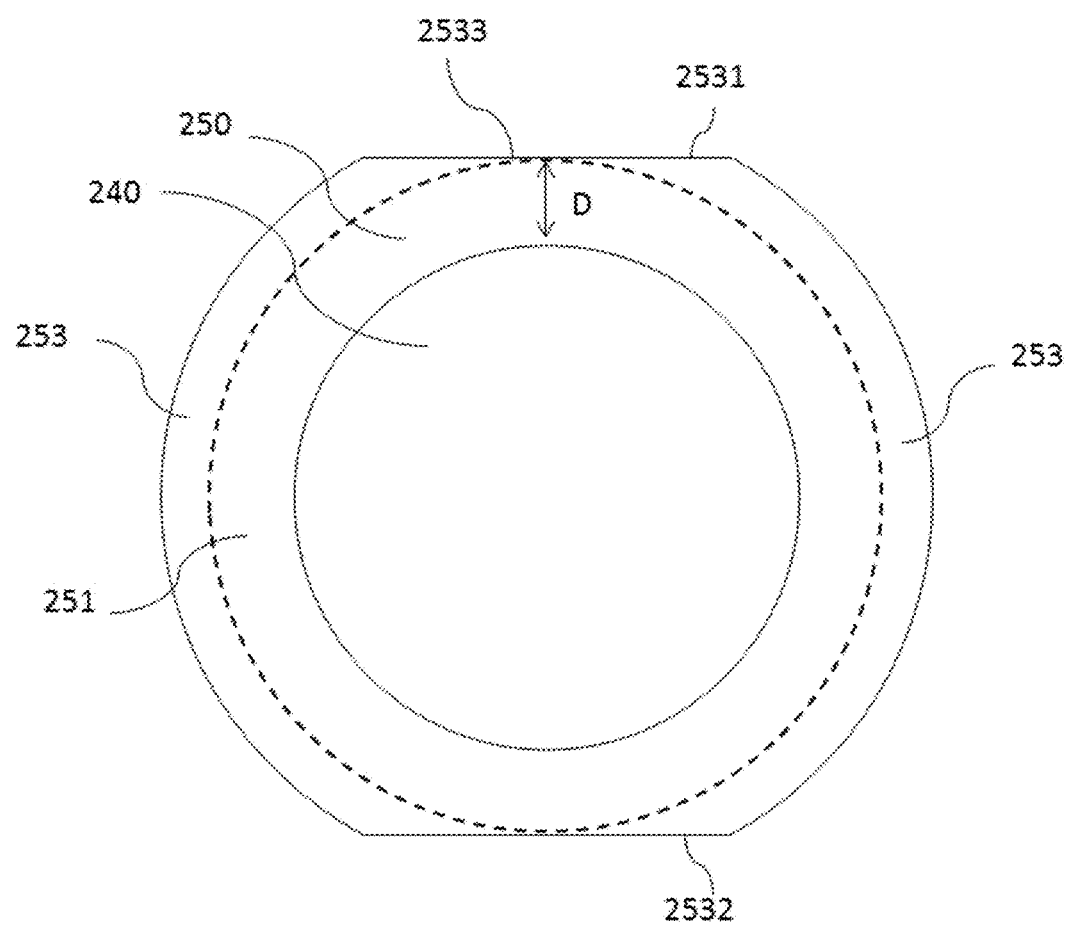
FIG. 15 shows a schematic top view of the second lens sheet at the bottommost end according to an embodiment of the present application.

Furthermore, in an embodiment, the second lens sheet at the bottommost end may have an extension portion, and the extension portion may be widened on the basis of the extension portion shown in FIG. 7. FIG. 15 shows a schematic top view of the second lens sheet at the bottommost end according to an embodiment of the present application. Referring to FIG. 15, it can be seen that the distance between two side surfaces 2531 and 2532 of the extension portion 253 in this embodiment is equal the diameter of the transition zone 251. In this way, when manufacturing the second lens sheet at the bottommost end, the required extension portion 253 can be made only by cutting twice, and cutting surfaces 2533 of the two cuttings are both flat. Therefore, the difficulty of manufacturing the second lens sheet at the bottommost end can be reduced, thereby improving the production efficiency. In an embodiment, when manufacturing the second lens sheet at the bottommost end as shown in FIG. 15, a semi-finished lens sheet can be firstly manufactured, and the diameter of the outer side surface of the structure zone of the semi-finished lens sheet is the same as the diameter of the outer side surface of the bottom surface of the second lens barrel. Then, the annular structural zone of the semi-finished lens sheet is cut twice at symmetrical positions, a necessary safety distance D is left between its cutting surface 2533 and the optical zone 240 of the semi-finished lens sheet, and the cutting surfaces of the two cuttings are both flat and parallel to each other, the distance from the cutting surface to the optical axis being the radius of the circular boundary line (shown by the dashed line in FIG. 15) between the transition zone and the extension portion. After the cutting is completed, the second lens sheet at the bottommost end shown in FIG. 15 is obtained. In other words, in this embodiment, the width of the transition zone can be a safety distance to avoid damage to the optical zone by the cutting action. Accordingly, the groove on the bottom surface of the second lens barrel in this embodiment is fitted with the extension portion shown in FIG. 15. In this embodiment, the inner side surface of a protruding portion at the bottom of the second lens barrel may be a flat surface so as to fit and bear against each other with the cutting surface shown in FIG. 15, thereby improving the stability and reliability of the assembly of the second lens sheet and the second lens barrel. The manufacturing process of the second lens sheet with the extension portion of this embodiment is simple and can improve the production efficiency. On the other hand, the width of the transition zone of this embodiment can be compressed to a small size (only a small necessary safety distance to avoid damage to the optical zone by the cutting action is provided). Thus, it is very helpful to reduce the size of the second lens barrel in the direction perpendicular to the optical axis, and at the same time, the yield required for mass production can also be ensured.

Figure 16:
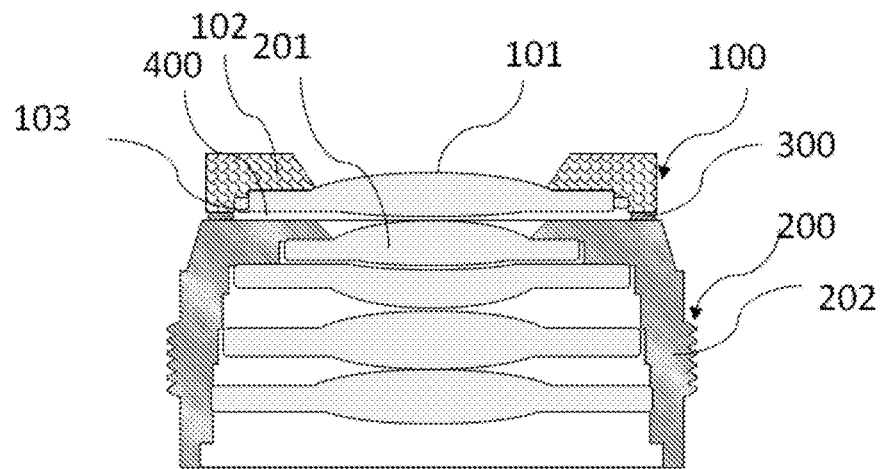
FIG. 16 shows a schematic cross-sectional view of an optical lens according to an embodiment of the present application.

FIG. 16 shows a schematic cross-sectional view of an optical lens according to an embodiment of the present application. The section is a section passing through the optical axis of the optical lens. In this embodiment, the optical lens includes a first lens component 100, a second lens component 200, and a first glue material 300. The first lens component 100 includes a first lens barrel 102 and a first lens sheet mounted in the first lens barrel 102. The first lens barrel 102 and the first lens sheet 101 are optionally connected by using adhesive glue 103. The second lens component 200 includes a second lens barrel 202 and four second lens sheets 201 mounted in the second lens barrel 202, the four second lens sheets 201 and the first lens sheet 101 together constitute an imageable optical system, and the first lens barrel 102 is made of a material different from the material of the second lens barrel 202. The first glue material 300 is located in a gap 400 between the first lens component 100 and the second lens component 200, and the first glue material 300 is adapted to support and fix the first lens sheet 101 and the second lens component 200 after being cured. In this embodiment, optionally, the first lens barrel 102 and the second lens barrel 202 are connected by the first glue material 300 so as to realize the connection of the first lens component 100 and the second lens component 200. The first glue material 300 may be adapted to support and fix the first lens sheet 101 and the second lens component 200, so that the relative position of the first lens sheet 101 and the second lens component 200 is maintained at the relative position determined by active calibration. The difference between a thermal expansion coefficient of the first lens barrel 102 and the thermal expansion coefficient of the first lens sheet 101 may be smaller than a first threshold. In this embodiment, the manufacturing material of the first lens barrel 102 is different from that of the second lens barrel 202, and the difference between the thermal expansion coefficient of the first lens barrel 102 and the thermal expansion coefficient of the first lens sheet 101 is smaller than the first threshold. The technical solution makes the thermal expansion coefficient keep basically the same between the first lens barrel 102 and the first lens sheet 101, which is helpful to reduce the difference between the state of the optical system after the first glue material 300 is cured and the state of the optical system determined by the active calibration, thereby ensuring the imaging quality of the lens or module. In this embodiment, the first lens sheet 101 and the first lens barrel 102 have approximately the same variation conditions, and thus have the same degree of variation under the same conditions, thereby reducing the change of the relative position, reducing the relative stress of the first lens sheet 101 and the first lens barrel 102, and avoiding the weakening of the structural strength. At the same time, when there is a variation, the first lens sheet 101 and the first lens barrel 102 may have the same or similar variation amount, which can also reduce the deterioration of the optical system caused by the variation. Exemplarily, since the first lens barrel 102 is annular, when the first lens barrel 102 is heated and expands, its inner side surface will expand from the outside to the inside. At the same time, the outer side surface of the first lens sheet 101 is heated to expand from the inside to the outside. Since the thermal expansion coefficient of the first lens barrel 102 is close to the thermal expansion coefficient of the first lens sheet 101 (the difference between the two is controlled within the first threshold), the amount of expansion of the inner side surface of the first lens barrel 102 from the outside to the inside is close to the amount of expansion of the outer side surface of the first lens sheet 101 from the inside to the outside. Thus, the two amounts of expansion can be subtracted (or eliminated) each other, thereby reducing the deformation of the first lens component due to heating (e.g. baking), which is helpful to reduce the difference between the state of the optical system after the first glue material 300 is cured and the state of the optical system determined by the active calibration, thereby ensuring the imaging quality of the lens or module.

In another embodiment, the first lens barrel 102 is made of a material with a lower moisture absorption rate than the second lens barrel 202. Herein, the moisture absorption rate may also be understood as water absorption rate. In this embodiment, the moisture absorption rate of the material of the first lens barrel 102 may be smaller than a corresponding threshold, which can reduce the shape variation or position shift of the first lens barrel 102 caused by moisture accumulation. Thus, it is helpful to reduce the difference between the state of the optical system after the glue material 300 is cured and the state of the optical system determined by the active calibration, thereby ensuring the imaging quality of the lens or module. However, the material of the second lens barrel 202 is still made of a traditional material such as polycarbonate (PC) material. In this way, the second lens component can still be manufactured by using traditional techniques, which is helpful to improve the product yield.

Further, in an embodiment, the first lens sheet 101 may optionally be a glass lens sheet. Since the glass lens sheet has a high refractive index, it is helpful to reduce the height of the optical lens or camera module. For example, the first lens sheet 101 made of a glass material reduces the height of the optical lens, which conforms to the current trend of thinner and thinner mobile phones.

Further, in an embodiment, the first lens barrel 102 has elasticity to buffer an action force of an external pickup mechanism on the first lens sheet 101. Here, the elasticity of the first lens barrel 102 can be understood as the elastic modulus of the material of the first lens barrel being smaller than that of the first lens sheet. The smaller the elastic modulus of the material, the more elastic the material is. In other words, the lower the elastic modulus, the greater the deformation of the material under the same stress conditions, and the better the flexibility of the material to deform.

Further, in a preferred embodiment, the difference between the thermal expansion coefficient of the first lens barrel 102 and the thermal expansion coefficient of the first lens sheet 101 is less than a first threshold, and the moisture absorption rate of the first lens barrel 102 is less than the moisture absorption rate of the second lens barrel 202.

Further, in a preferred embodiment, the difference between the thermal expansion coefficient of the first lens barrel 102 and the thermal expansion coefficient of the first lens sheet 101 is less than a first threshold, the moisture absorption rate of the first lens barrel 102 is less than the moisture absorption rate of the second lens barrel 202, and the material of the first lens barrel 102 also has elasticity for buffering the action force of the external pickup mechanism on the first lens sheet 101. In this embodiment, the first lens barrel 102 with elasticity is located between the first lens sheet 101 and the external pickup mechanism, and when the external pickup mechanism moves the first lens sheet 101, it can play a buffering effect, thereby suppressing the deformation of the optical surface of the first lens sheet 101 caused by the clamping of the external pickup mechanism.

On the basis of the foregoing embodiment, further, the number of the first lens sheet 101 may be smaller than the number of the second lens sheets 201, and the second lens sheet 201 is closer to the photosensitive chip than the first lens sheet 101. Further, in an embodiment, the number of the first lens sheet 101 is one, and the outer diameter of the first lens sheet 101 is larger than that of the second lens sheet 201 with the smallest outer diameter. In this embodiment, the outer diameter of the first lens sheet 101 is larger than the outer diameter of the smallest second lens sheet 201. The reason for adopting this technical solution is that the use of unconventional materials for the first lens barrel 102 may introduce additional tolerances. Therefore, the assembly tolerances are reduced by means of reducing the number of first lens sheet 101, designing a larger first lens sheet 101 and so on (because in general, the smaller the size, the more compact it is, the more difficult to control the tolerances), and the active calibration technique is used to compensate for the above assembly tolerances, thereby ensuring the overall imaging quality of the optical lens or module.

Further, in some embodiments, the second lens barrel 202 may be made of a traditional material such as polycarbonate (PC). In this way, the second lens component can still be manufactured by using traditional processes, which is helpful to increase the product yield and increase production efficiency.

Figure 17:
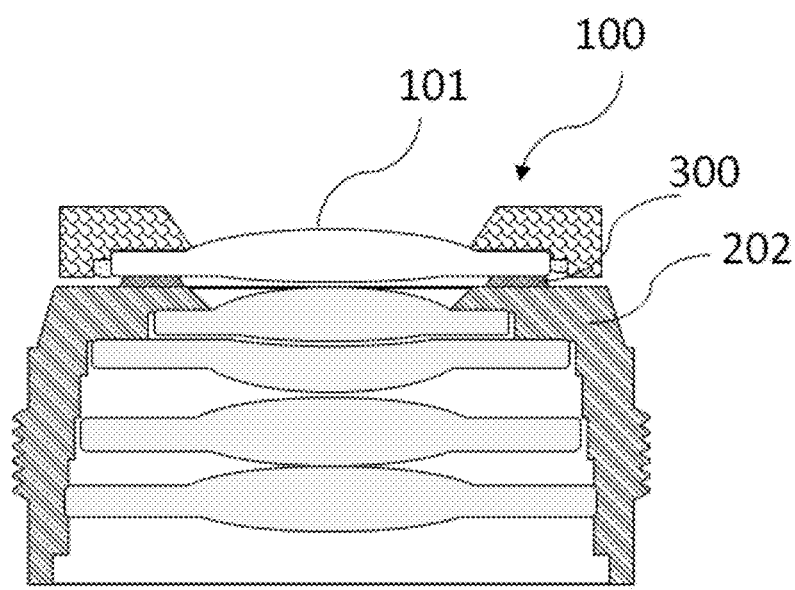
FIG. 17 shows a schematic cross-sectional view of an optical lens according to another embodiment of the present application.

Further, FIG. 17 shows a schematic cross-sectional view of an optical lens according to another embodiment of the present application. The section is a section passing through the optical axis of the optical lens. In this embodiment, the first glue material 300 is located between the first lens sheet 101 and the second lens barrel 202, and there is no filling between the first lens barrel 102 and the second lens barrel 202. Unlike FIG. 16 where the first glue material 300 is located between the first lens barrel 102 and the second lens barrel 202, it is located between the first lens sheet 101 and the second lens barrel 202. This embodiment can help the state of the optical system of the finished optical lens (or camera module) to be closer to the state determined in the active calibration stage for the following reasons: in the active calibration stage, the external clamper clamps the first lens barrel 102 to pick up and move the first lens component 100, and the first lens barrel 102 with elasticity can buffer the action force of the clamper on the first lens sheet 101 and prevent the first lens sheet 101 from deforming, and further prevent the optical system state from being inconsistent between the active calibration stage (at this time, the first lens component 100 is clamped by the clamper) and the stage after the first glue material 300 is cured (at this time, the first lens component 100 is not clamped by the clamper). Further, the deformation of the first lens barrel 102 with elasticity itself may affect the state of the optical system, and the first lens sheet 101 and the second lens barrel 202 are connected by the first glue material 300 so that the defect can be effectively avoided.

Figure 18:
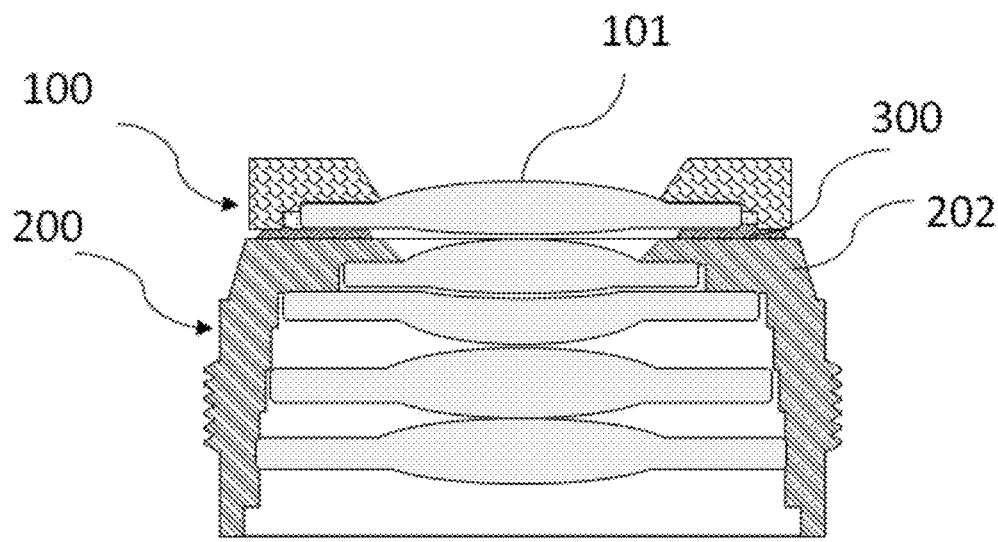
FIG. 18 shows a schematic cross-sectional view of an optical lens according to further another embodiment of the present application.

Further, FIG. 18 shows a schematic cross-sectional view of an optical lens according to still another embodiment of the present application. The section is a section passing through the optical axis of the optical lens. This embodiment is basically the same as the embodiment of FIG. 16, except that the first glue material 300 is located between the first lens barrel 102 and the second lens barrel 202, and between the first lens sheet 101 and the second lens barrel 202.

Further, in another embodiment of the present application, thee is further provided a camera module based on the above-mentioned optical lens. The camera module includes an optical lens and a photosensitive assembly. The optical lens may be the optical lens in any one of the foregoing embodiments. This embodiment can reduce the secondary variation of the optical system of the camera module after the active calibration is completed, thereby ensuring the imaging quality of the camera module, and improving the yield in mass production. In some embodiments, the camera module may further include a motor (or other types of optical actuators), the optical lens may be mounted in a cylindrical carrier of the motor, and the base of the motor is mounted on the top surface of the photosensitive assembly. The photosensitive assembly may include, for example, a circuit board, a photosensitive chip mounted on the surface of the circuit board, an annular support formed or mounted on the surface of the circuit board and surrounding the photosensitive chip, and a color filter. The annular support may form a step, and the color filter is mounted on the step of the annular support. The base of the motor is mounted on the top surface of the annular support.

According to an embodiment of the present application, there is further provided an optical lens assembly method, comprising:

Step S10, a preparation step. The first lens component 100 and the second lens component 200 separated from each other are prepared. The first lens component 100 includes a first lens barrel 102 and a first lens sheet 101 mounted in the first lens barrel 102; and the second lens component 200 includes a second lens barrel 202 and four second lens sheets 201 mounted in the second lens barrel 202. The four second lens sheets 201 and the first lens sheet 101 together constitute an imageable optical system, and the first lens barrel 102 is made of a material different from that of the second lens barrel 202.

Step S20, a pre-positioning step. The first lens component 100 and the second lens component 200 are pre-positioned, so that the first lens sheet 101 and the at least one second lens sheet 201 together constitute an imageable optical system.

Step S30, an active calibration step. The relative position of the first lens component 100 and the second lens component 200 is adjusted and determined based on active calibration.

Step S40, a bonding step. The first lens component 100 and the second lens component 200 are bonded by a first glue material 300. The first glue material 300 is located in a gap between the first lens component 100 and the second lens component 200. After the first glue material 300 is cured, the first lens component 100 and the second lens component 200 are fixed and maintained at the relative position determined by the active calibration.

In this embodiment, the first lens sheet 101 can be protected by selecting an appropriate material of the first lens barrel 102, so as to reduce the secondary variation of the shape and position of the first lens sheet 101 after the active calibration is completed. Specifically, the secondary variation refers to the change of the optical system after baking and curing relative to the optical system determined by the active calibration.

Further, the active calibration described in the present application can adjust the relative position of the first lens component 100 and the second lens component 200 in multiple degrees of freedom. FIG. 21A shows the relative position adjustment manner in the active calibration in an embodiment of the present application. In this adjustment manner, the first lens component 100 (or may be the first lens sheet 101) can be moved along x, y, and z directions relative to the second lens component 200 (that is, the relative position adjustment in this embodiment has three degrees of freedom). The z direction is a direction along the optical axis, and the x and y directions are directions perpendicular to the optical axis. The x and y directions are both in an adjustment plane P, and the translation in the adjustment plane P can be decomposed into two components in the x and y directions.

FIG. 21B shows rotation adjustment in the active calibration according to another embodiment of the present application. In this embodiment, in addition to the three degrees of freedom in FIG. 21A, a degree of freedom in rotation is, i.e., an adjustment in a r direction, is also added to the relative position adjustment. In this embodiment, the adjustment in the r direction is rotation in the adjustment plane P, i.e. rotation around an axis perpendicular to the adjustment plane P.

Figure 21C:
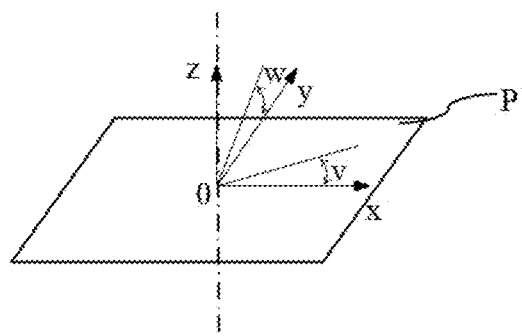
FIG. 21C shows the relative position adjustment manner in which adjustments in v and w directions are added in the active calibration according to further another embodiment of the present application.

Further, FIG. 21C shows the relative position adjustment manner in which adjustments in v and w directions are added in the active calibration according to further another embodiment of the present application. The v direction represents a rotation angle of an xoz plane, and the w direction represents a rotation angle of a yoz plane. The rotation angles of the v direction and the w direction can be combined into a vector angle, which represents the total tilt state. That is to say, by adjusting in the v and w directions, the tilt posture of the first lens component 100 relative to the second lens component 200 (i.e. tilt of the optical axis of the first lens component 100 relative to the optical axis of the second lens component 200) can be adjusted.

The adjustments in the six degrees of freedom of x, y, z, r, v, and w may all affect the imaging quality of the optical system (for example, affecting the size of the resolution). In other embodiments of the present application, the relative position adjustment manner may be to adjust only in any one of the above six degrees of freedom, or may be a combination of any two or more of them.

Further, in an embodiment, in the active calibration step, the movement further includes a translation in the adjustment plane, namely, the movement in the x and y directions.

Further, in an embodiment, the active calibration further comprises: adjusting and determining the included angle between the axis of the first lens component 100 and the axis of the second lens component 200 according to the measured resolution of the optical system, namely, the adjustment in the w and v directions. In the assembled optical lens or camera module, there may be a non-zero included angle between the axis of the first lens component 100 and the axis of the second lens component 200.

Further, in an embodiment, the active calibration further comprises: moving the first lens component 100 in the direction perpendicular to the adjustment plane (i.e. adjustment in the z direction), and according to the measured resolution of the optical system, determining the relative position between the first lens component 100 and the second lens component 200 in the direction perpendicular to the adjustment plane.

Further, in an embodiment, in the pre-positioning step, there is a gap between the bottom surface of the first lens component 100 and the top surface of the second lens component 200; and in the bonding step, the glue material is arranged in the gap.

In an embodiment, in the active calibration step, the second lens component 200 can be fixed, the first lens component 100 can be clamped by a clamper, and the first lens component 100 can be moved under the drive of a six-axis motion mechanism connected with the clamper, thereby realizing the above-mentioned six degrees of freedom relative movement between the first lens component 100 and the second lens component 200. The clamper can bear against or partially bear against the side surface of the first lens component 100, thereby clamping the first lens component 100.

Figure 19A:
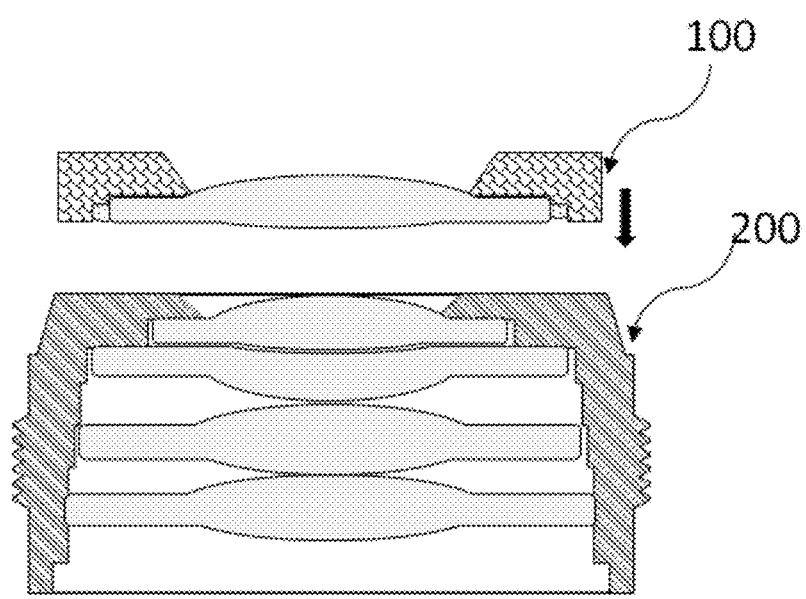
FIGS. 19A to 19G show an optical lens assembly method in an embodiment of the present application.
Figure 19B:
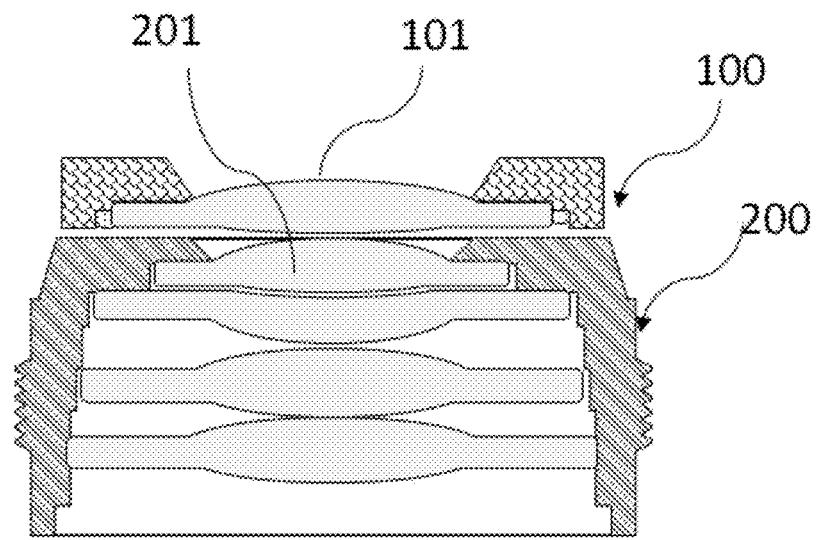
Figure 19C:
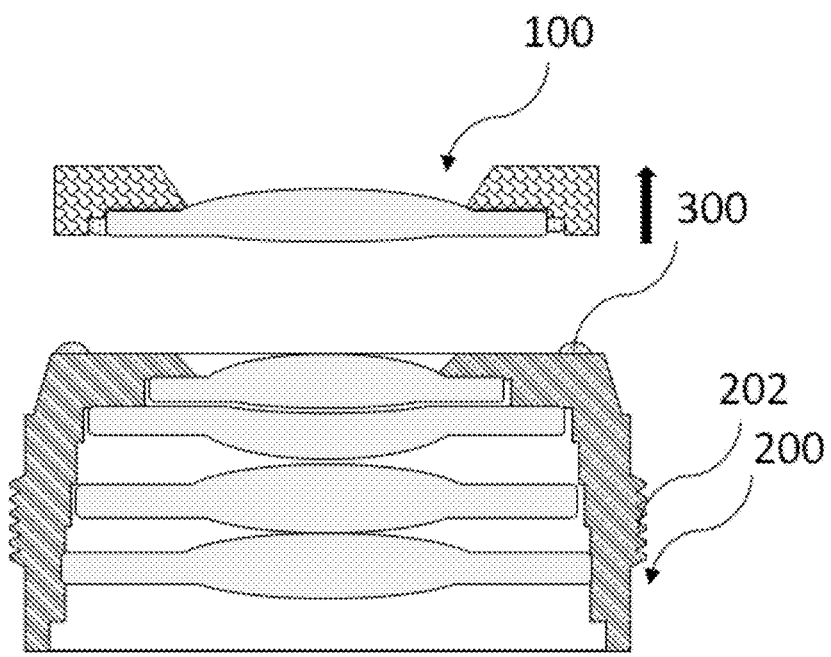
Figure 19D:
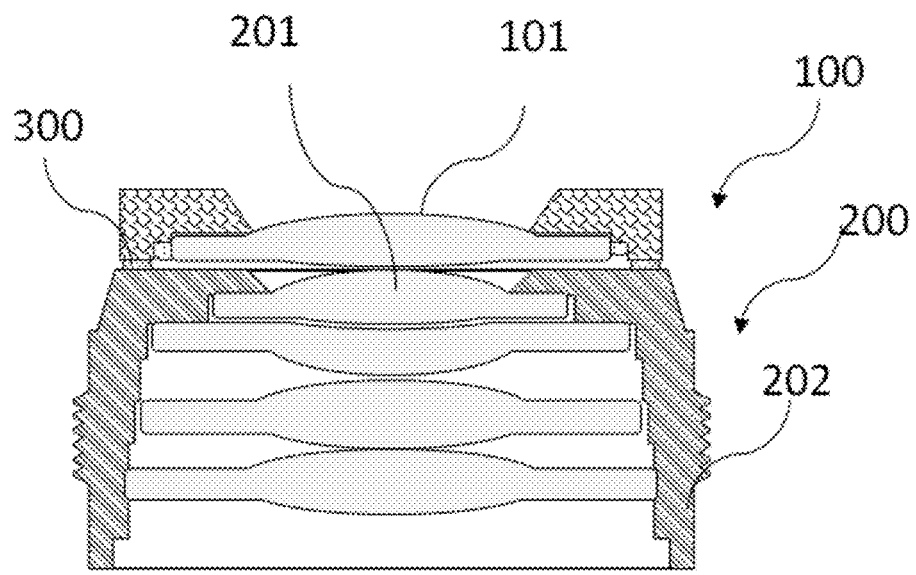
Figure 19E:
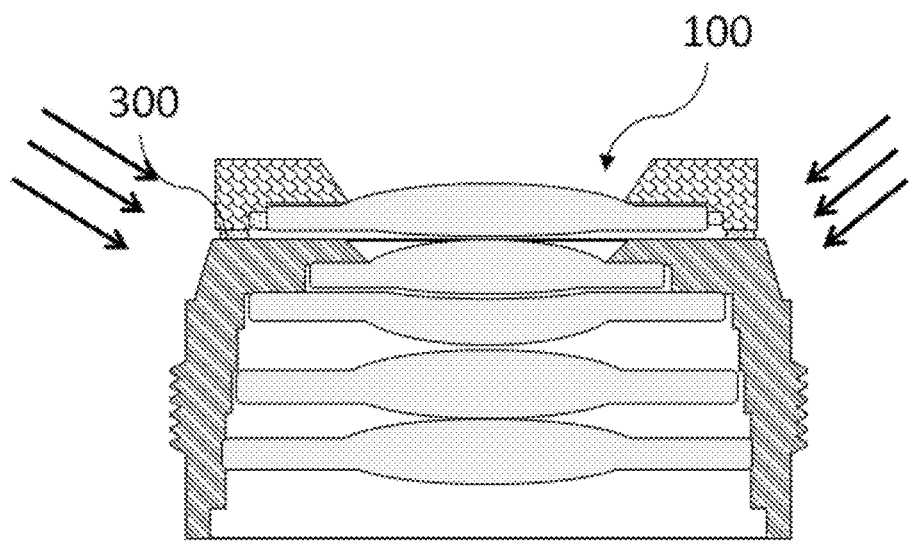
Figure 19F:
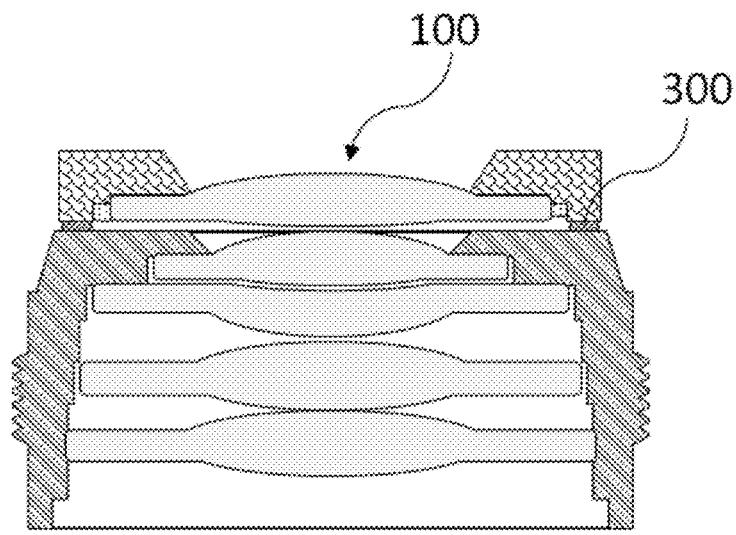

Further, FIGS. 19A to 19G show an optical lens assembly method in an embodiment of the present application. FIG. 19A shows the first lens component 100 and the second lens component 200 in a separated state, and the direction indicated by the arrow shows the moving direction of the first lens component 100. FIG. 19B shows a schematic view of performing pre-positioning and active calibration of the first lens component 100 and the second lens component 200. Specifically, the first lens component 100 and the second lens component 200 are pre-positioned, so that the first lens sheet 101 and the four second lens sheets 201 together constitute an imageable optical system; and six-axis coordinates of the first lens component 100 are adjusted by an external pickup mechanism so that the measured imaging quality reaches a standard (for example, the measured resolution reaches a threshold), and then a six-axis coordinate position of the first lens component 100 that makes the imaging quality reach the standard is recorded. FIG. 19C shows a schematic view of painting glue on the top surface of the second lens barrel 202 after the active calibration. Specifically, after the active calibration is completed, the first lens component 100 is moved away, and then a first glue material 300 is painted on the top surface of the second lens barrel 202 of the second lens component 200 for the connection of the first lens component 100 and the second lens component 200. The arrow in the figure indicates that the first lens component 100 is moved away. FIG. 19D shows after the first glue material 300 is painted on the top surface of the second lens barrel 202 of the second lens component 200, the external pickup mechanism restores the first lens component 100 to the calibration position according to the six-axis coordinate position determined by the active calibration (i.e. the recorded six-axis coordinate position). FIG. 19E shows a pre-curing process. Specifically, after the first lens component 100 is moved to the calibration position, the first glue material 300 is exposed, and the first glue material 300 is pre-cured. In the exposure process, the external pickup mechanism holds the first lens component 100 at the calibration position. The arrow in FIG. 19E indicates light for exposure of the first glue material 300. FIG. 19F shows a state after the first glue material 300 is cured.

Figure 19G:
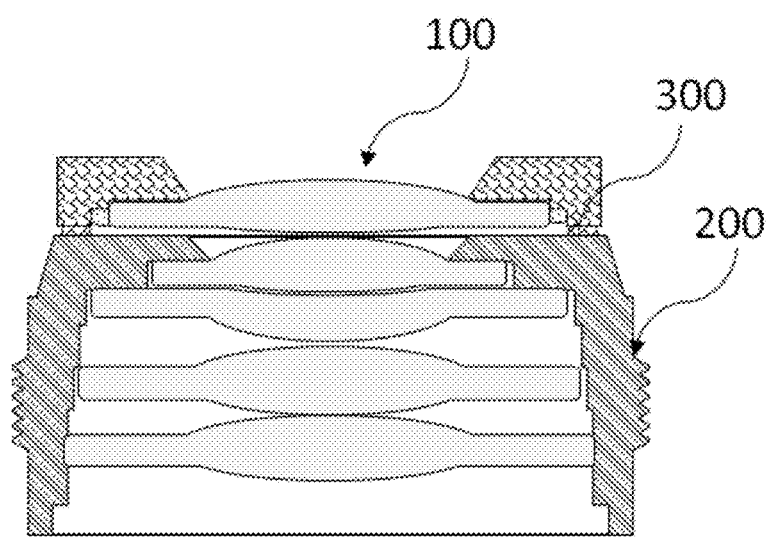

After exposure, the external pickup mechanism is moved away, and the first lens component 100 is supported and fixed by the pre-cured first glue material 300 to maintain at the calibration position. FIG. 19G shows a state after permanent curing. The optical lens sheets after the first glue material 300 is pre-cured are baked so that permanent curing may be realized. In FIG. 19G, the first glue material 300 is baked and then permanently connects the first lens component 100 and the second lens component 200, and is maintained at the active calibration position shown in FIG. 19B.

In this embodiment, the first glue material 300 is painted between the top surface of the second lens barrel 202 and the bottom surface of the first lens barrel 102, wherein a gap is maintained between the first lens sheet 101 and the second lens barrel 202; optionally, the first glue material 300 may also be painted between the bottom surface of the first lens sheet 101 and the top surface of the second lens barrel 202, wherein a gap is maintained between the first lens barrel 102 and the second lens barrel 202; and optionally, the first glue material 300 may also be painted between the first lens barrel 102 and the top surfaces of the second lens barrel 202 and between the bottom surface of the first lens sheet 101 and the top surface of the second lens barrel 202.

Figure 20A:
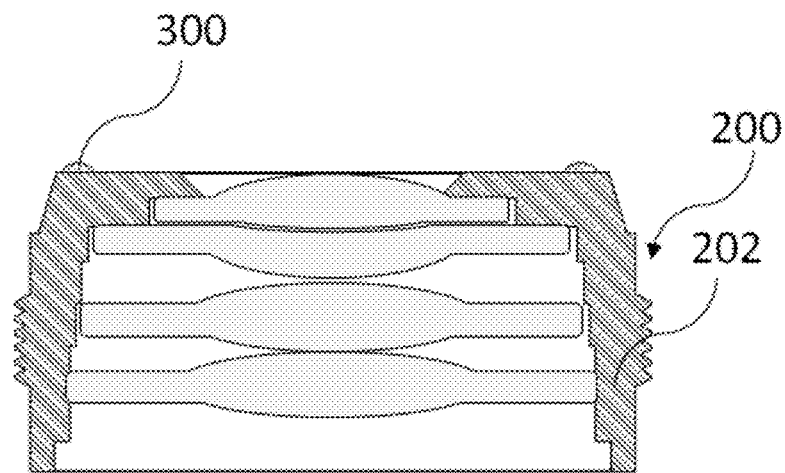
Figure 20B:
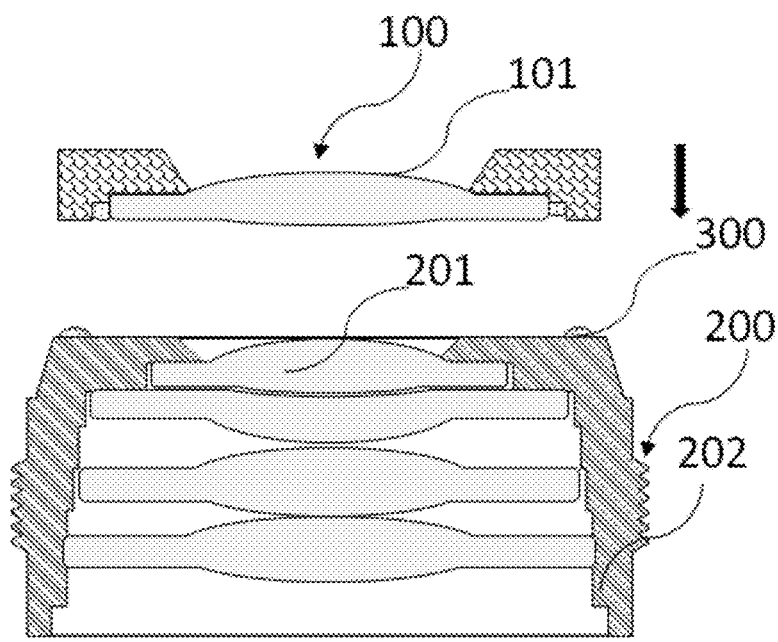
Figure 20C:
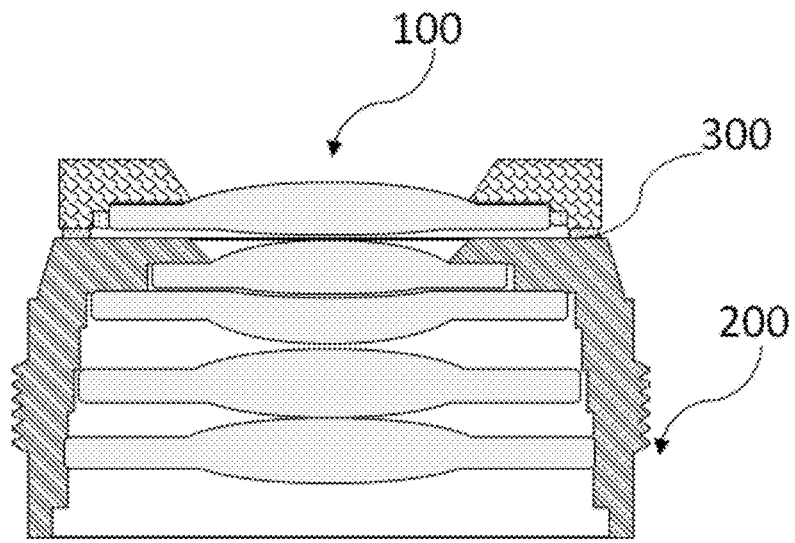
Figure 20D:
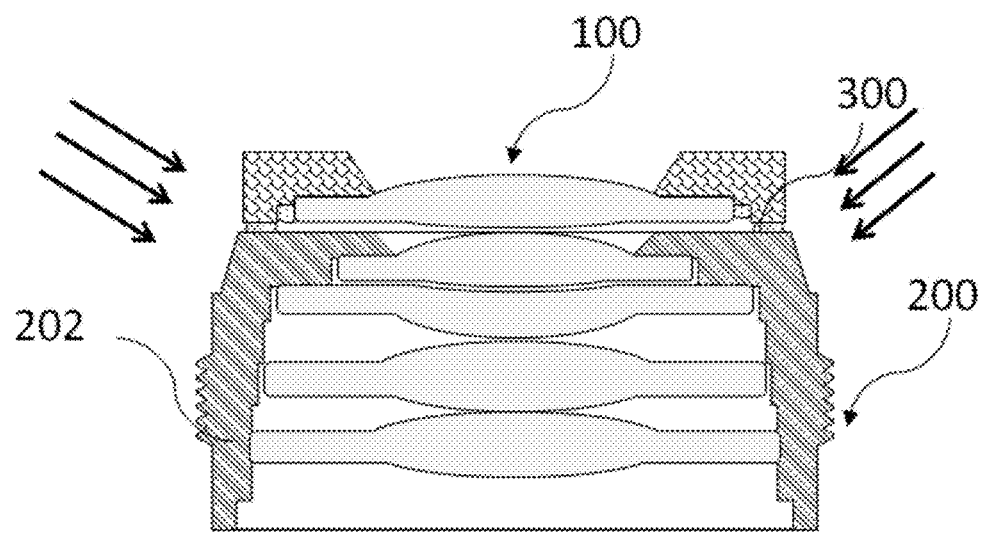

Further, FIGS. 20A to 20F show an optical lens assembly method in another embodiment of the present application. FIG. 20A shows a schematic view of the top surface of the second lens barrel 202 of the second lens component 200 with the first glue material 300, wherein the first glue material 300 is painted on the top surface of the second lens barrel 202 of the second lens component 200 for the connection of the first lens component 100 and the second lens component 200. FIG. 20B shows a schematic view of clamping and moving the first lens component 100 for pre-positioning, wherein after the first glue material 300 is painted on the top surface of the second lens barrel 202 of the second lens component 200, the active calibration is used to pre-position the first lens component 100 and the second lens component 200, so that the first lens sheet 101 and the at least one second lens sheet 201 together constitute an imageable optical system; and six-axis coordinates of the first lens component 100 are adjusted by an external pickup mechanism so that the measured imaging quality reaches a standard (for example, the measured resolution reaches a threshold), and thereby the first lens component 100 is moved to a six-axis coordinate position that makes the imaging quality reach the standard. The direction indicated by the arrow shows a moving direction of the first lens component 100. FIG. 20C shows a schematic view of using active calibration to move the first lens component 100 to a calibration position. In this schematic view, a first glue material 300 is contained between the first lens component 100 and the second lens component 200 and is maintained at the calibration position by using the external pickup mechanism. FIG. 20D shows a schematic view of exposing the first glue material 300 so that it is pre-cured, wherein after the first lens component 100 is moved to the first glue material 300 painted on the top surface of the second lens barrel 202 of the second lens component 200, while being maintained at the calibration position, the first glue material 300 is exposed, and the first glue material 300 is pre-cured, thereby maintaining the first lens component 100 at the calibration position. FIG. 20E shows a state after the first glue material 300 is cured. After the first glue material 300 is exposed, the external pickup mechanism is moved away, and the first lens component 100 is maintained at the calibration position. FIG. 20F shows a state after permanent curing. The optical lens sheets where the first glue material 300 is pre-cured are baked so that permanent curing may be realized. In FIG. 20F, the first glue material 300 is baked and then permanently connects the first lens component 100 and the second lens component 200, and is maintained at the active calibration position shown in FIG. 20C.

In this embodiment, the first glue material 300 is painted between the top surface of the second lens barrel 202 and the bottom surface of the first lens barrel 102, wherein a gap is maintained between the first lens sheet 101 and the second lens barrel 202; optionally, the first glue material 300 may also be painted between the bottom surface of the first lens sheet 101 and the top surface of the second lens barrel 202, wherein a gap is maintained between the first lens barrel 102 and the second lens barrel 202; and optionally, the first glue material 300 may also be painted between the first lens barrel 102 and the top surface of the second lens barrel 202 and between the bottom surface of the first lens sheet 101 and the top surface of the second lens barrel 202.

Further, according to an embodiment of the present application, there is further provided a camera module assembly method, comprising: assembling an optical lens by using the optical lens assembly method of any one of the foregoing embodiments, and then manufacturing a camera module by using the assembled optical lens.

Furthermore, the applicant made further analysis on the thermal expansion coefficient, moisture absorption rate and elastic modulus of various materials, and based on the analysis, obtained a series of preferred embodiments.

The moisture absorption rate may also be called water absorption rate, and it represents the ability of the material to absorb water under standard atmospheric pressure. Table 1 gives water absorption rates of some plastic materials.

TABLE 1

| Material name | Water absorption rate (%) |
|---|---|
| PC (Polycarbonate) | 0.3 |
| LCP (Liquid Crystal Polymer) | 0.2 |
| FR-PET (fiberglass reinforced polyethylene terephthalate) | 0.1 |
| POLIYIMSE (PI) (Polyimide,) | 0.1 |
| PBT (Polybutylene terephthalate) | 0.1-0.25 |
| PE (polyethylene) | 0.01 |
| PP (Polypropylene) | 0.01 |
| PPO (NORYL) (modified polyphenylene ether polymer, Polyphenylene oxide) | 0.14 |
| PEI (Polyetherimide) | 0.25 |
| AS (SAN) (Acrylonitrile-styrene copolymer, AS resin) ((AS and SAN are different abbreviated names for the same substance) | 0.2-0.3 |

Referring to Table 1, in some embodiments of the present application, a material with a water absorption rate of smaller than 0.3%, such as LCP, FR-PET, PI, PBT, PE, PP, PPO, PEI or AS, may be used for the first lens barrel. In addition, since the water absorption rates of metal materials are generally smaller than 0.3%, the first lens barrel may also be made of a metal material. The first lens barrel is made of a material with a water absorption rate of smaller than 0.3%, and the shape variation or position shift of the first lens barrel due to accumulation of moisture may be reduced, which is helpful to reduce the difference between the state of the optical system after the first glue material is cured and the state of the optical system determined by the active calibration, thereby ensuring the imaging quality of the lens or module. However, the material of the second lens barrel 202 is still made of a traditional material such as PC material. In this way, the second lens component can still be manufactured by using traditional processes, which is helpful to increase the product yield and increase production efficiency.

Herein, the polymer materials and metal materials involved are isotropic in three dimensions, so the thermal expansion coefficients are all linear expansion coefficients.

In an embodiment of the present application, the first lens sheet may be made of a glass material, and the first lens barrel is made of a metal material.

Generally speaking, the thermal expansion coefficient of the glass material is, for example, $(5.8 \sim 150) \times 10^{-7}/° C$.

The thermal expansion coefficients of some common industrial metal materials are as follows:
copper: $1.7 \times 10^{-5}/° C$.,
aluminum: $2.3 \times 10^{-5}/° C$.,
iron: $1.2 \times 10^{-5}/° C$., and
general carbon steel: $1.3 \times 10^{-5}/° C$.

Glass has a smaller thermal expansion coefficient than plastic, and metal lens barrels generally have a smaller thermal expansion coefficient than plastic. Therefore, the use of the combination of glass lens sheets and metal lens barrels is helpful to reduce the deformation of the first lens component due to heating (e.g. baking), and because the metal lens barrel has a smaller water absorption rate, it can also reduce the shape variation or position shift of the first lens barrel caused by moisture accumulation.

Further, in a preferred embodiment of the present application, oxygen-free copper may be used as the material of the first lens barrel. The thermal expansion coefficient of oxygen-free copper is: $1.86 \times 10^{-7}/° C$., and borosilicate glass is used as the first lens sheet material. The thermal expansion coefficient of borosilicate glass is: $(3.3 \pm 0.1) \times 10^{-6}/° C$. The thermal expansion coefficients of the two materials are close, which can reduce the deformation of the first lens component due to heating (e.g. baking). Moreover, because oxygen-free copper has a small water absorption rate, this embodiment can also reduce the shape variation or position shift of the first lens barrel caused by moisture accumulation. Therefore, the solution of this embodiment is very helpful to reduce the difference between the state of the optical system after the first glue material is cured and the state of the optical system determined by the active calibration, thereby ensuring the imaging quality of the lens or module.

In another embodiment of the present application, both the first lens sheet and the first lens barrel are made of plastic materials. The first lens barrel may be made of a first plastic, and the first lens sheet may be made of a second plastic. The difference between the thermal expansion coefficients of the first plastic and the second plastic is, for example, within $4 \times 10^{-5}/° C$.

Commonly used plastic lens sheet materials include: PC or PMMA (polymethylmethacrylate), and PMMA is commonly known as plexiglass or acrylic.

The thermal expansion coefficient of PMMA is: $7 \times 10^{-5}/° C$., and the thermal expansion coefficient of PC is: $(6.5 \sim 6.6) \times 10^{-5}/° C$.

Sometimes, the lens sheet can also be made of a resin material, such as CR-39 (propylene diethylene glycol carbonate, also known as Columbia resin or ADC resin), the thermal expansion coefficient of which is $9 \times 10 \times 10^{-5}/° C$.

Table 2 further shows thermal expansion coefficients of some plastics.

TABLE 2

| Material name | Linear expansion coefficient ($°C.^{-1}$) |
|---|---|
| PE (medium density) | $10 \times 10^{-5}$ |
| PC | $(5 \sim 7) \times 10^{-5}$ |
| PBT | $110 -5$ |

TABLE 2-continued

| Material name | Linear expansion coefficient (°C.$^{-1}$) |
| --- | --- |
| PE (high density) | $22 \times 10^{-5}$; |
| PPO (NORYL) | $0.7 \times 10^{-5}$ |
| PP polypropylene | $(5.8 \sim 10.2)10^{-5}$ |
| PEI | $5.6 \times 10^{-5}$ |

In Table 2, the symbol "^" means power, for example, "10^-5" means "$10^{-5}$".

Further, in some embodiments of the present application, the material of the first lens barrel can be selected to make the elasticity of the first lens barrel greater than that of the first lens sheet, so as to buffer the clamping force of the external clamper when the first lens barrel is clamped, thereby reducing the force indirectly acting on the first lens sheet. At the same time, the elasticity of the lens barrel can be good so that the first lens barrel has the effect of easily returning to the original shape after the clamp is released. Table 3 shows elastic modulus of some lens barrel materials. Table 4 shows elastic modulus of some lens sheet materials.

TABLE 3

| Material name | Elastic modulus (GPa) |
| --- | --- |
| PE (medium/low density) | 0.172 |
| FR-PET | 1.5-2 |
| POLIYIMSE | 1.07 |
| AS (ASN) | 1.93 |
| PC | 2.4-2.6 |
| PBT | 2.8 |
| PE (high density) | 2.914 |
| PPO (NORYL) | 2.32 |
| PP polypropylene | 4 |
| PEI | 10 |
| LCP | 11.7 |

TABLE 4

| Material name | Elastic modulus (GPa) |
| --- | --- |
| PMMA | 3 |
| PC | 2.0-2.5 |

In a preferred embodiment, the first lens sheet made of PMMA material and the first lens barrel made of medium and low-density PE material can be used (the medium and low-density PE material can be polyethylene material with a density of, for example, 0.920 to 0.940 g/cm$^3$). In this way, the first lens barrel not only has better elasticity than the first lens sheet, but also has a small water absorption rate. At the same time, the difference between the thermal expansion coefficients of the first lens barrel and the second lens barrel is, for example, within $4 \times 10^{-5}$/° C. The solution of this embodiment can reduce the deformation of the first lens component due to heating (e.g. baking), can reduce the shape variation or position shift of the first lens barrel caused by moisture accumulation, and can buffer the action force of the external pickup mechanism on the first lens sheet by the elasticity of the first lens barrel, which is very helpful to reduce the difference between the state of the optical system after the first glue material is cured and the state of the optical system determined by the active calibration, further ensuring the imaging quality of the lens or module. In this embodiment, the second lens barrel can be made of a traditional lens barrel material (e.g. PC material). In this way, the second lens component can still be made by using traditional techniques, which is helpful to improve the product yield and increase the production efficiency. In the case of large-scale mass production (such as the mass production of mobile phone camera modules), the production volume of the same type of camera modules (or corresponding optical lens) may reach the order of tens of millions or even hundreds of millions, and thus the product yield and production efficiency cannot be ignored.

Figure 22:
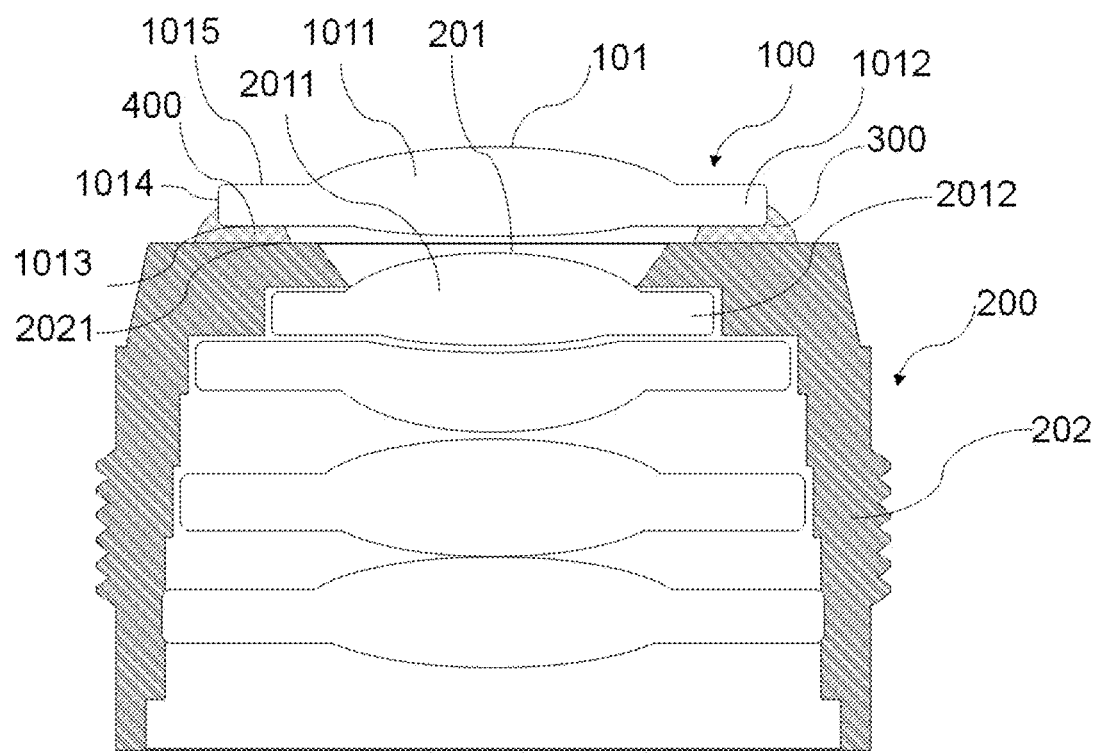
FIG. 22 shows a schematic cross-sectional view of an optical lens according to an embodiment of the present application.

FIG. 22 shows a schematic cross-sectional view of an optical lens according to an embodiment of the present application. The section is a section passing through the optical axis of the optical lens. In this embodiment, the optical lens includes a first lens component 100, a second lens component 200, and a first glue material 300. The first lens component 100 includes one first lens sheet 101, and the first lens sheet 101 has a first optical zone 1011 for optical imaging and a first structural zone 1012 other than the first optical zone 1011. The second lens component 200 includes a second lens barrel 202 and four second lens sheets 201 mounted in the second lens barrel 202. The four second lens sheets 201 and the first lens sheet 101 together constitute an imageable optical system. The second lens sheet 201 has a second optical zone 2011 for optical imaging and a second structural zone 2012 other than the second optical zone 2011. The second structural zone 2012 and the second lens barrel 202 constitute a structural zone of the second lens component 200, and there is a first gap 400 between the top surface 2021 of the structural zone of the second lens component 200 and the bottom surface 1013 of the first structural zone 1012. In this embodiment, since the second lens barrel 202 completely shields the second structural zone 2012, the top surface of the second structural zone 2012 is not exposed to the outside. Therefore, in this embodiment, the top surface 2021 of the structural zone of the second lens component 200 is actually the top surface of the second lens barrel 202 (it needs to be noted that in other embodiments, the top surface 2021 of the structural zone of the second lens component 200 may be composed of the top surface of the second lens barrel 202 and the top surface of the second structural zone 2012 of the second lens sheet 201 together). The top surface of the second lens barrel 202 is a flat surface. It needs to be noted that in other embodiments, the top surface of the second lens component 200 may be composed of the top surface of the second lens barrel 202 and the top surface of the second structural zone 2012 together. Still referring to FIG. 22, in this embodiment, a first glue material 300 is located in the first gap 400 and extends outwardly along the top surface 2021 of the structural zone of the second lens component 200 and surrounds the first structural zone 1012, and the first glue material 300 extending outwardly wraps at least a part of the outer side surface 1014 of the first structural zone 1012 (in this embodiment, the first glue material 300 does not wrap the entire outer side surface 1014 of the first structural zone 1012). The first glue material 300 is adapted to support and fix the first lens sheet 101 and the second lens component 200, so that the relative position of the first lens sheet 101 and the second lens component 200 is maintained at the relative position determined by active calibration.

Figure 25:
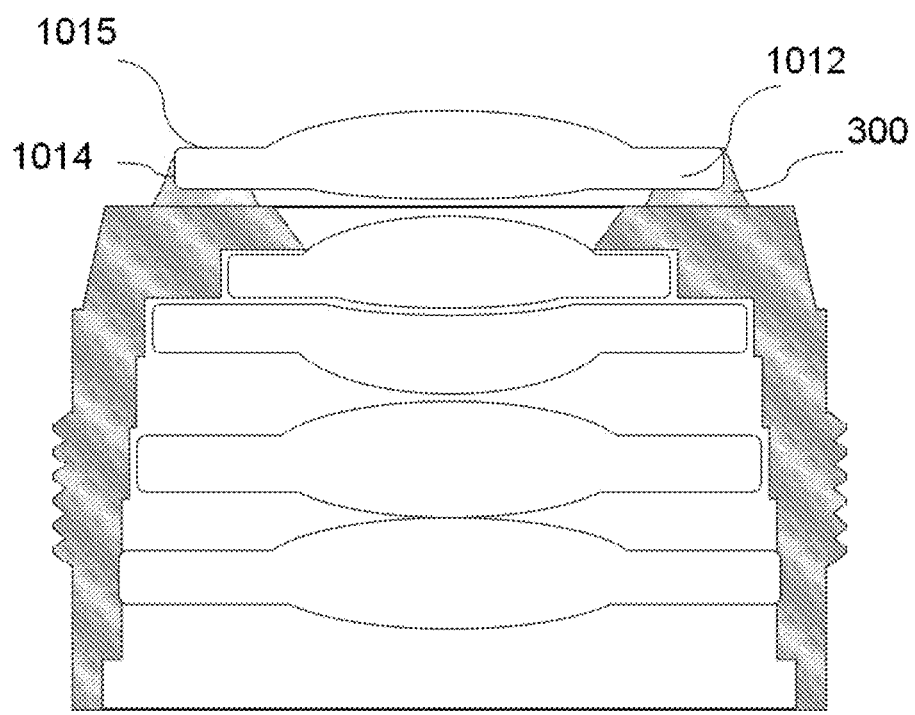
FIG. 25 shows a schematic cross-sectional view of an optical lens according to another embodiment of the present application.
Figure 28:
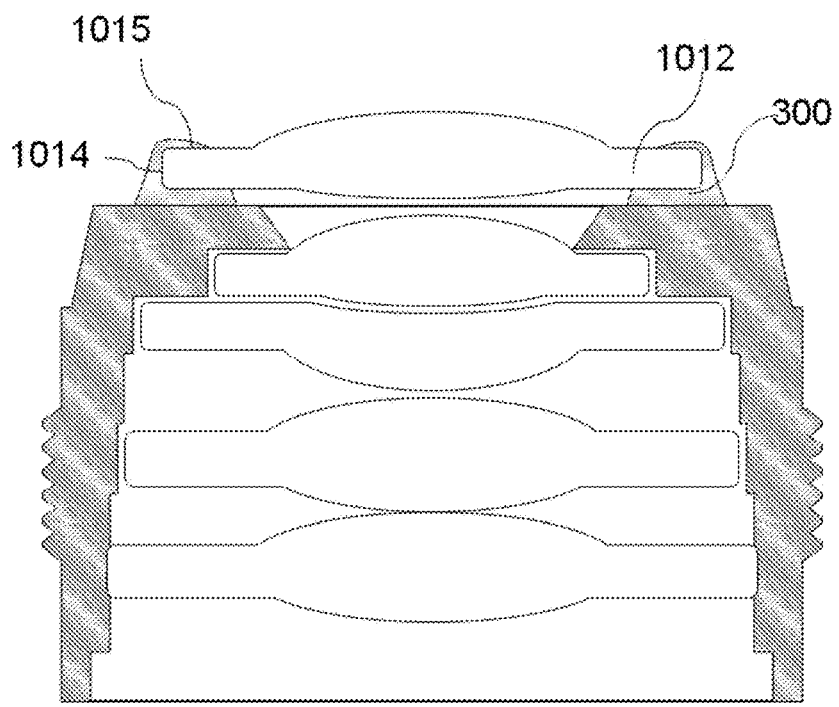
FIG. 28 shows a schematic cross-sectional view of an optical lens according to further another embodiment of the present application.

FIG. 25 shows a schematic cross-sectional view of an optical lens according to another embodiment of the present application. The section is a section passing through the optical axis of the optical lens. In this embodiment, the first glue material 300 wraps the entire outer side surface 1014 of the first structural zone 1012. Further, FIG. 28 shows a schematic cross-sectional view of an optical lens according to further another embodiment of the present application. In the embodiment shown in FIG. 28, the first glue material 300 wraps the entire outer side surface 1014 of the first structural zone 1012 and also covers the top surface 1015 of the first structural zone 1012. The applicant found that in an optical lens assembly solution based on active calibration technology, the shape and position of the first lens sheet 101 and the second lens sheet 201 may undergo secondary variation after the active calibration is completed. Specifically, the secondary variation can be, for example, in the curing process of the first glue material 300 or after long-term use, a change of an optical system of an actual product (such as an optical lens or camera module) relative to an optical system determined by active calibration (step 30). This change will result in deterioration of the image quality of the product. The applicant further found that, in contrast to the solution where the first glue material 300 is only filled between the bottom surface of the first lens sheet 101 and the top surface of the second lens component 200, when the first glue material 300 wraps the side surface of the first lens sheet 101, the resolution of the actual product is closer to the resolution obtained by the active calibration. Therefore, this design where the first glue material 300 wraps the side surface of the first lens sheet 101 is helpful to improve the product yield.

Figure 24:
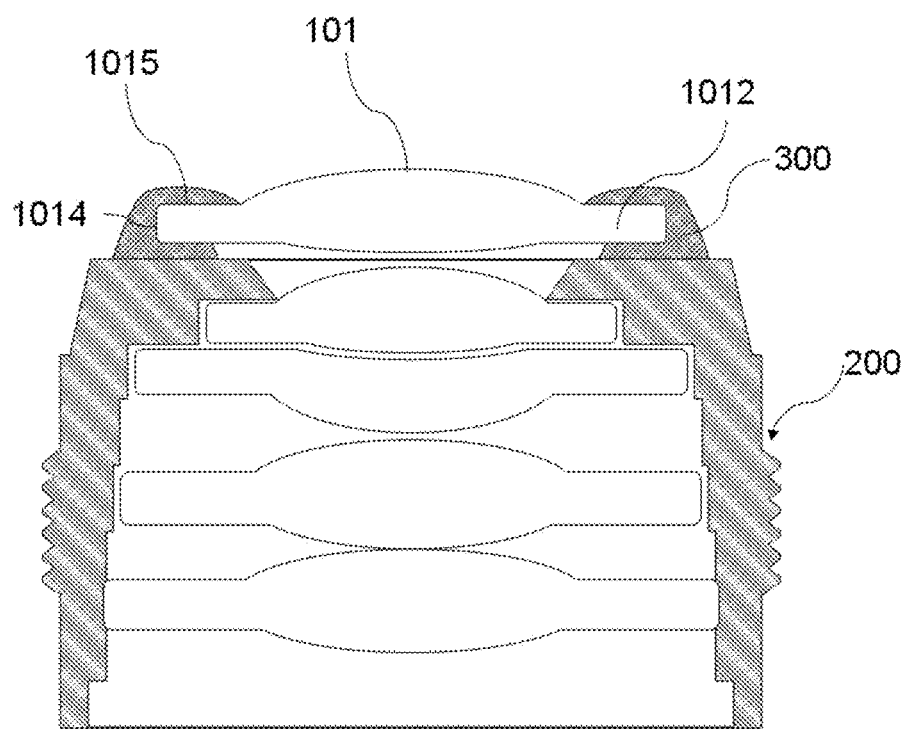
FIG. 24 shows a schematic view of baking an intermediate body of FIG. 23 so that all the first glue material 300 is permanently cured and fused into one body.

FIG. 24 shows a schematic cross-sectional view of an optical lens according to another embodiment of the present application. The section is a section passing through the optical axis of the optical lens. In this embodiment, the first glue material 300 is black, and shields the outer side surface 1014 and the top surface 1015 of the first structural zone 1012 so as to form a diaphragm.

Figure 35:
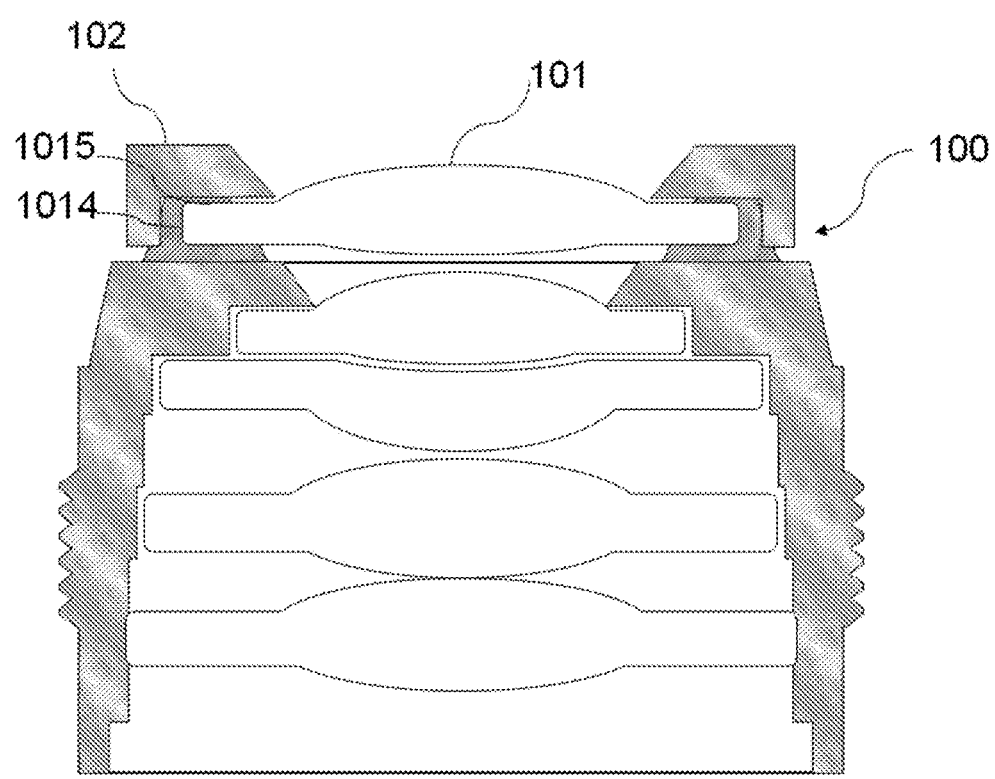
FIG. 35 shows a schematic cross-sectional view of an optical lens according to an embodiment of the present application.

FIG. 35 shows a schematic cross-sectional view of an optical lens according to still another embodiment of the present application. The section is a section passing through the optical axis of the optical lens. In this embodiment, the first lens component 100 further includes a first lens barrel 102, and the first lens barrel 102 surrounds the first lens sheet 101 and shields light directed from the outside to the outer side surface 1014 and the top surface 1015 of the first structural zone 1012. Further, a gap between the outer side surface 1014 and the top surface 1015 of the first lens sheet 101 and the first lens barrel 102 is filled with the first glue material 300.

Figure 36A:
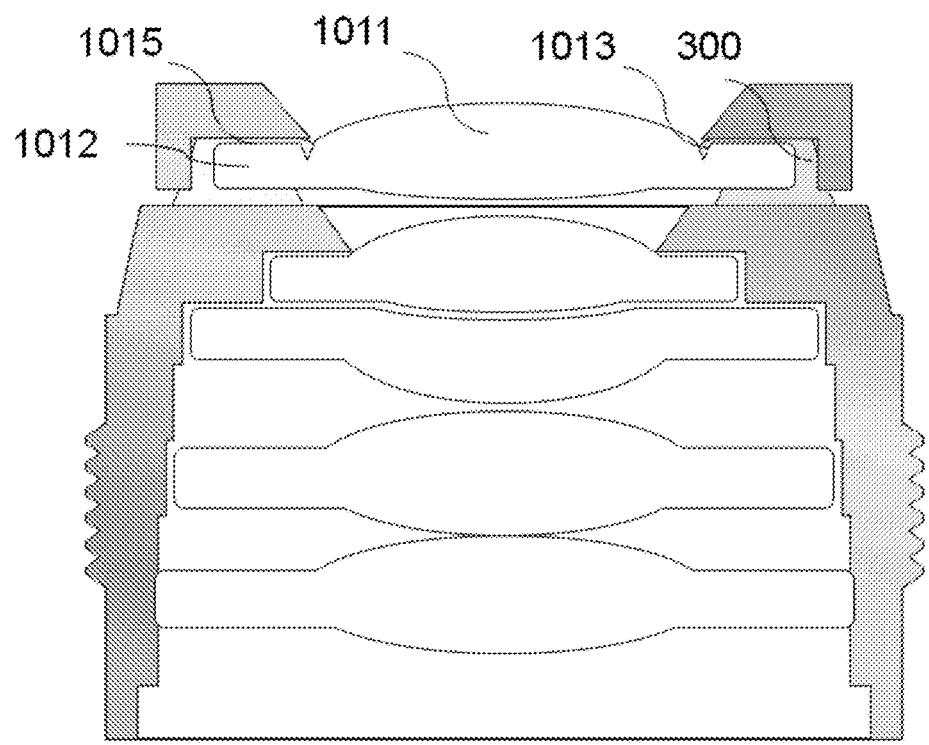
FIG. 36A shows a schematic cross-sectional view of an optical lens according to still another embodiment of the present application.
Figure 36B:
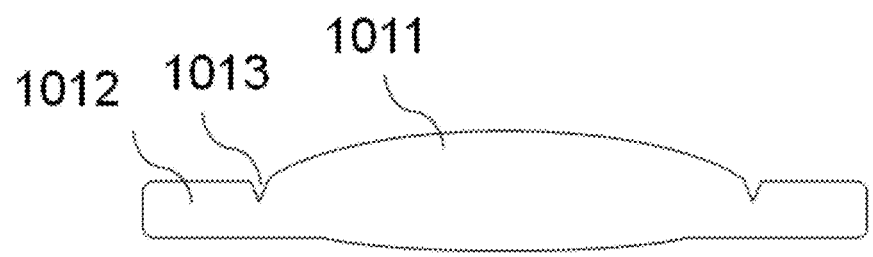
FIG. 36B shows an improved first lens sheet 101.

FIG. 36A shows a schematic cross-sectional view of an optical lens according to still another embodiment of the present application. The section is a section passing through the optical axis of the optical lens. This embodiment is obtained by improving the first lens sheet 101 on the basis of the embodiment shown in FIG. 35. FIG. 36B shows an improved first lens sheet 101. In this embodiment, the top surface 1015 of the first structural zone 1012 of the first lens sheet 101 has a glue overflow groove 1013, and the glue overflow groove 1013 is located close to the side of the first optical zone 1011 of the first lens sheet 1011.

Figure 46A:
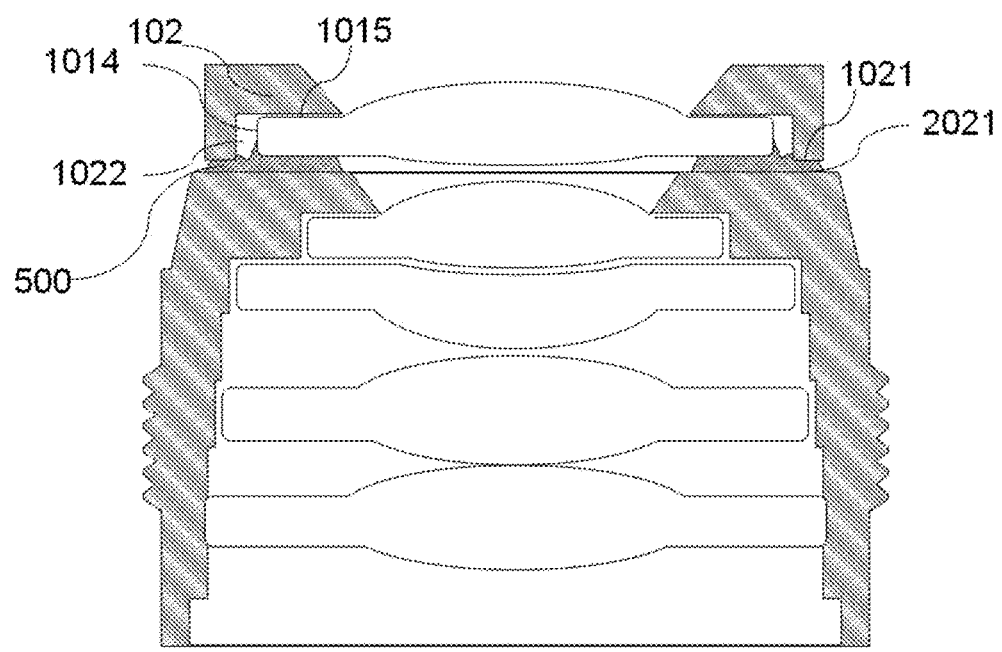
FIG. 46A shows a schematic cross-sectional view of an optical lens according to still another embodiment of the present application.

FIG. 46A shows a schematic cross-sectional view of an optical lens according to still another embodiment of the present application. The section is a section passing through the optical axis of the optical lens. In this embodiment, the optical lens includes a first lens barrel 102. There is a second glue material 500 between the bottom surface 1021 of the first lens barrel 102 and the top surface 2021 of the second lens barrel 202. The first lens barrel 102 is adhered to the second lens barrel 202 by the second glue material 500. There is a cavity 1022 between the outer side surface 1014 and the top surface 1015 of the first lens sheet 101 and the first lens barrel 102.

Figure 39:
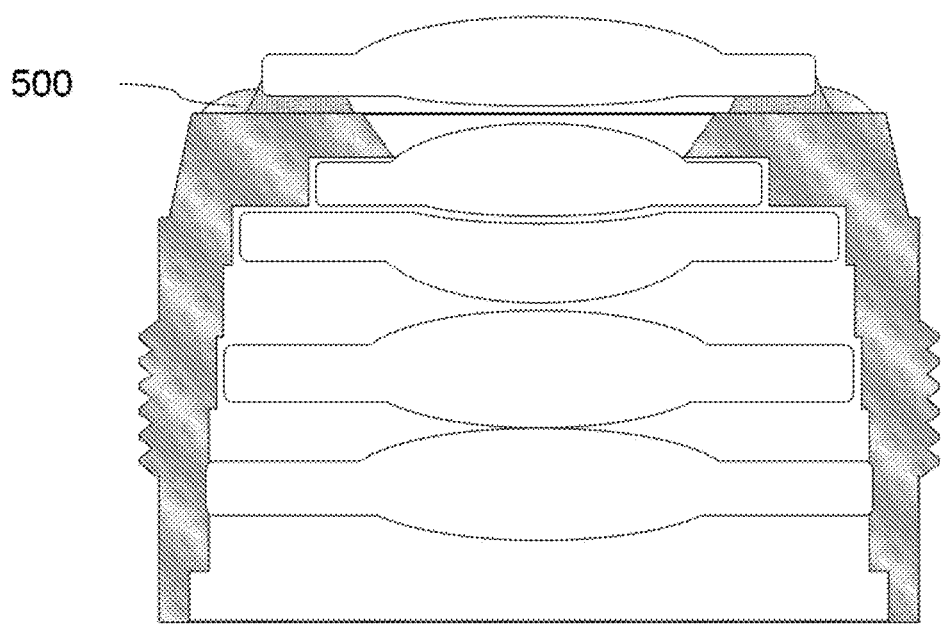
FIG. 39 shows a schematic cross-sectional view of painting a second glue material 500 on the top surface of a second lens barrel 202 in an embodiment of the present application.
Figure 40A:
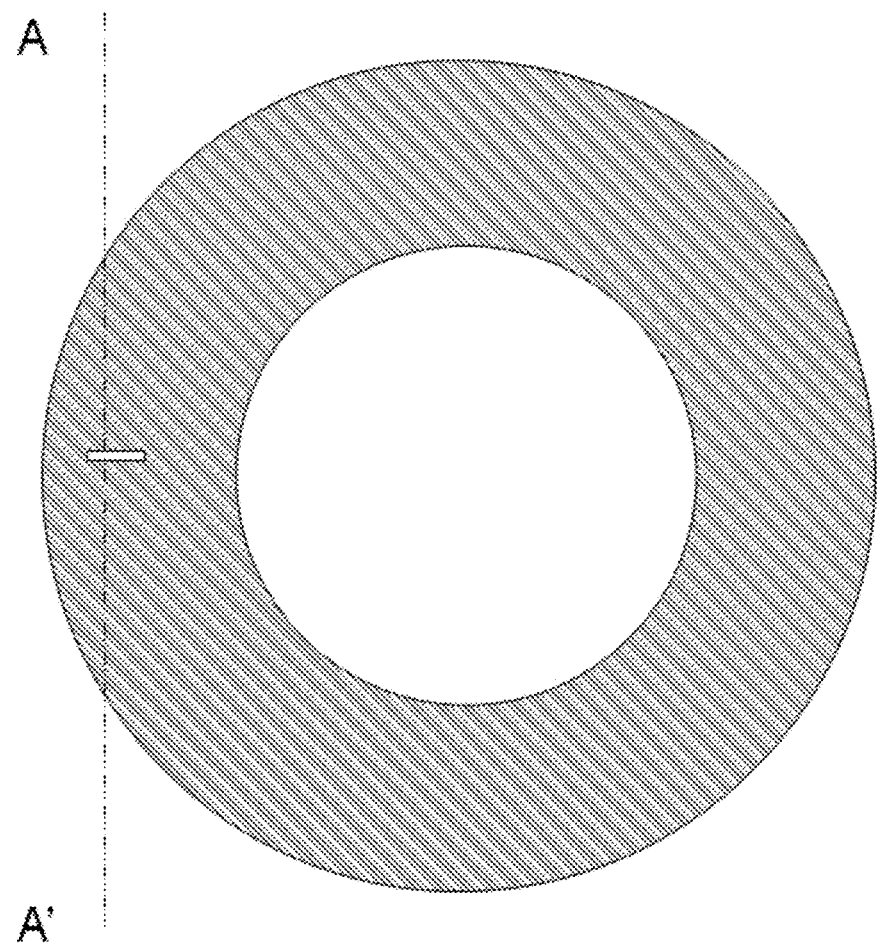
FIG. 40A shows a schematic top view of the top surface of an exemplary second lens barrel 202.
Figure 40B:
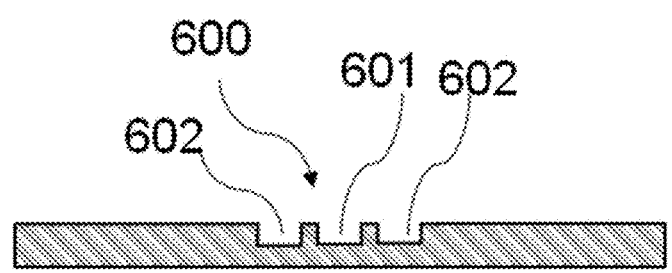
FIG. 40B shows a partial enlarged schematic view of an A-A' section in FIG. 40A.
Figure 41A:
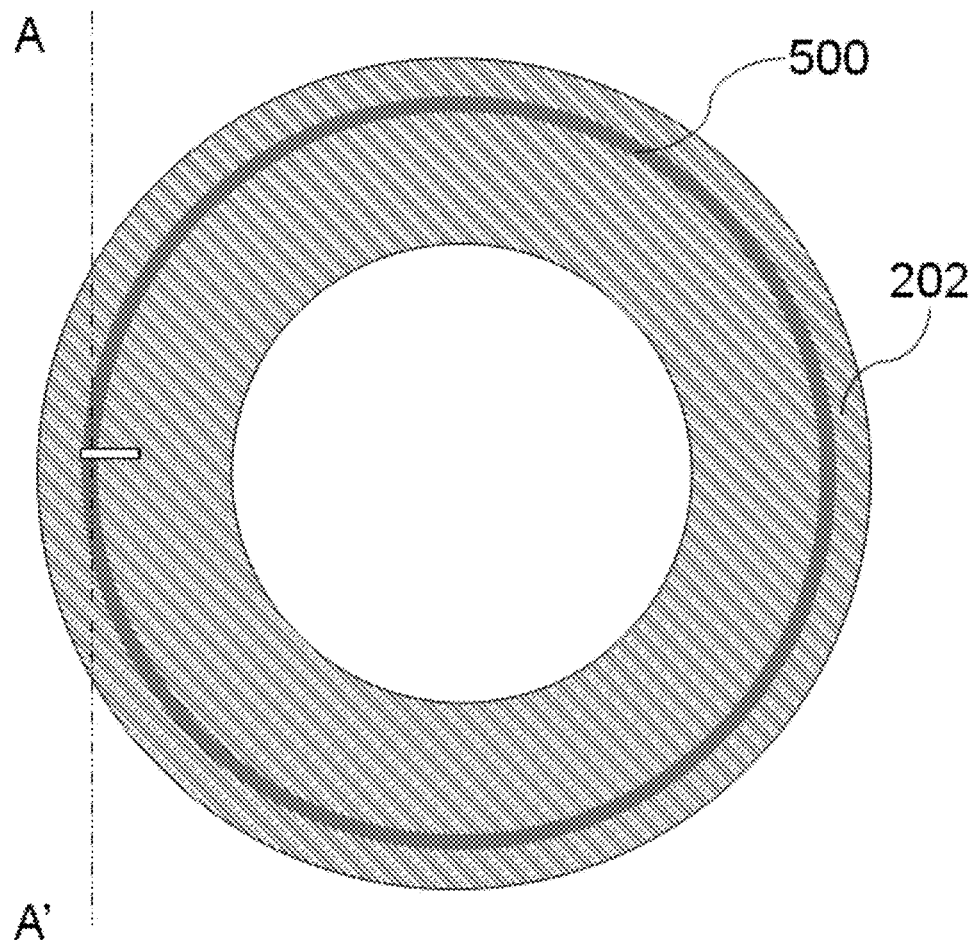
FIG. 41A shows a schematic view of painting glue on the top surface of the second lens barrel 202 in an embodiment of the present application.
Figure 41B:
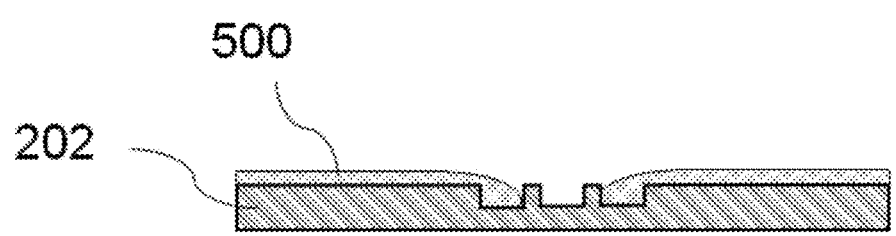
FIG. 41B shows a partial enlarged schematic view of an A-A' section in FIG. 41A.

In this embodiment, the second lens component 200 has an air escape channel communicating the cavity 1022 with the outside. In this embodiment, the air escape channel is formed by providing an air escape groove 600 on the top surface of the second lens barrel 202. FIG. 40A shows a schematic top view of the top surface of an exemplary second lens barrel 202. Referring to FIG. 40A, the top surface of the second lens barrel 202 has an air escape groove 600. For the sake of simplicity and clarity of the illustration, FIG. 40A only schematically shows the direction and location of the air escape groove 600. The direction of the air escape groove 600 may be an opened groove along the radial direction of the second lens barrel 202. Further, FIG. 40B shows a partial enlarged schematic view of an A-A' section in FIG. 40A. Referring to FIG. 40B, the air escape groove 600 includes one vent sub-groove 601 and two glue retaining sub-grooves 602 that are located on both sides of the vent sub-groove 601, respectively. Furthermore, FIG. 39 shows a schematic cross-sectional view of painting the second glue material 500 on the top surface of the second lens barrel 202, and FIG. 41A shows a schematic view of painting glue on the top surface of the second lens barrel 202. It can be seen that the second glue material 500 forms a ring shape with a notch on the top surface of the second lens barrel 202, and the notch is located at the position of the air escape groove 600. FIG. 41B shows a partial enlarged schematic view of an A-A' section in FIG. 41A. The glue retaining sub-groove 602 accommodates the overflown second glue material 500, so that the vent sub-groove 601 is not blocked by the second glue material 500, thereby ensuring that the second glue material 500 is notched. In this way, in the baking stage, the cavity 1022 can communicate with the outside through the vent sub-groove 601 and the notch of the second glue material 500, avoiding the misalignment or deformation of the first lens sheet 101 due to expansion of air in the cavity 1022, thereby ensuring the imaging quality of the optical lens based on the active calibration. On the other hand, the mistakes in painting glue due to careless operations (e.g. accidentally forming the second glue material 500 into a completely closed ring) can be reduced by the above design of the air escape groove 600, which is helpful to improve the yield in mass production.

It needs to be noted that in other embodiments, the air escape channel may also be provided in the first lens component 100, or may be composed of the first lens component 100 and the second lens component 200 together. The air escape channel may include an air escape groove 600 located on the top surface 2021 of the second lens barrel 202 and/or an air escape groove 600 located on the bottom surface 1021 of the first lens barrel 102.

Figure 46B:
FIG. 46B shows the first lens sheet 101 in still another embodiment of the present application.

FIG. 46B shows a first lens sheet 101 in still another embodiment of the present application. In this embodiment, the first lens sheet 101 in the optical lens of FIG. 24 can be replaced with the improved first lens sheet 101 shown in FIG. 46B. In this embodiment, the top surface 1015 of the first structural zone 1012 of the first lens sheet 101 is inclined, and the end of the top surface 1015 of the first structural zone 1012 close to the first optical zone 1011 is higher than its end close to the outer side surface 1014 of the first structural zone 1012. When the first glue material 300 is located on the top surface 1015 of the first structural zone 1012 (for example, when a design where the first glue material 300 covers the top surface 1015 of the first structural zone 1012 is used), the glue material will automatically flow to the cavity 1022, thereby avoiding product failure due to the contamination of the optical zone of the first lens sheet 101. In another embodiment, the first lens sheet 101 in FIG. 46A may also be replaced with the first lens sheet 101 shown in FIG. 36B, which may also avoid the product failure due to the contamination of the optical zone of the first lens sheet 101.

On the basis of the above-mentioned embodiments, a corresponding camera module is further provided, and the camera module may include the optical lens described in any one of the above embodiments. Specifically, the camera module may include an optical lens and a photosensitive assembly. The optical lens may be the optical lens in any one of the foregoing embodiments. In this embodiment, the first glue material 300 wraps the side surface of the first lens sheet 101, so that the actual resolution of the produced camera module is closer to the resolution obtained by the active calibration, which is helpful to improve the product yield. The camera module may further include a motor (or other types of optical actuators), the optical lens may be mounted in a cylindrical carrier of the motor, and the base of the motor is mounted on the top surface of the photosensitive assembly. Further, the photosensitive assembly may include, for example, a circuit board, a photosensitive chip mounted on the surface of the circuit board, an annular support formed or mounted on the surface of the circuit board and surrounding the photosensitive chip, and a color filter. The annular support may form a step, and the color filter is mounted on the step of the annular support. The base of the motor is mounted on the top surface of the annular support.

Further, according to an embodiment of the present application, there is provided an optical lens assembly method comprising:

Step S10, a preparation step. A first lens component 100 and a second lens component 200 separated from each other are prepared. The first lens component 100 includes one first lens sheet 101, and the first lens sheet 101 has a first optical zone 1011 for optical imaging and a first structural zone 1012 other than the first optical zone 1011. The second lens component 200 includes a second lens barrel 202 and four second lens sheets 201 mounted in the second lens barrel 202, and the four second lens sheets 201 have second optical zones 2011 for optical imaging and second structural zones 2012 other than the second optical zones 2011, and the second structural zones 2012 and the second lens barrel 202 constitute a structural zone of the second lens component 200.

Step S20, a pre-positioning step. The first lens component 100 and the second lens component 200 are pre-positioned, so that the first lens sheet 101 and the four second lens sheets 201 together constitute an imageable optical system.

Step S30, an active calibration step. The relative position of the first lens component 100 and the second lens component 200 is adjusted and determined based on active calibration.

Step S40, a bonding step. The first lens sheet 101 and the second lens component 200 are bonded by a first glue material 300, wherein there is a first gap 400 between the top surface of the structural zone of the second lens component 200 and the bottom surface of the first structural zone 1012, the first glue material 300 is located in the first gap 400 and extends outwardly along the top surface of the structural zone of the second lens component 200 and surrounds the first structural zone 1012, and the first glue material 300 extending outwardly wraps at least a part of the outer side surface of the first structural zone 1012, and after the first glue material 300 is cured, the first lens sheet 101 and the second lens component 200 are fixed and maintained at the relative position determined by the active calibration. FIG. 22 shows a schematic cross-sectional view of an optical lens according to an embodiment of the present application. It can be seen that in the embodiment shown in FIG. 22, the first glue material 300 does not wrap the entire outer side surface 1014 of the first structural zone 1012. FIG. 25 shows a schematic cross-sectional view of an optical lens according to another embodiment of the present application. In the embodiment shown in FIG. 25, the first glue material 300 wraps the entire outer side surface 1014 of the first structural zone 1012. FIG. 28 shows a schematic cross-sectional view of an optical lens according to further another embodiment of the present application. In the embodiment shown in FIG. 28, the first glue material 300 wraps the entire outer side surface 1014 of the first structural zone 1012 and covers a part of the top surface 1015 of the first structural zone 1012.

The applicant found that in an optical lens assembly solution based on active calibration technology, the shape and position of the first lens sheet 101 and the second lens sheet 201 may undergo secondary variation after the active calibration is completed. Specifically, the secondary variation can be, for example, in the curing process of the first glue material 300 or after long-term use, a change of an optical system of an actual product (such as an optical lens or camera module) relative to an optical system determined by active calibration (step 30). This change will result in deterioration of the image quality of the product. The applicant further found that, in contrast to the solution where the first glue material 300 is only filled between the bottom surface of the first lens sheet 101 and the top surface of the second lens component 200, when the first glue material 300 wraps the side surface of the first lens sheet 101, the resolution of the actual product is closer to the resolution obtained by the active calibration. Therefore, this design where the first glue material 300 wraps the side surface of the first lens sheet 101 is helpful to improve the product yield.

Further, in an embodiment, the bonding step (step S40) comprises:

S401, a glue painting step. A liquid first glue material 300 is arranged on the top surface 2021 of the structural zone of the second lens component 200.

S402, a positioning step based on an active calibration result. The first lens sheet 101 is moved above the second lens component 200, then gradually approaches the second lens component 200 and contacts the first glue material 300, and the relative position of the first lens sheet 101 and the second lens component 200 is adjusted to the relative position determined by the active calibration, wherein the arranged liquid first glue material 300 is at least located in the first gap 400.

S403, a pre-curing step. After S402 is completed, the first glue material 300 is pre-cured. In the pre-curing process, the first lens sheet 101 and the second lens component 200 are maintained at the relative position determined by the active calibration by means of an external pickup mechanism and/or a fixing platform. For example, the external pickup mechanism (e.g. a clamper) picks up the first lens sheet 101, and the fixing platform fixes the second lens component 200. The external pickup mechanism can perform adjustment (for example, six-axis adjustment) in multiple degrees of freedom. After the pre-curing, the pre-cured first glue material 300 is used to maintain the first lens sheet 101 and the second lens component 200 at the relative position determined by the active calibration. Further, in an embodiment, the pre-curing step may be an exposure treatment of the first glue material 300.

S404, a permanent curing step. The first glue material 300 is permanently cured, and a finished optical lens can be obtained. In an embodiment, the permanent curing may be to bake a combination of the pre-cured first glue material 300, the first lens sheet 101 and the second lens component 200, so that the first glue material 300 is permanently cured.

It needs to be noted that, in an embodiment, the order of step S401 and step S30 can be interchanged, and step S30 can be executed in combination with step S402.

Figure 26:
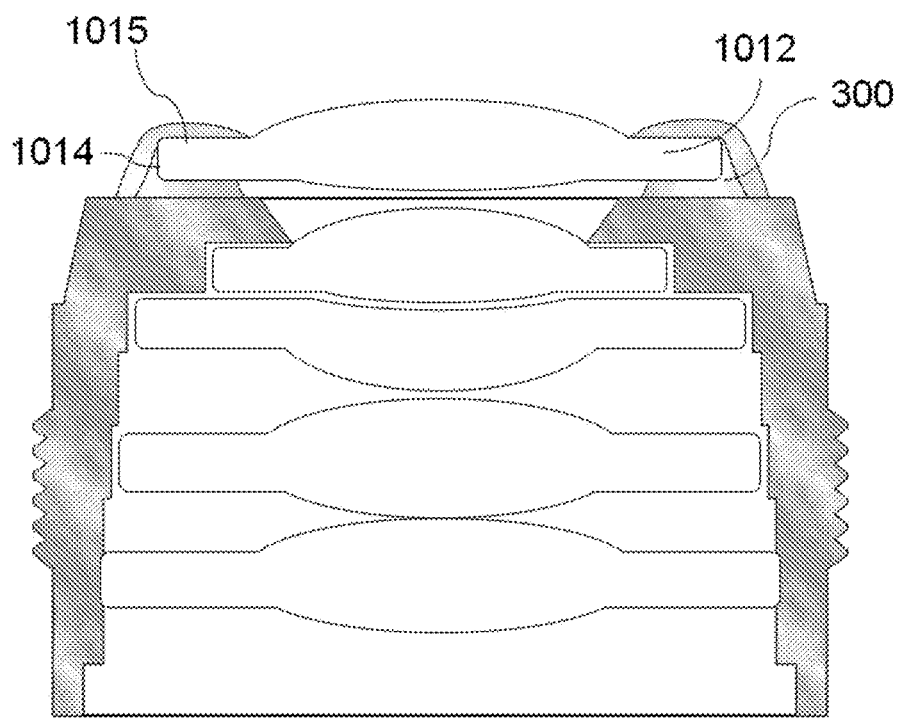
FIG. 26 shows a schematic view of adding the first glue material 300 on the basis of FIG. 25 so as to wrap the entire outer side surface of the first structural zone 1012 and cover the top surface of the first structural zone 1012.

Further, in an embodiment, in step S402, the arranged liquid first glue material 300 may only be located in the first gap 400. Between steps S403 and S404, a liquid first glue material 300 may be added around the pre-cured first glue material 300, so that the first structural zone 1012 of the first lens sheet 101 is wrapped by the first glue material 300. The wrapping may be that the side surface of the first structural zone 1012 is partially wrapped as shown in FIG. 22, or it may be that the side surface of the first structural zone 1012 is completely wrapped as shown in FIG. 25, or it may be that the side surface of the structural zone 1012 is completely wrapped and the top surface of the first structural zone 1012 is covered as shown in FIG. 26. Finally, step S404 is performed to permanently cure the first glue material 300, and the finished optical lens can be obtained.

Figure 23:
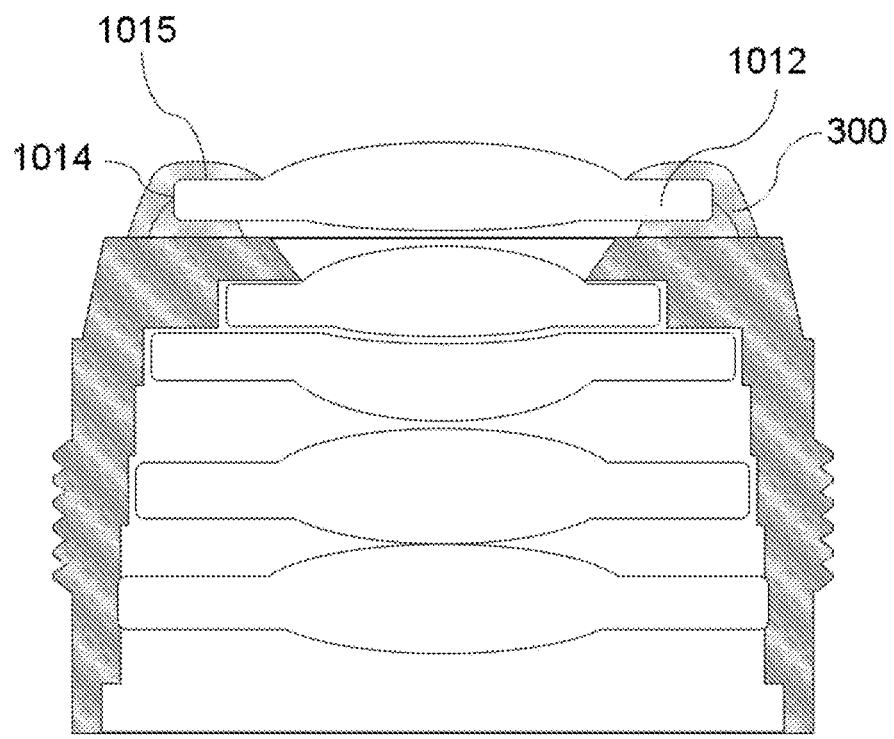
FIG. 23 shows a schematic view of adding a first glue material 300 on the basis of FIG. 1 so as to wrap the entire outer side surface 1014 of the first structural zone 1012 and cover the top surface 1015 of the first structural zone 1012.

Further, in an embodiment, an optical lens with a first glue material 300 as a diaphragm can be manufactured on the basis of the embodiment shown in FIG. 22, which comprises: adding the first glue material 300 on the basis of FIG. 22 (the first glue material 300 may be black) so as to wrap the entire outer side surface of the first structural zone 1012 and cover the entire top surface of the first structural zone 1012;

and baking so that all the first glue material 300 is permanently cured and fused into one body, thereby obtaining the optical lens with the first glue material 300 as the diaphragm. This solution is helpful to reduce stray light of the optical lens. FIGS. 23 and 24 show a process for manufacturing the optical lens with the first glue material 300 as the diaphragm on the basis of the embodiment shown in FIG. 22. FIG. 23 shows a schematic view of adding the first glue material 300 on the basis of FIG. 22 so as to wrap the entire outer side surface 1014 of the first structural zone 1012 and cover the top surface 1015 of the first structural zone 1012. The first glue material 300 may be black. Moreover, the added first glue material 300 covers the entire top surface 1015 of the first structural zone 1012 so as to form the diaphragm. FIG. 24 shows a schematic view of baking an intermediate body of FIG. 23 so that all the first glue material 300 is permanently cured and fused into one body.

Figure 27:
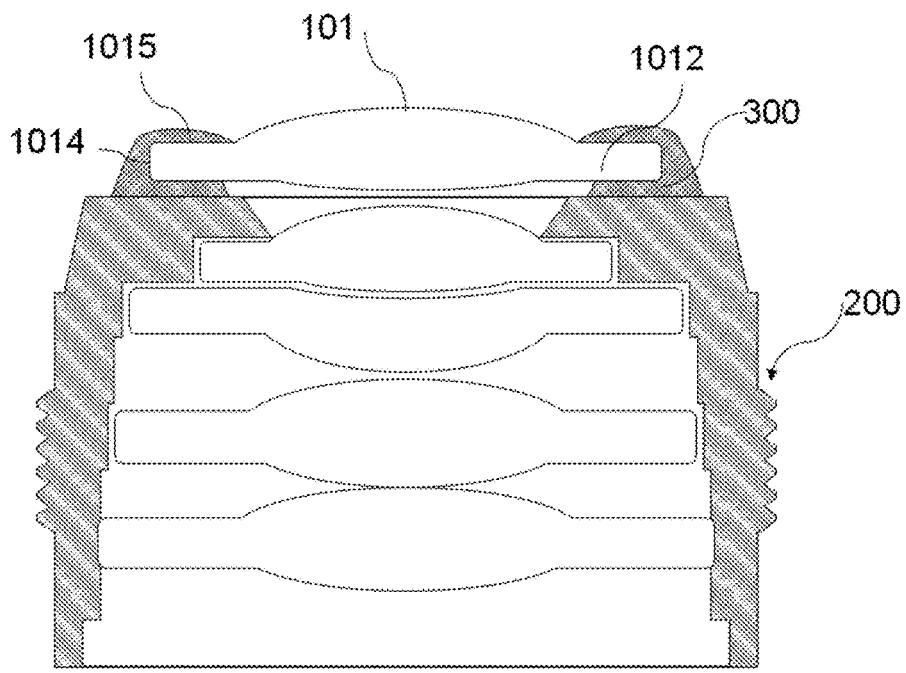
FIG. 27 shows a schematic view of baking an intermediate body of FIG. 26 so that all the first glue material 300 is permanently cured and fused into one body.

Further, in another embodiment, an optical lens with a first glue material 300 as a diaphragm can be manufactured on the basis of the embodiment shown in FIG. 25, which comprises: adding the first glue material 300 on the basis of FIG. 25 (the first glue material 300 may be black) so as to wrap the entire outer side surface of the first structural zone 1012 and cover the entire top surface of the first structural zone 1012;

and baking so that all the first glue material 300 is permanently cured and fused into one body, thereby obtaining the optical lens with the first glue material 300 as the diaphragm. This solution is helpful to reduce stray light of the optical lens. FIGS. 26 and 27 show a process for manufacturing the optical lens with the first glue material 300 as the diaphragm on the basis of the embodiment shown in FIG. 25. FIG. 26 shows a schematic view of adding the first glue material 300 on the basis of FIG. 25 so as to wrap the entire outer side surface of the first structural zone 1012 and cover the top surface of the first structural zone 1012. The first glue material 300 may be black. Moreover, the added first glue material 300 covers the entire top surface 1015 of the first structural zone 1012 so as to form the diaphragm. FIG. 27 shows a schematic view of baking an intermediate body of FIG. 26 so that all the first glue material 300 is permanently cured and fused into one body.

Figure 29:
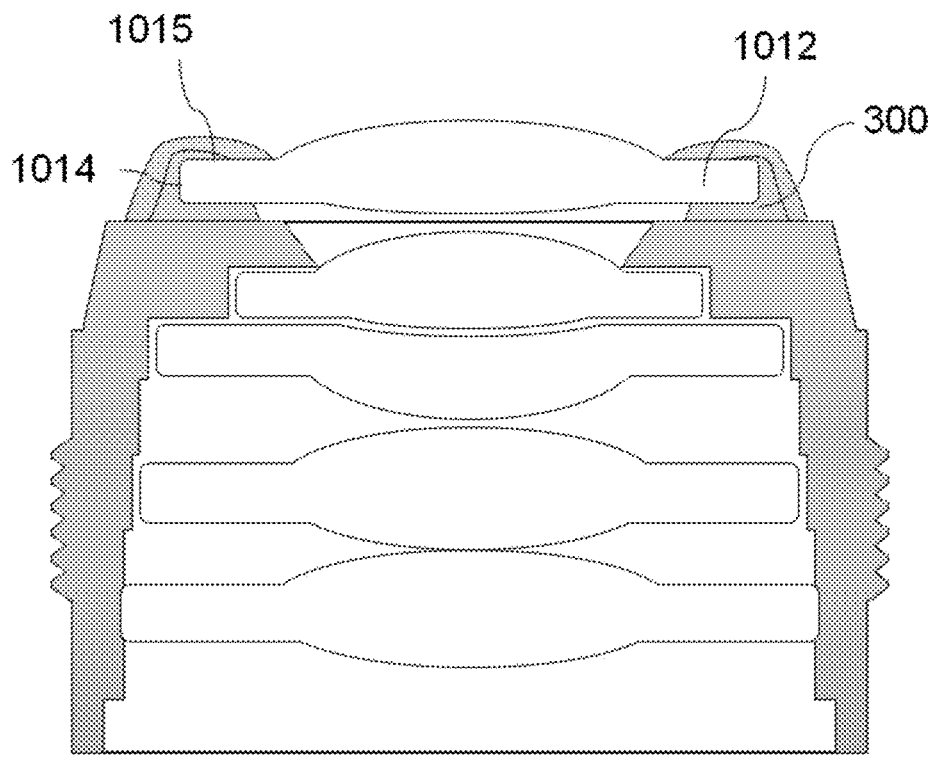
FIG. 29 shows a schematic view of adding the first glue material 300 on the basis of FIG. 28 so as to wrap the entire outer side surface 1014 of the first structural zone 1012 and cover the top surface 1015 of the first structural zone 1012.
Figure 30:
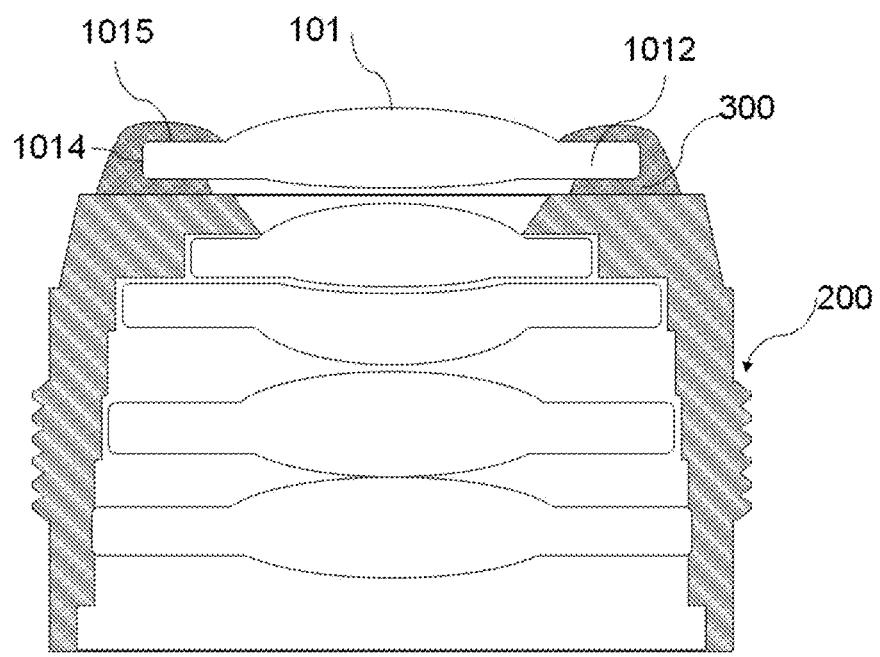
FIG. 30 shows a schematic view of baking a semi-finished product of FIG. 29 so that all the first glue material 300 is permanently cured and fused into one body.

Further, in further another embodiment, an optical lens with a first glue material 300 as a diaphragm can be manufactured on the basis of the embodiment shown in FIG. 28, which comprises: adding the first glue material 300 on the basis of FIG. 28 (the first glue material 300 may be black) so as to wrap the entire outer side surface of the first structural zone 1012 and cover the entire top surface of the first structural zone 1012; and baking so that all the first glue material 300 is permanently cured and fused into one body, thereby obtaining the optical lens with the first glue material 300 as the diaphragm. This solution is helpful to reduce stray light of the optical lens. FIGS. 29 and 30 show a process for manufacturing the optical lens with the first glue material 300 as the diaphragm on the basis of the embodiment shown in FIG. 28. FIG. 29 shows a schematic view of adding the first glue material 300 on the basis of FIG. 28 so as to wrap the entire outer side surface 1014 of the first structural zone 1012 and cover the top surface 1015 of the first structural zone 1012. The first glue material 300 may be black. Moreover, the added first glue material 300 covers the entire top surface 1015 of the first structural zone 1012 so as to form the diaphragm. FIG. 30 shows a schematic view of baking a semi-finished product of FIG. 29 so that all the first glue material 300 is permanently cured and fused into one body.

In the foregoing, the optical lens shown in FIGS. 22, 25, and 28 as the basis for manufacturing the optical lens with the first glue material 300 as the diaphragm may be a finished product that has completed the permanent curing step (S404); and it may also be a semi-finished product that has completed the pre-curing step but has not completed the permanent curing step (S404). At this time, after adding the first glue material 300, the permanent curing of all the first glue material 300 can be completed by means of baking once.

Figure 31:
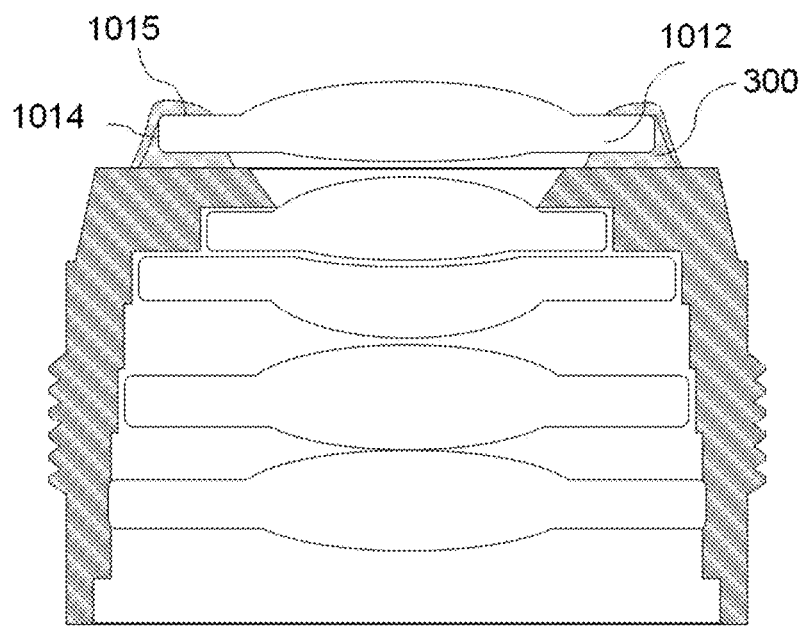
FIG. 31 shows a schematic view after painting glue on the outer periphery of the first glue material 300 and the top surface 1015 of the first structural zone 1012 of the first lens sheet 101 in an embodiment of the present application.

Further, according to an embodiment of the present application, there is further provided a method for manufacturing an optical lens with a first lens barrel 102. The addition of the first lens barrel 102 can make the appearance of the optical lens more regular and beautiful; and at the same time, can also protect the first lens sheet 101 and reduce the influence of external impact on the optical system. The first lens barrel 102 can also serve as a diaphragm, thereby reducing the influence of external stray light on the imaging quality. In this embodiment, the method for manufacturing the optical lens comprises:

Step S100, a semi-finished optical lens based on active calibration is manufactured based on steps S10-S40, and then glue is painted on the outer periphery of the first glue material 300 and the top surface 1015 of the first structural zone 1012 of the first lens sheet 101, for example, adding liquid first glue material 300. FIG. 31 shows a schematic view after painting glue on the outer periphery of the first glue material 300 and the top surface 1015 of the first structural zone 1012 of the first lens sheet 101 in an embodiment of the present application. In this step, the semi-finished product manufactured in steps S10-S40 may have undergone a permanent curing process (for example, baking), or may have undergone a pre-curing process (for example, exposure) but have not undergone a permanent curing process.

Figure 32:
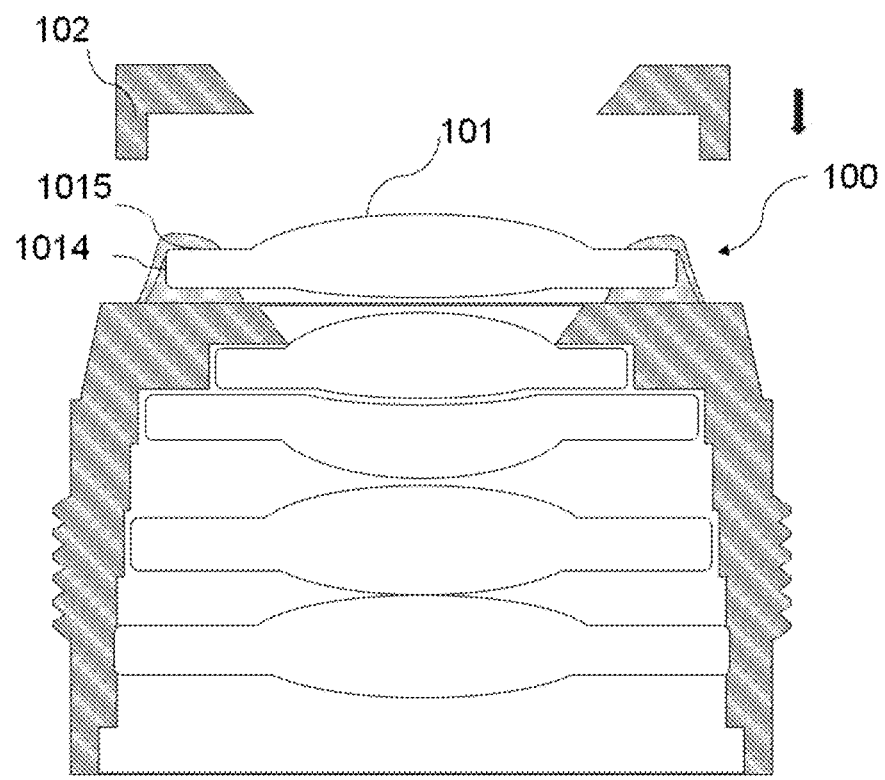
FIG. 32 shows a schematic view of moving the first lens barrel 102 above the first lens sheet 101, and then making the first lens barrel 102 gradually approach the first lens sheet 101.
Figure 33:
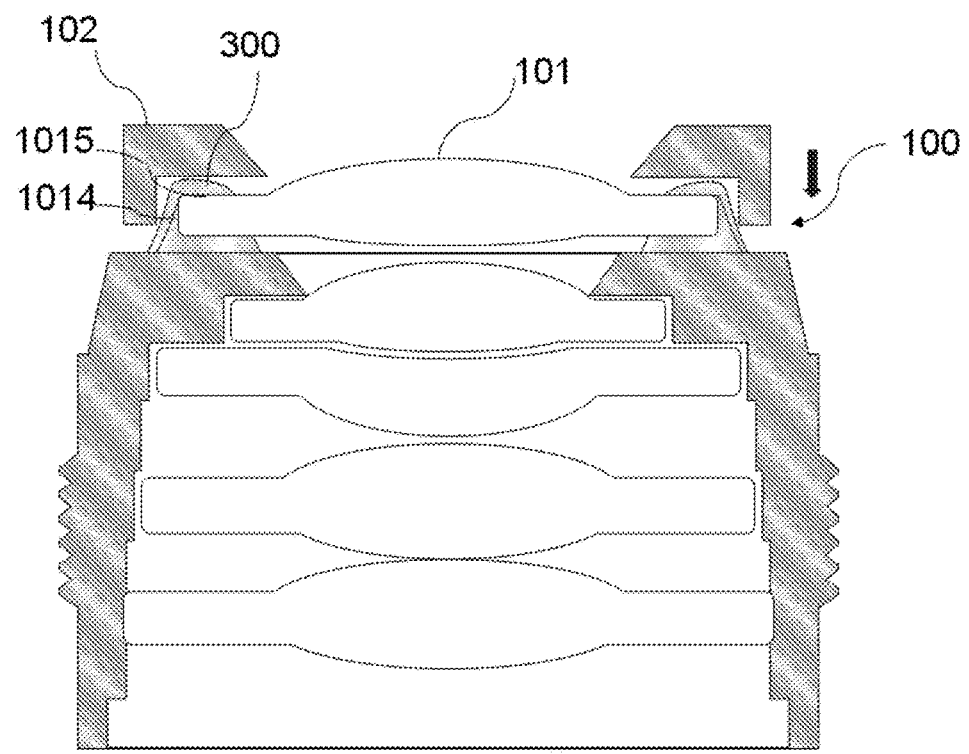
FIG. 33 shows a schematic view of the first lens barrel 102 contacting the added first glue material 300.
Figure 34:
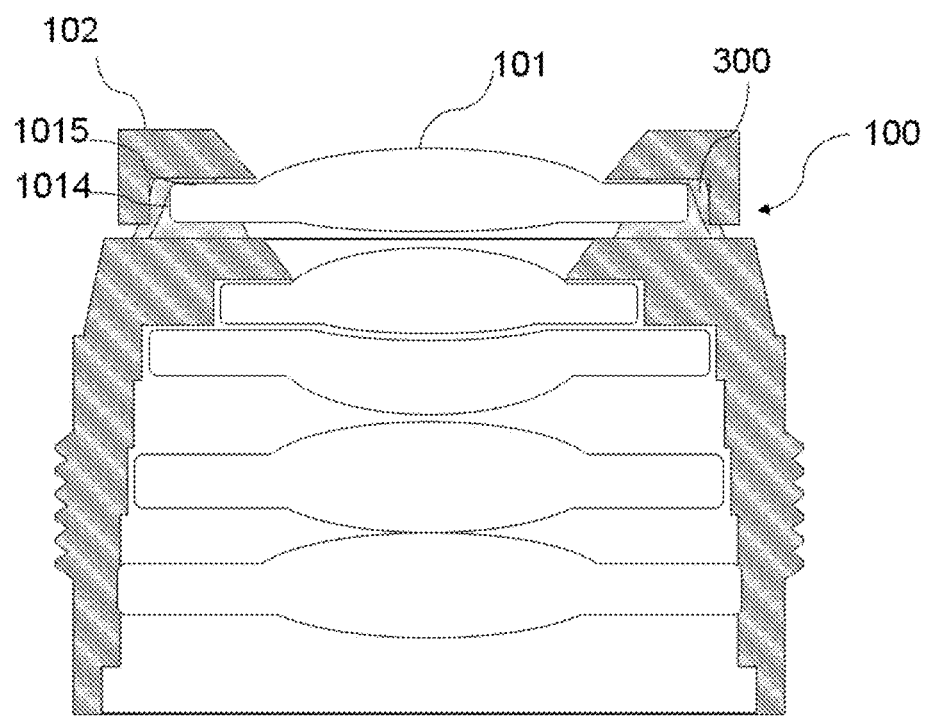
FIG. 34 shows a schematic view of the first glue material 300 filling the gap between the outer side surface 1014 and the top surface 1015 of the first lens sheet 101 and the first lens barrel 102.

Step S200, the first lens barrel 102 is covered on the first lens sheet 101 so as to form the diaphragm, wherein the first lens barrel 102 is moved above the first lens sheet 101, and then the first lens barrel 102 is gradually approached to the first lens sheet 101 and is contacted with the added first glue material 300, and a gap between the outer side surface and the top surface of the first lens sheet 101 and the first lens barrel 102 is filled with the first glue material 300. FIG. 32 shows a schematic view of moving the first lens barrel 102 above the first lens sheet 101, and then making the first lens barrel 102 gradually approach the first lens sheet 101. FIG. 33 shows a schematic view of the first lens barrel 102 contacting the added first glue material 300. Then, the first lens barrel 102 continues to approach the first lens sheet 101 by squeezing the added liquid first glue material 300, so that the gap between the outer side surface 1014 and the top surface 1015 of the first lens sheet 101 and the first lens barrel 102 is filled with the first glue material 300. FIG. 34 shows a schematic view of the first glue material 300 filling the gap between the outer side surface 1014 and the top surface 1015 of the first lens sheet 101 and the first lens barrel 102.

Further, in an embodiment, the addition amount of the first glue material 300 can be controlled to make it match with a designed gap between the outer side surface 1014 and the top surface 1015 of the first lens sheet 101 and the first lens barrel 102, so that the gap between the outer side surface 1014 and the top surface 1015 of the first lens sheet 101 and the first lens barrel 102 is filled with the first glue material 300.

Step S300, after step S200 is completed, bake the combination of the first glue material 300, the first lens sheet 101, the first lens barrel 102 and the second lens component 200, so that all the first glue material 300 is permanently cured to obtain the finished optical lens with the first lens barrel 102. As shown in FIG. 35, in an embodiment of the present application, all the first glue material 300 is permanently cured and fused into one body.

In this embodiment, since the gap between the outer side surface 1014 and top surface 1015 of the first lens sheet 101 and the first lens barrel 102 has been completely filled with the glue material, the first lens sheet 101 will not be deformed or displaced due to gas expansion during baking. It needs to be noted that in the actual mass production process, it is difficult to perfectly match the addition amount of glue material to the design gap in the manufacturing of each product. Therefore, there may be a tiny air gap between the first glue material 300 and the first lens barrel 102. However, this air gap is usually very small, and the first glue material 300 located between it and the first lens sheet 101 can play a buffering function. Therefore, this air gap left due to the imperfect matching of the addition amount of glue material and the designed gap will not affect the imaging quality, and the method of this embodiment can still have a good yield.

Figure 37:
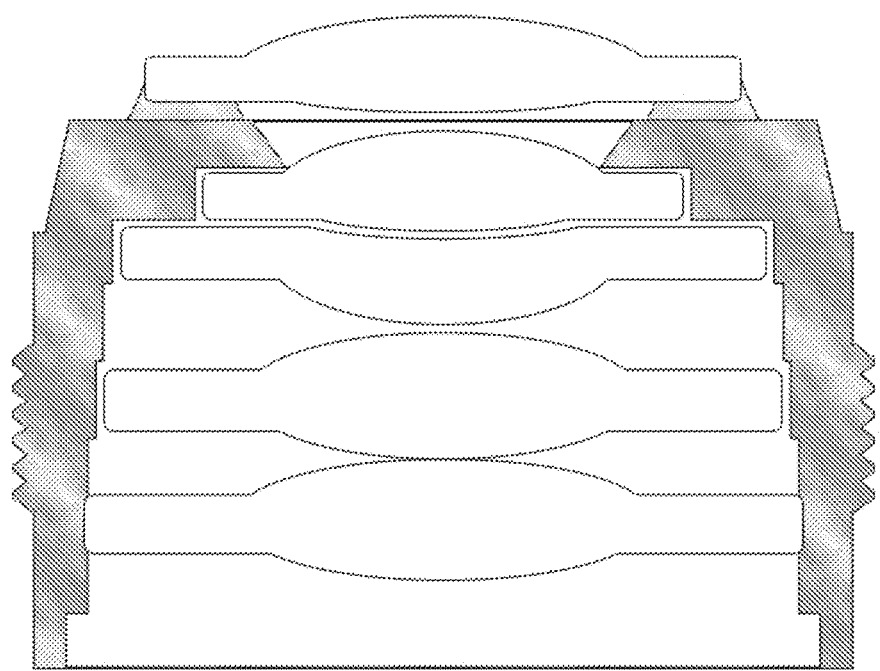
FIG. 37 shows a state of a semi-finished product after step S402 is completed in an embodiment of the present application.
Figure 38:
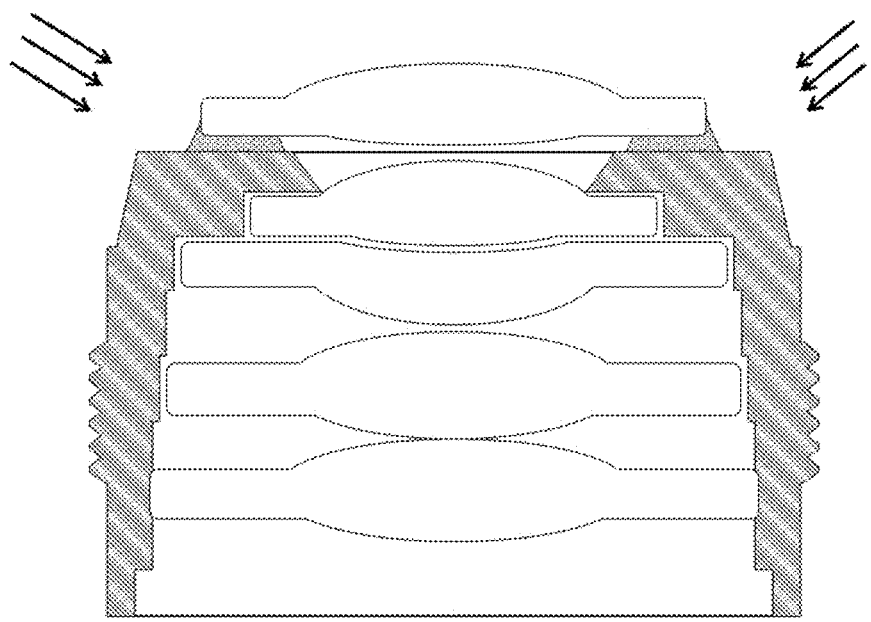
FIG. 38 shows a schematic view of exposing the semi-finished product shown in FIG. 16 to so as pre-cure the first glue material 300 in an embodiment of the present application.

Further, according to another embodiment of the present application, there is further provided another method for manufacturing an optical lens with a first lens barrel 102. As described above, the addition of the first lens barrel 102 can make the appearance of the optical lens 102 more regular and beautiful, and at the same time, can also protect the first lens sheet 101 and reduce the influence of external impact on the optical system. The first lens barrel 102 can also serve as a diaphragm, thereby reducing the influence of external stray light on the imaging quality. In this embodiment, the method for manufacturing the optical lens comprises:

Step S1000, a semi-finished optical lens based on active calibration is manufactured based on steps S10-S40. In step S40, only steps S401 to S403 may be executed, or all steps S401 to S404 may be executed. FIG. 37 shows a state of a semi-finished product after step S402 is completed in an embodiment of the present application. FIG. 38 shows a schematic view of exposing the semi-finished product shown in FIG. 37 so as to pre-cure the first glue material 300 in an embodiment of the present application. In FIG. 38, the arrow shows light for exposure of the first glue material 300.

Step S2000, a liquid second glue material 500 is arranged on the top surface 2021 of the structural zone of the second lens component 200, and the second glue material 500 surrounds the outer periphery of the first glue material 300. The second glue material 500 may be in contact with the pre-cured first glue material 300 or may be separated from the pre-cured first glue material 300. In this embodiment, the second glue material 500 is in contact with the pre-cured first glue material 300. Preferably, the second glue material 500 can be made of the same material as the first glue material 300 so as to avoid the variation of the glue material due to chemical reactions caused by doping with each other.

Further, FIG. 40A shows a schematic top view of the top surface of an exemplary second lens barrel 202. Referring to FIG. 40A, the top surface of the second lens barrel 202 has an air escape groove 600. For the sake of simplicity and clarity of the illustration, FIG. 40A only schematically shows the direction and location of the air escape groove 600. The direction of the air escape groove 600 may be an opened groove along the radial direction of the second lens barrel 202. Further, FIG. 40B shows a partial enlarged schematic view of an A-A' section in FIG. 40A. Referring to FIG. 40B, the air escape groove 600 includes one vent sub-groove 601 and two glue retaining sub-grooves 602 that are located on both sides of the vent sub-groove 601, respectively. Further, FIG. 41A shows a schematic view of painting glue on the top surface of the second lens barrel 202. It can be seen that the second glue material 500 forms a ring shape with a notch on the top surface of the second lens barrel 202, and the notch is located at the position of the air escape groove 600. FIG. 41B shows a partial enlarged schematic view of an A-A' section in FIG. 41A. The glue retaining sub-groove 602 accommodates the overflown second glue material 500, so that the vent sub-groove 601 is not blocked by the second glue material 500, thereby ensuring that the second glue material 500 is notched.

Figure 42:
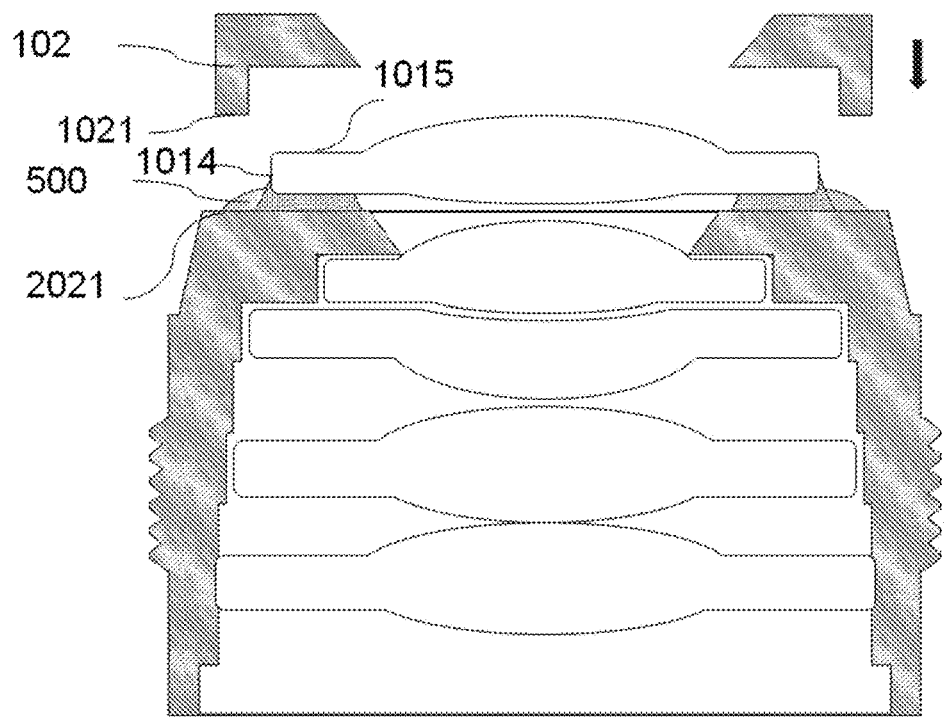
FIG. 42 shows a schematic view of moving the first lens barrel 102 above the first lens sheet 101, and then making the first lens barrel 102 gradually approach the first lens sheet 101 in an embodiment of the present application.
Figure 43:
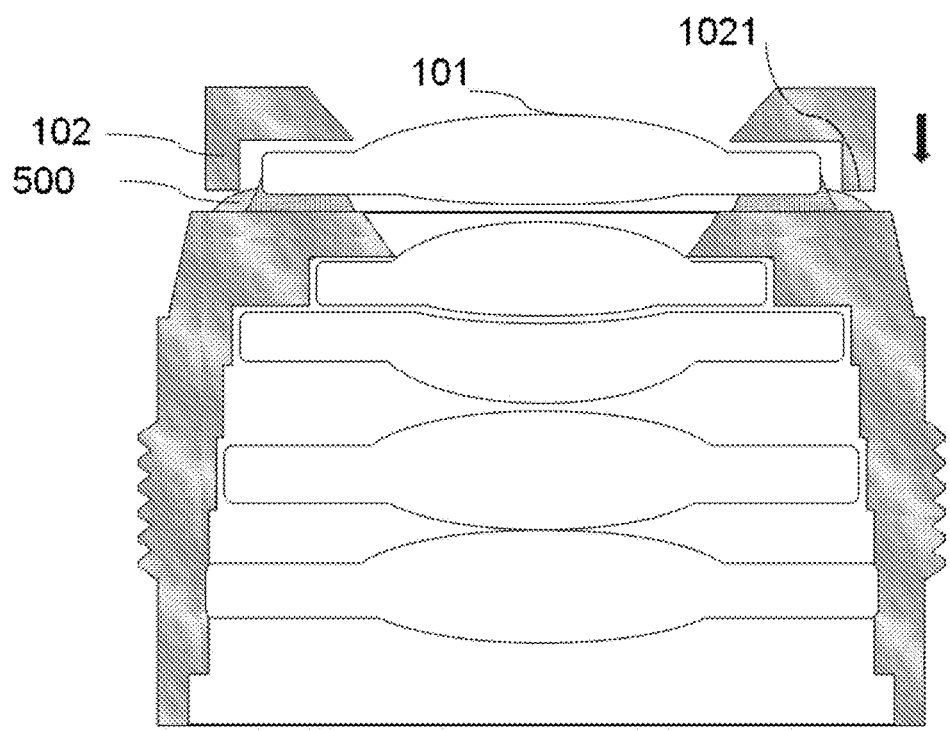
FIG. 43 shows a schematic view of the bottom surface of a first lens barrel 102 contacting an added second glue material 500 in an embodiment of the present application.
Figure 44:
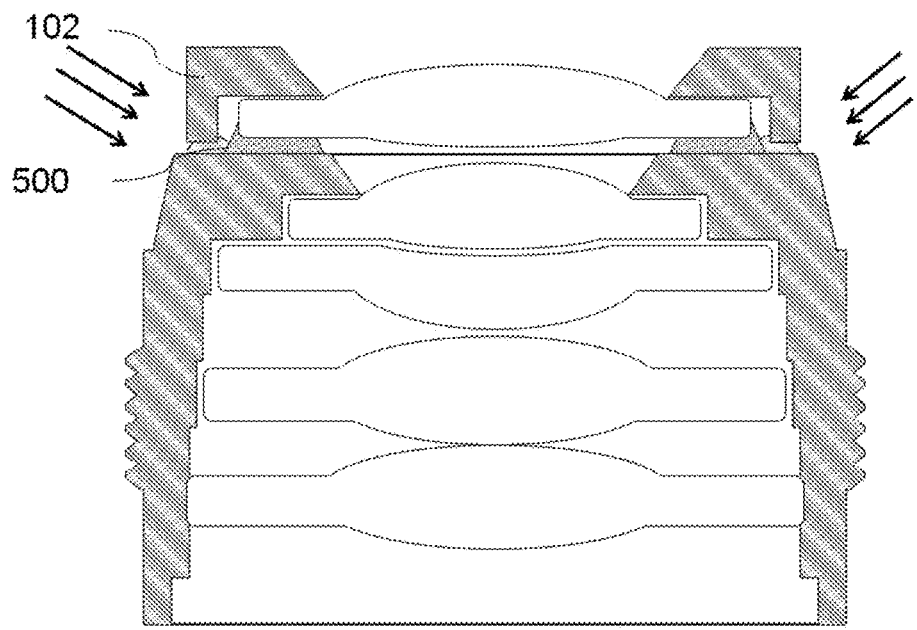
FIG. 44 shows a schematic view of exposing the second glue material 500 in an embodiment of the present application.
Figure 45:
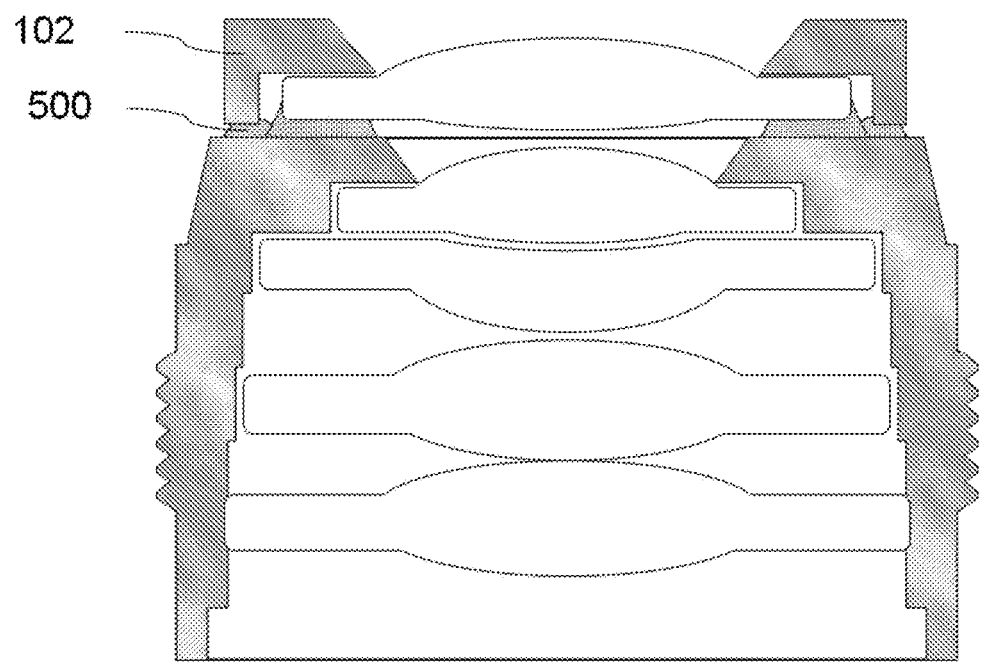
FIG. 45 shows a state of a semi-finished product after pre-curing is completed in an embodiment of the present application.

Step S3000, after the glue painting of the second glue material 500 is completed, the first lens barrel 102 is covered on the first lens sheet 101 so as to form a diaphragm. The first lens barrel 102 is moved above the first lens sheet 101, and then the first lens barrel 102 is gradually approached to the first lens sheet 101 and the bottom surface 1021 of the first lens barrel 102 is in contact with the second glue material 500. FIG. 42 shows a schematic view of moving the first lens barrel 102 above the first lens sheet 101, and then making the first lens barrel 102 gradually approach the first lens sheet 101. FIG. 43 shows a schematic view of the bottom surface of the first lens barrel 102 contacting the added second glue material 500. Then, the first lens barrel 102 continues to approach the first lens sheet 101, so that the bottom surface 1021 of the first lens barrel 102 is in full contact with the liquid second glue material 500, and then the second glue material 500 is pre-cured by exposure so that the first lens barrel 102 is fixed to the top surface 2021 of the second lens barrel 202. FIG. 44 shows a schematic view of exposing the second glue material 500. In the figure, the arrow shows light for exposure of the second glue material 500. FIG. 45 shows a state of a semi-finished product after the pre-curing is completed.

Step S4000, the combination of the first glue material 300, the second glue material 500, the first lens sheet 101, the first lens barrel 102, and the second lens component 200 (i.e. the semi-finished product after step S3000 is completed) is baked, so that the first glue material 300 and the second glue material 500 are permanently cured. The finished product after baking is completed is as shown in FIG. 46A. In this step, since the design of the foregoing air escape groove 600 can ensure that the second glue material 500 is notched, in the baking process, the cavity 1022 can communicate with the outside through the vent sub-groove 601 and the notch of the second glue material 500, avoiding the misalignment or deformation of the first lens sheet 101 due to expansion of air in the cavity 1022, thereby ensuring the imaging quality of the optical lens based on the active calibration. In particular, the mistakes in painting glue due to careless operations (e.g. accidentally forming the second glue material 500 into a completely closed ring) can be reduced by the above design of the air escape groove 600, which is helpful to improve the yield in mass production.

On the basis of the above-mentioned embodiment, further, there is provided a camera module assembly method, comprising: assembling an optical lens by using the optical lens assembly method described in the above-mentioned embodiment; and assembling a camera module based on the optical lens.

Herein, the active calibration is to calibrate the relative position of the first lens component 100 and the second lens component 200 based on an actual resolution curve measured by actual imaging of the optical system (that is, the four second lens sheets 201 and the one first lens sheet 101 together constitute an imageable optical system) so as to improve the imaging quality of the optical lens.

The active calibration described in the present application can adjust the relative position of the first lens component 100 and the second lens component 200 in multiple degrees of freedom. FIG. 53A shows the relative position adjustment manner in the active calibration in an embodiment of the present application. In this adjustment manner, the first lens component 100 (or may be the first lens sheet 101) can be moved along x, y, and z directions relative to the second lens component 200 (that is, the relative position adjustment in this embodiment has three degrees of freedom). The z direction is a direction along the optical axis, and the x and y directions are directions perpendicular to the optical axis. The x and y directions are both in an adjustment plane P, and the translation in the adjustment plane P can be decomposed into two components in the x and y directions.

FIG. 53B shows rotation adjustment in the active calibration according to another embodiment of the present application. In this embodiment, in addition to the three degrees of freedom in FIG. 53A, a degree of freedom in rotation is, i.e., an adjustment in a r direction, is also added to the relative position adjustment. In this embodiment, the adjustment in the r direction is rotation in the adjustment plane P, i.e. rotation around an axis perpendicular to the adjustment plane P.

Figure 53C:
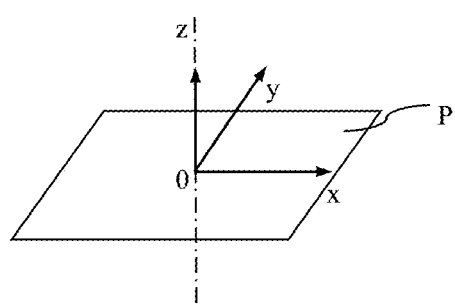
FIG. 53C shows the relative position adjustment manner in which adjustments in v and w directions are added in the active calibration according to further another embodiment of the present application.
Figure 53C:
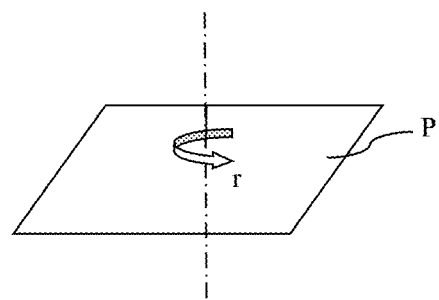
Figure 53C:
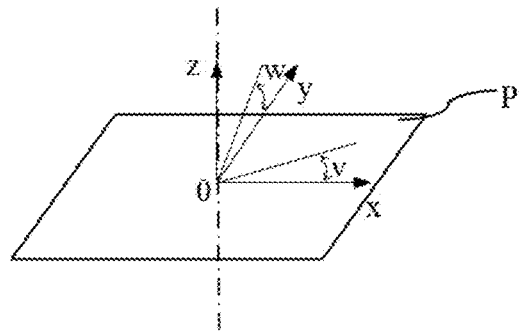

Further, FIG. 53C shows the relative position adjustment manner in which adjustments in v and w directions are added in the active calibration according to further another embodiment of the present application. The v direction represents a rotation angle of an xoz plane, and the w direction represents a rotation angle of a yoz plane. The rotation angles of the v direction and the w direction can be combined into a vector angle, which represents the total tilt state. That is to say, by adjusting in the v and w directions, the tilt posture of the first lens component 100 relative to the second lens component 200 (i.e. tilt of the optical axis of the first lens component 100 relative to the optical axis of the second lens component 200) can be adjusted.

The adjustments in the six degrees of freedom of x, y, z, r, v, and w may all affect the imaging quality of the optical system (for example, affecting the size of the resolution). In other embodiments of the present application, the relative position adjustment manner may be to adjust only in any one of the above six degrees of freedom, or may be a combination of any two or more of them.

Further, in an embodiment, in the active calibration step, the movement further includes a translation in the adjustment plane, namely, the movement in the x and y directions.

Further, in an embodiment, the active calibration further comprises: adjusting and determining the included angle between the axis of the first lens sheet 101 and the axis of the second lens component 200 according to the measured resolution of the optical system, namely, the adjustment in the w and v directions. In the assembled optical lens or camera module, there may be a non-zero included angle between the axis of the first lens sheet 101 and the axis of the second lens component 200.

Further, in an embodiment, the active calibration further comprises: moving the first lens sheet 101 in the direction perpendicular to the adjustment plane (i.e. adjustment in the z direction), and according to the measured resolution of the optical system, determining the relative position between the first lens sheet 101 and the second lens component 200 in the direction perpendicular to the adjustment plane.

Further, in an embodiment, in the pre-positioning step (step 20), there is a gap between the bottom surface of the first lens sheet 101 and the top surface of the second lens component 200; and in the bonding step (step 40), the glue material is arranged in the gap.

In an embodiment, the first lens sheet 101 may be formed by a plurality of sub-lens sheets that are fitted with each other to form one body. In this embodiment, the side surface and the top surface of the non-optical surfaces of the first lens sheet 101 that are not used for imaging may form a light shielding layer. The light shielding layer may be formed by screen printing a light shielding material on the side surface and the top surface of the first lens sheet 101.

In an embodiment, in the active calibration step, the second lens component 200 can be fixed, the first lens sheet 101 can be clamped by a clamper, and the first lens sheet 101 can be moved under the drive of a six-axis motion mechanism connected with the clamper, thereby realizing the above-mentioned six degrees of freedom relative movement between the first lens sheet 101 and the second lens component 200. The clamper can bear against or partially bear against the side surface of the first lens sheet 101, thereby clamping the first lens sheet 101.

It needs to be noted that in the above embodiment, the number of lens sheets of the first lens component 100 and the second lens component 200 can be adjusted as needed. For example, the number of lens sheets of the second lens component 200 may be one, two, three, five or the like. Accordingly, the total number of lens sheets of the entire optical lens can also be adjusted as needed. For example, the total number of lens sheets of the optical lens can be six, or may be three, four, seven or the like.

It is worth noting that in the foregoing embodiment, the first glue material needs to be painted twice to wrap a part or all of the side surface of the first lens sheet. This is because in the active calibration process, the first lens needs to be picked up by the pickup mechanism, and the pickup mechanism may be a clamping jaw. Since it is necessary to avoid the optical path of active calibration, the clamping jaws are preferably arranged on the side surface of the first lens sheet, and the first lens sheet is clamped from both sides by contacting the side surface of the first lens sheet.

Therefore, glue paining is firstly performed in the gap between the bottom surface of the first lens sheet and the top surface of the second lens barrel (or the second lens component). After the glue material is pre-cured, the clamping jaw is loosened, and then secondary painting glue and curing are performed on the side surface and the top surface of the first lens sheet (i.e., the implementation of adding the liquid first glue material around the first structural zone and/or the top surface), so that the first glue material wraps a part or all of the side surface of the first lens sheet.

Figure 47:
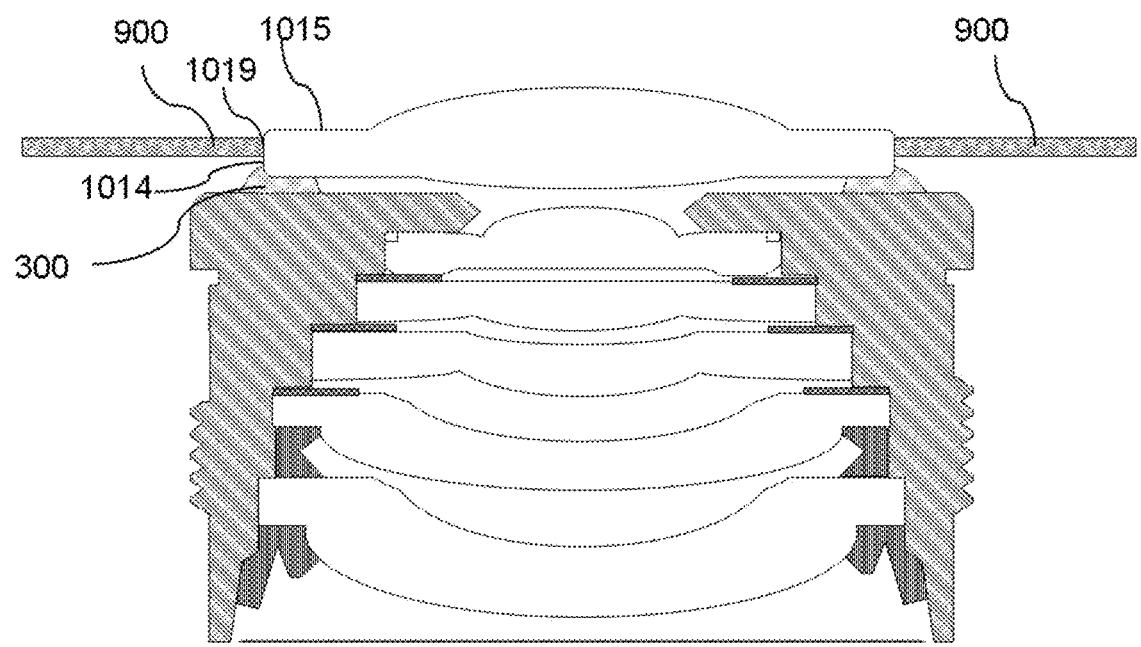
FIG. 47 shows a schematic view of painting the first glue material on the top surface of the structural zone of the second lens component in another embodiment of the present application.

Further, FIG. 47 shows a schematic view of painting the first glue material on the top surface of the structural zone of the second lens component in another embodiment of the present application. In this embodiment, a contact point 1019 (also referred to as a contact surface) between the clamping jaw 900 and the side surface 1014 of the first lens sheet is set at a position close to the top surface 1015 of the first lens sheet. The first glue material is painted on the top surface of the second lens component, and the top surface of the first glue material is controlled to be lower than a certain height, so that in the active calibration process (or in the process of the clamping jaw placing the first lens sheet at the position determined by the active calibration), the clamping jaw 900 is never in contact with the first glue material 300 (for example, the clamping jaw is always higher than the top surface of the first glue material in the active calibration process). In this way, the first glue material can not only wrap a part of the side surface of the first lens sheet (for example, the side surface wrapping the first lens sheet is located in the region below the contact point of the clamping jaw and the first lens sheet), but also will not interfere with the clamping jaw. At the same time, one time of glue painting can be reduced, which is helpful to improve the production efficiency.

Figure 48:
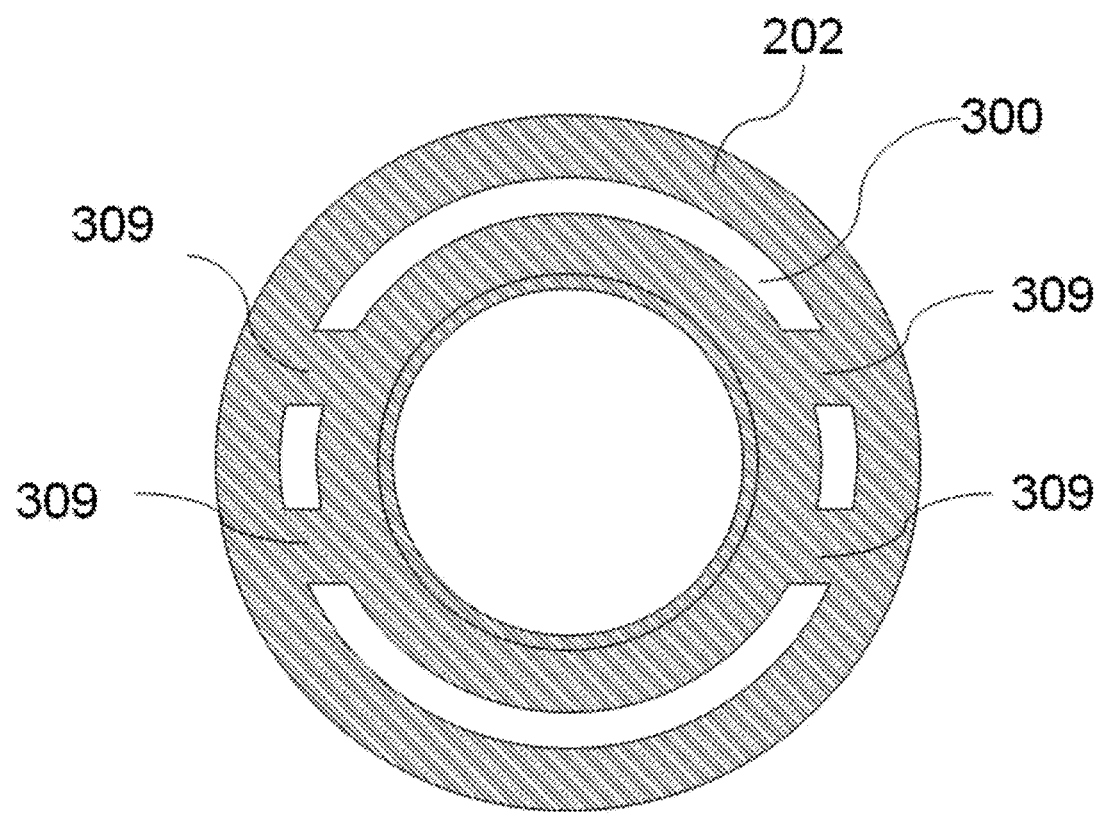
FIG. 48 shows a glue painting manner where painting of broken glue is used for the first glue material in an embodiment of the present application.
Figure 49:
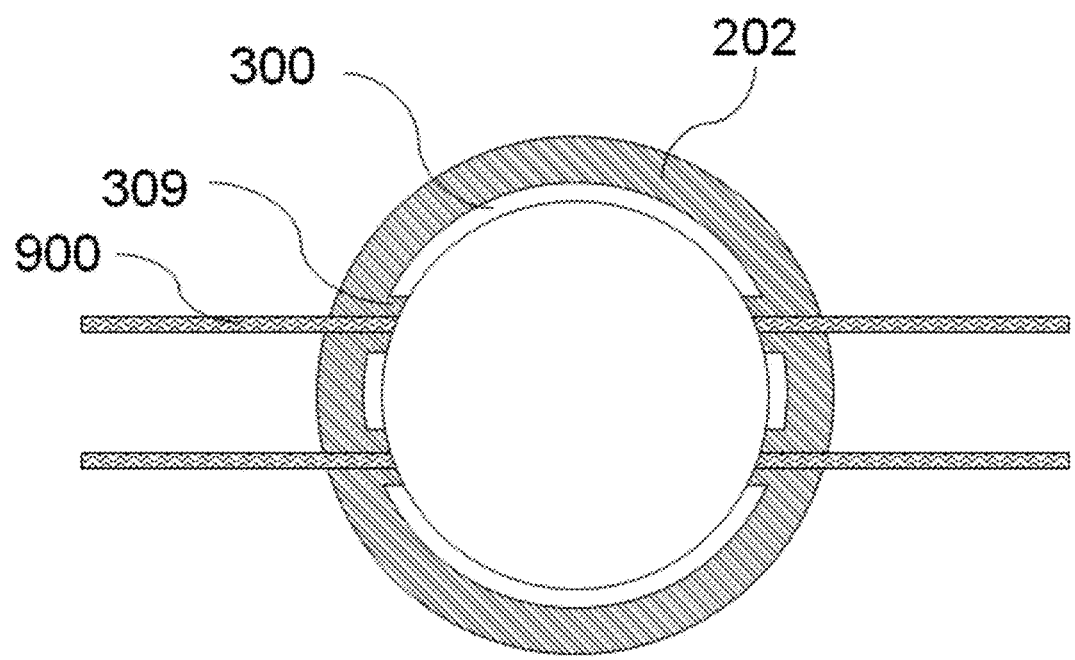
FIG. 49 shows an arrangement manner of a clamping jaw corresponding to the glue painting manner shown in FIG. 48.

According to another embodiment of the present application, there is further provided another optical lens assembly method. In this embodiment, the first glue material can wrap the side surface of the first lens sheet by one-time glue painting in a manner of painting broken glue. FIG. 48 shows a glue painting manner where painting of broken glue is used for the first glue material in an embodiment of the present application. FIG. 49 shows an arrangement manner of the clamping jaw corresponding to the glue painting manner shown in FIG. 48. Specifically, when the first glue material is painted on the top surface of the second lens component (refer to FIG. 48, in which it is shown that the first glue material 300 is painted on the top surface of the second lens barrel 202), the first glue material 300 is not completely closed, that is, the first glue material may be a ring shape with a notch 309, and the notch is fitted with the clamping jaw 900 to form a gap for the clamping jaw 900 to pass. In this way, in the active calibration process (or in the process of the clamping jaw placing the first lens sheet at the position determined by the active calibration), the top surface of the first glue material may be higher than the contact point between the clamping jaw and the side surface of the first lens sheet. When the bottom surface of the first lens sheet is in contact with the top surface of the first glue material, the clamping jaw brings the first lens sheet to continue to move downwardly so that the top surface of the first glue material is higher than the top surface of the first lens sheet (refer to the top surface of the first structural zone), and the first glue material located above the top surface of the first structural zone flows to the top surface of the first structural zone, so that the first glue material covers the top surface of the first structural zone and wraps the side surface of the first structural zone. Since the above process can be completed by one-time glue painting, it is helpful to improve the production efficiency. On the other hand, the design of the first glue material with the notch can also provide air escape holes for the subsequent baking step (the step of realizing permanent curing by baking), so as to avoid product failure caused by gas expansion in the baking process.

Figure 52:
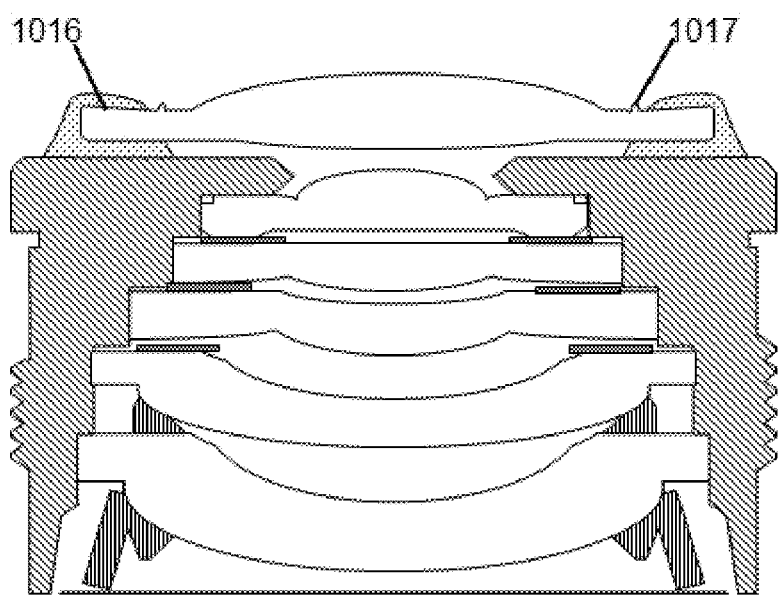
FIG. 52 shows a schematic view of the top surface of the first structural zone being set as an inclined surface in an embodiment of the present application.

In particular, in an embodiment, the top surface of the first structural zone of the first lens sheet can be made into an inclined surface with a high outer side and a low inner side, wherein the outer side is the side close to the outer side surface of the first lens sheet, and the inner side is the side close to the first optical zone of the first lens sheet. FIG. 52 shows a schematic view of the top surface of the first structural zone being set as an inclined surface in an embodiment of the present application. In this solution, when the top surface of the first glue material is higher than the top surface of the first structural zone, the first glue material located above the top surface of the first structural zone will flow along the inclined surface 1016 at the top of the first structural zone and cover the top surface of the first structural zone. Further, an annular boss 1017 (or a glue retaining dam) may be provided on the top surface of the first structural zone so as to avoid the first glue material contaminating the first optical zone. The annular boss 1017 can be provided at a position close to the first optical zone.

Figure 50:
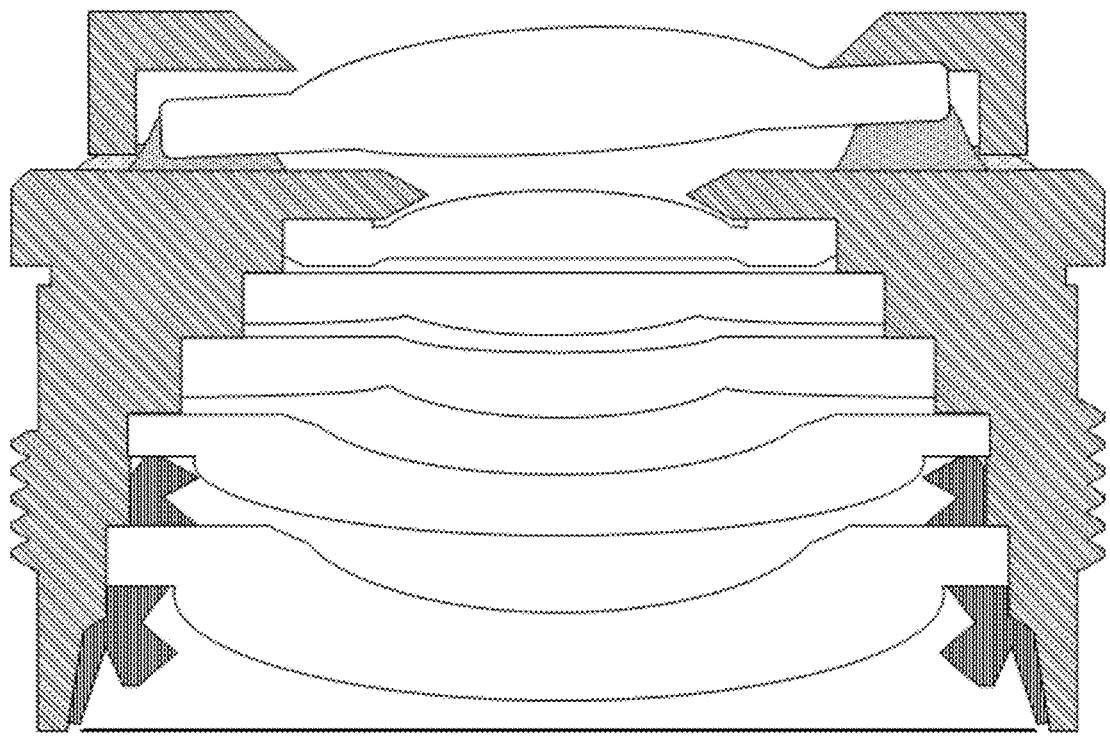
FIG. 50 shows an example of interference between the first lens barrel and the first lens sheet.
Figure 51:
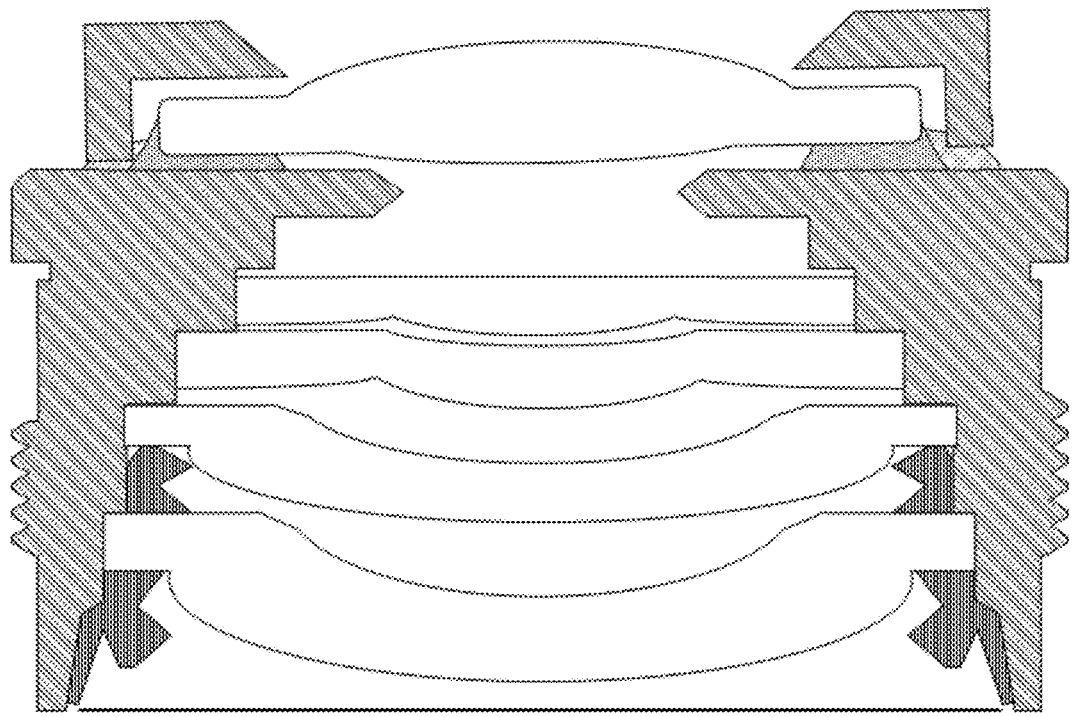
FIG. 51 shows an example of avoiding interference between the first lens barrel and the first lens sheet by making the difference between an included angle B and an included angle A smaller than a preset threshold.

Further, it needs to be noted that the relative position of the first lens sheet and the second lens component determined after the active calibration may be a non-zero included angle between the optical axis of the first lens sheet and the optical axis of the second lens component. If this included angle is too large, when the first lens barrel is further mounted, the first lens barrel may interfere with the first lens sheet and cause product failure. FIG. 50 shows an example of interference between the first lens barrel and the first lens sheet. In an embodiment, after the active calibration step, an included angle A between the optical axis of the first lens sheet and the optical axis of the second lens component is obtained according to the recorded active calibration data, and in the step of covering the first lens barrel on the first lens sheet, an included angle B between the central axis of the first lens barrel and the optical axis of the second lens component is determined according to the obtained included angle A between the optical axis of the first lens sheet and the optical axis of the second lens component (for example, the difference between the included angle B and the included angle A is smaller than a preset threshold) so as to avoid product failure due to the interference (or collision) of the first lens barrel with the first lens sheet. FIG. 51 shows an example where the interference of the first lens barrel with the first lens sheet is avoided by making the difference between the included angle B and the included angle A smaller than a preset threshold.

Further, according to an embodiment of the present application, there is further provided a camera module assembly method, comprising: assembling an optical lens by using the optical lens assembly method of any one of the foregoing embodiments, and then manufacturing a camera module by using the assembled optical lens.

The above description is only the preferred implementations of the present application and the explanation of the applied technical principle. It should be understood by those skilled in the art that the scope of disclosure involved in the present application is not limited to technical solutions formed by specific combinations of the above technical features, and at the same time, should also cover other technical solutions formed by any combination of the above technical features or equivalent features thereof without departing from the concept of the disclosure. For example, the above features and (but not limited to) the technical features with similar functions disclosed in the present application are replaced with each other to form technical solutions.

What is claimed is:

1. An optical lens, comprising:
a first lens component, including one first lens sheet having a first optical zone for optical imaging and a first structural zone other than the first optical zone;
a second lens component, including a second lens barrel and at least one second lens sheet mounted in the second lens barrel, wherein the at least one second lens sheet and the first lens sheet together constitute an imaging optical system, the second lens sheet has a second optical zone for optical imaging and a second structural zone other than the second optical zone, the second structural zone and the second lens barrel constitute a structural zone of the second lens component, and there is a first gap between a top surface of the structural zone of the second lens component and a bottom surface of the first structural zone; and
a first glue material, located in the first gap, wherein the first glue material extends outwardly along the top surface of the structural zone of the second lens component and covers at least a part of an outer lateral side surface of the first structural zone;
wherein the first lens component further comprises a first lens barrel, and the first lens barrel surrounds the first lens sheet and shields light directed from the outside to an outer lateral side surface and a top surface of the first structural zone;
wherein a second glue material is provided between a bottom surface of the first lens barrel and a top surface of the second lens barrel, and the first lens barrel is adhered to the second lens barrel by the second glue material;
wherein there is a cavity between an outer lateral side surface and the top surface of the first lens sheet and the first lens barrel, and the second lens component has an air escape channel that communicates the cavity with the outside.

2. The optical lens according to claim 1, wherein the first glue material is adapted to support and fix the first lens sheet and the second lens component, so that the relative position of the first lens sheet and the second lens component is maintained at the relative position determined by active calibration.

3. The optical lens according to claim 1, wherein the first glue material wraps the entire outer lateral side surface of the first structural zone.

4. The optical lens according to claim 3, wherein the first glue material further covers at least a portion of the top surface of the first structural zone.

5. The optical lens according to claim 4, wherein the first glue material is black to shield the outer lateral side surface and the top surface of the first structural zone.

6. The optical lens according to claim 1, wherein the cavity between the outer lateral side surface and the top surface of the first lens sheet and the first lens barrel is filled with the first glue material.

7. The optical lens according to claim 1, wherein
both the first lens component and the second lens component have an air escape channel that communicates the cavity with the outside.

8. The optical lens according to claim 1, wherein the air escape channel comprises an air escape groove located on the top surface of the second lens barrel, wherein the second glue material forms a ring shape with a notch on the top surface of the second lens barrel, and the notch is located at the position of the air escape groove.

9. The optical lens according to claim 8, wherein the air escape groove includes one vent sub-groove and two glue retaining sub-grooves that are located on both sides of the vent sub-groove, respectively, and the glue retaining sub-grooves accommodate the second glue material overflown, so that the vent sub-groove is not blocked by the second glue material.

10. The optical lens according to claim 1, wherein the top surface of the second lens barrel is a flat surface, and the first gap is located between the flat surface and the bottom surface of the first structural zone, wherein the first glue material is located in the first gap and extends outwardly along the flat surface and surrounds the first structural zone, and the first glue material extending outwardly covers at least a part of the outer lateral side surface of the first structural zone.

11. An optical lens, comprising:
a first lens component, including one first lens sheet having a first optical zone for optical imaging and a first structural zone other than the first optical zone;
a second lens component, including a second lens barrel and at least one second lens sheet mounted in the second lens barrel, wherein the at least one second lens sheet and the first lens sheet together constitute an imaging optical system, the second lens sheet has a second optical zone for optical imaging and a second structural zone other than the second optical zone, the second structural zone and the second lens barrel constitute a structural zone of the second lens component, and there is a first gap between a top surface of the structural zone of the second lens component and a bottom surface of the first structural zone; and
a first glue material, located in the first gap, wherein the first glue material extends outwardly along the top surface of the structural zone of the second lens component and covers at least a part of an outer lateral side surface of the first structural zone;
wherein the first lens component further comprises a first lens barrel, and the first lens barrel surrounds the first lens sheet and shields light directed from the outside to an outer lateral side surface and a top surface of the first structural zone;

wherein a cavity between an outer lateral side surface and a top surface of the first lens sheet and the first lens barrel is filled with the first glue material;

wherein:
an end of the top surface of the first structural zone close to the first optical zone has a glue overflow groove; or the top surface of the first structural zone is inclined, and an end of the top surface of the first structural zone close to the first optical lens is higher than another end of the top surface of the first structural zone close to an outer lateral side surface of the first structural zone.

12. A method of assembling an optical lens, wherein the optical lens comprises a first lens component and a second lens component separated from each other, the first lens component includes one first lens sheet, and the second lens component includes a second lens barrel and at least one second lens sheet mounted in the second lens barrel, wherein the method comprises:

pre-positioning the first lens component and the second lens component, so that the first lens sheet and the at least one second lens sheet together constitute an imaging optical system;

adjusting and determining the relative position of the first lens component and the second lens component based on active calibration; and bonding the first lens sheet and the second lens component by a first glue material, wherein the first lens sheet has a first optical zone for optical imaging and a first structural zone other than the first optical zone, and the second lens sheet has a second optical zone for optical imaging and a second structural zone other than the second optical zone, and the second structural zone and the second lens barrel constitute a structural zone of the second lens component, wherein there is a first gap between a top surface of the structural zone of the second lens component and a bottom surface of the first structural zone, and the first glue material is provided in the first gap and extends outwardly along the top surface of the structural zone of the second lens component and covers at least a part of the outer lateral side surface of the first structural zone;

after the first glue material is cured, the first lens sheet and the second lens component are fixed and maintained at the relative position determined by the active calibration;

arranging a second glue material on the top surface of the structural zone of the second lens component, wherein the second glue material surrounds an outer periphery of the first glue material; and covering a first lens barrel on the first lens sheet and moving the first lens barrel above the first lens sheet, and then the first lens barrel is gradually approached to the first lens sheet, and a bottom surface of the first lens barrel is contacted with the second glue material, wherein the second lens component has an air escape channel, and the air escape channel comprises an air escape groove located on the top surface of the second lens barrel, the air escape groove comprises one vent sub-groove and two glue retaining sub-grooves that are located on both sides of the vent sub-groove, respectively, and the glue retaining sub-grooves accommodate the second glue material overflown, so that the vent sub-groove is not blocked by the second glue material.

13. The method of assembling the optical lens according to claim 12, wherein the bonding by the first glue material includes:

arranging a liquid first glue material on the top surface of the structural zone of the second lens component;

moving the first lens sheet above the second lens component, then gradually approaching the second lens component and contacting the first glue material, and adjusting the relative position of the first lens sheet and the second lens component to the relative position determined by the active calibration, wherein the arranged liquid first glue material is at least located in the first gap;

pre-curing the first glue material; and permanently curing the first glue material.

14. The method of assembling the optical lens according to claim 13, wherein in the step of the pre-curing, during pre-curing, the first lens sheet and the second lens component are maintained at the relative position determined by the active calibration by an external pickup mechanism, and after pre-curing, the first lens sheet and the second lens component are maintained at the relative position determined by the active calibration by means of the pre-cured first glue material.

* * * * *